United States Patent
Sato et al.

(10) Patent No.: US 8,416,332 B2
(45) Date of Patent: Apr. 9, 2013

(54) INFORMATION PROCESSING APPARATUS, INFORMATION PROCESSING METHOD, AND PROGRAM

(75) Inventors: Koji Sato, Tokyo (JP); Yasutaka Fukumoto, Tokyo (JP); Takashi Ogata, Tokyo (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 12/688,511

(22) Filed: Jan. 15, 2010

(65) Prior Publication Data
US 2010/0182501 A1    Jul. 22, 2010

(30) Foreign Application Priority Data

Jan. 20, 2009  (JP) ............................... P2009-009920
Jul. 30, 2009  (JP) ............................... P2009-177877

(51) Int. Cl.
*H04N 5/222* (2006.01)
(52) U.S. Cl.
USPC ...................................... 348/333.05
(58) Field of Classification Search ........................ None
See application file for complete search history.

(56) References Cited

U.S. PATENT DOCUMENTS

| 6,069,622 | A  | * | 5/2000 | Kurlander ...................... 715/753 |
| 2006/0117352 | A1 | * | 6/2006 | Yamagata et al. .............. 725/50 |
| 2009/0041352 | A1 | * | 2/2009 | Okamoto ...................... 382/176 |
| 2010/0110080 | A1 | * | 5/2010 | Goodinson ................... 345/467 |

FOREIGN PATENT DOCUMENTS

| JP | 2005-141297 | 6/2005 |
| JP | 2008-22300  | 1/2008 |

* cited by examiner

*Primary Examiner* — Luong T Nguyen
(74) *Attorney, Agent, or Firm* — Finnegan, Henderson, Farabow, Garrett & Dunner, LLP

(57) ABSTRACT

The information processing apparatus according to the present invention is provided with a moving picture analysis unit for analyzing moving picture data including a plurality of images and audios associated with time information and for generating moving picture metadata relating to a plurality of feature quantities characterizing the moving picture, a comic display conversion unit for extracting a plurality of images from the moving picture data based on the moving picture metadata and for dividing a predetermined display region into frames and for converting an arrangement of the plurality of extracted images into a comic-like arrangement and for generating frame information including information about the images arranged in each of the frames, and a comic display data generation unit for generating comic display data including at least the frame information, data of the extracted images, and the audio data of the moving picture.

17 Claims, 41 Drawing Sheets

FIG. 5

| | MOVING PICTURE METADATA |
|---|---|
| IMAGE | FACE DETECTION |
| | FACE COUNTS |
| | FACE ZOOM |
| | SMILE DETECTION |
| | CAMERAWORK |
| | SCENE CHANGE SCORE |
| | ... |
| AUDIO | SPEECH |
| | LAUGHTER |
| | CHEERING |
| | CLAPPING |
| | APPLAUSE |
| | MUSIC |
| | ... |

FIG. 13
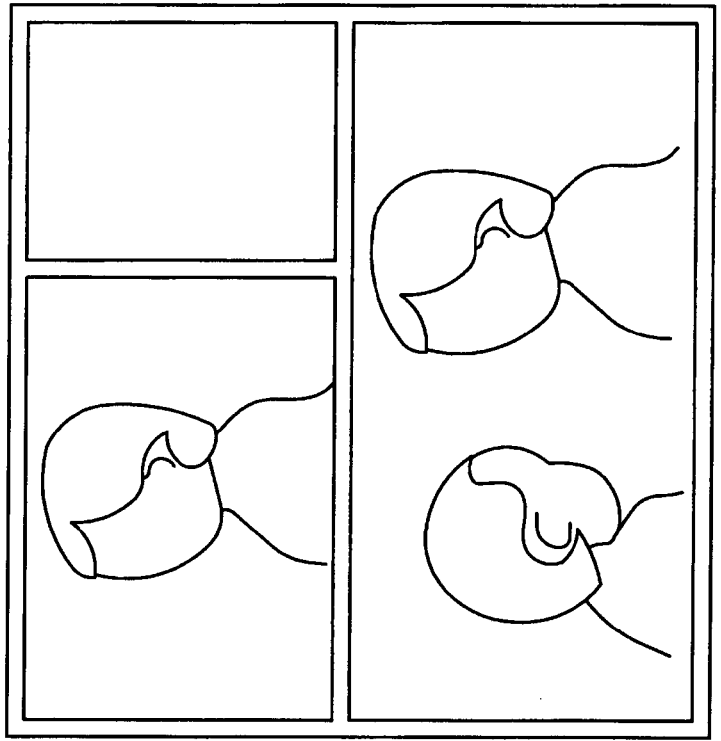
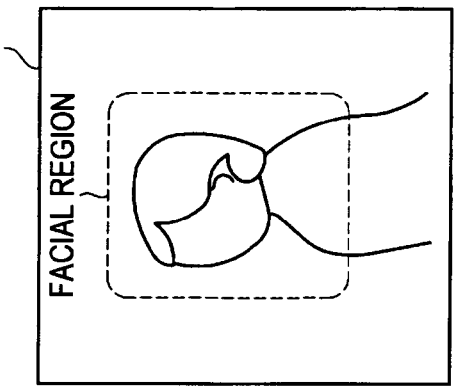
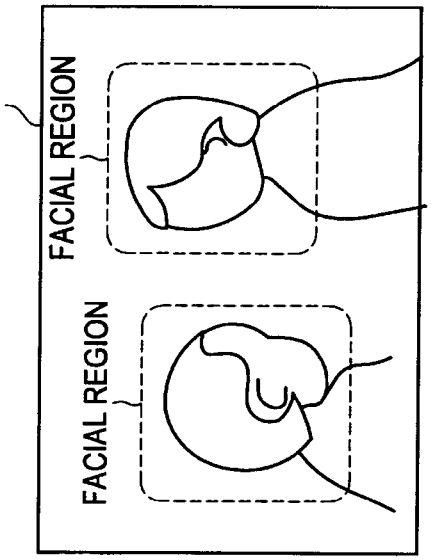

FIG. 20

| AUDIO METADATA | EFFECT |
|---|---|
| SPEECH | !  |
| LAUGHTER | HA-HA-HA |
| CHEERING | WOW!! |
| CLAPPING | ✶ |
| APPLAUSE | CLAP CLAP CLAP |
| MUSIC | ♪ |

A CASE WHERE CAMERAWORK IS PAN

GENERATE EFFECT LINES ALONG DIRECTION OF CAMERAWORK

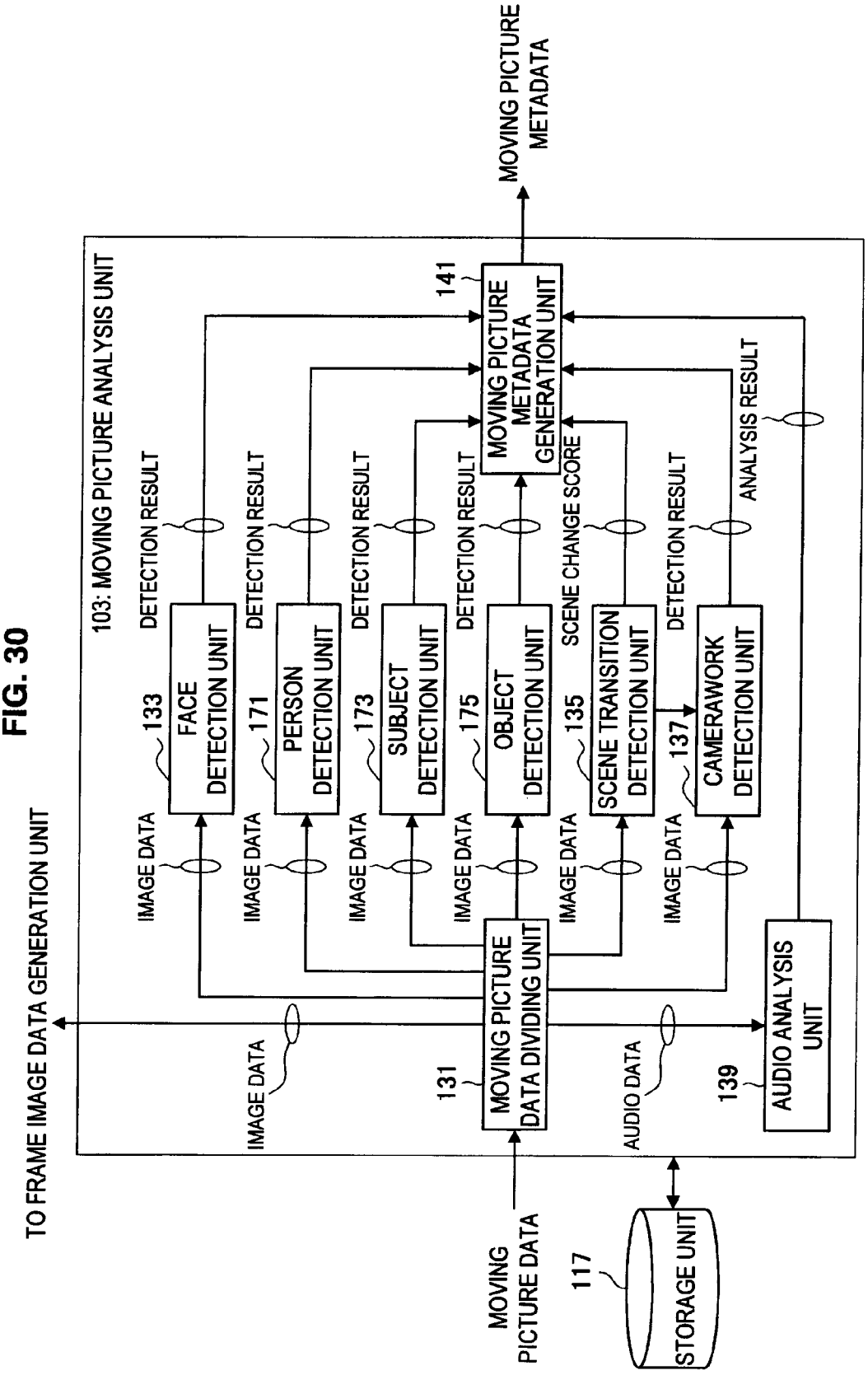

FACIAL REGION IN WHICH DETECTION ACCURACY IS HIGH

EFFECT IMAGE ARRANGEMENT REGION

ARRANGE EFFECT OF RADIAL LINES
ON ENTIRE FRAME INCLUDING FACIAL REGION
SO AS TO EMPHASIZE FACIAL REGION

A CASE WHERE PARTICULAR REGION IS NOT
DETECTED AND ONLY AUDIO IS DETECTED

EFFECT IMAGE ARRANGEMENT REGION

ARRANGE EFFECT IMAGE ON ENTIRE FRAME

ARRANGE EFFECT IMAGE IN SUCH A
DIRECTION AS TO AVOID DETECTED REGION

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

Digital imaging apparatuses such as a digital still camera and a digital video camera are coming into wide use with the progress in information processing technology. For these digital imaging apparatuses, not only techniques for improving the convenience in taking pictures but also techniques for displaying the taken pictures to a user have been vigorously developed.

For example, Japanese Patent Application Laid-Open No. 2008-22300 discloses an example of a technique for improving the convenience in taking pictures, i.e., a technique for detecting a facial area of a person as a subject, and determining a possibility that a blur may occur in the picture of the person based on variation in the size of the facial area and a moving speed.

Further, for example, Japanese Patent Application Laid-Open No. 2005-141297 discloses an example of a technique for displaying the taken pictures to a user. In this technique, thumbnail images relating to an event which the user has experienced are displayed on a display screen, and words generated according to the event are displayed in a speech balloon on an important thumbnail image representing the event.

SUMMARY OF THE INVENTION

It takes an enormous amount of time to review the contents of moving picture data which is generated in an imaging apparatus capable of taking a moving picture such as a digital video camera, since the maximum recording time has increased with the progress in technology. At this occasion, even when the technique described in Japanese Patent Application Laid-Open No. 2005-141297 is used to display a plurality of thumbnail images and a speech balloon on an important thumbnail image, there may be a case where it is difficult for a user to understand the relationship between the image attached with the speech balloon and the other images. Therefore, there is a need for a technique to automatically extract and display useful images of a moving picture so that a user can easily understand the contents of the moving picture.

In light of the foregoing, it is desirable to provide a novel and improved information processing apparatus, information processing method, and program capable of automatically extracting images useful for understanding the contents of a moving picture and displaying the images in such a manner that the contents can be easily understood.

To solve the issues mentioned above, according to an embodiment of the present invention, there is provided an information processing apparatus including a moving picture analysis unit for analyzing moving picture data which is data of a moving picture including a plurality of images and audios associated with time information and for generating moving picture metadata which is metadata relating to a plurality of feature quantities characterizing the moving picture, a comic display conversion unit for extracting a plurality of images from the moving picture data based on the moving picture metadata and for dividing a predetermined display region into frames, for converting an arrangement of the plurality of extracted images into a comic-like arrangement and for generating frame information including information about the images arranged in each of the frames, and a comic display data generation unit for generating comic display data including at least the frame information, data of the extracted images, and the audio data of the moving picture.

With such configuration, the moving picture analysis unit analyzes moving picture data, i.e., data of a moving picture including a plurality of images associated with time information, and generates moving picture metadata, i.e., metadata relating to a plurality of feature quantities characterizing the moving picture. Further, the comic display conversion unit extracts a plurality of images from the moving picture data based on the moving picture metadata, divides a predetermined display region into frames, converts an arrangement of the plurality of extracted images into a comic-like arrangement, and generates frame information including information about the images arranged in the respective frames. Furthermore, the comic display data generation unit generates comic display data including at least the frame information, data of the extracted images, and the audio data of the moving picture.

The comic display conversion unit may further include a digest score calculation unit for calculating a digest score based on the moving picture metadata, the digest score being a value obtained by weighting and adding the plurality of feature quantities toward each of the plurality of images constituting the moving picture, a thumbnail number determination unit for extracting, based on the digest score, thumbnail images to be arranged in the frames from the plurality of images constituting the moving picture data and for determining the number of the thumbnail images, an image size determination unit for determining a size of the thumbnail image arranged in the predetermined display region based on the digest score, a frame image arrangement unit for arranging the thumbnail images, whose image size is determined, to the frames in a predetermined order; and a frame information generation unit for generating the frame information relating to the frames in which the thumbnail images are arranged.

The thumbnail number determination unit may further extract, as animation images, a plurality of images connected to the extracted thumbnail image for a predetermined time.

The moving picture metadata may include moving picture metadata relating to camerawork when taking the moving picture, and the comic display conversion unit may further include a camerawork metadata usage unit for determining, based on the moving picture metadata relating to the camerawork, the number of images which is extracted as the animation images by the thumbnail number determination unit.

The camerawork metadata usage unit may select the animation images from the plurality of images existing between the extracted thumbnail image and the image located at the moment an integration value of camerawork reaches a predetermined threshold value.

The camerawork metadata usage unit may set a reproduction speed of the animation including the thumbnail image and the animation images in accordance with a magnitude of the integration value of the camerawork.

The information processing apparatus may further include a still picture analysis unit for analyzing still picture data which is data corresponding to a still picture and for generating still picture metadata which is metadata relating to a plurality of feature quantities characterizing the still picture. The image size determination unit may determine, based on the still picture metadata, a size of the still picture arranged in the predetermined display region.

The frame image arrangement unit may determine an order in which the still pictures are arranged, based on the time information, associated with the still picture data, about when the still picture data is generated.

The comic display conversion unit may further include an effect image arrangement unit for arranging, based on the moving picture metadata, at least any one of a speech balloon and a screen effect on the frame in which the thumbnail image is arranged.

The effect image arrangement unit may arrange any one of the speech balloon and the screen effect by using the moving picture metadata relating to the audio data included in the moving picture data.

The effect image arrangement unit may arrange the screen effect on the thumbnail image by using the moving picture metadata relating to the camerawork.

For the moving picture of which the moving picture metadata indicates that the image includes a face, the image size determination unit may make the thumbnail image by enlarging a facial region in which the face is shown.

The moving picture metadata may further include at least any one of moving picture metadata indicating that the image includes a person, moving picture metadata relating to a subject in the image, and moving picture metadata relating to an previously registered object which is present in the image, and the effect image arrangement unit may arrange the screen effect based on the moving picture metadata indicating that the image includes a person, the moving picture metadata relating to a subject in the image, or the moving picture metadata relating to a previously registered object which is present in the image.

The still picture metadata may include at least any one of still picture metadata indicating that the image includes a face, still picture metadata indicating that the image includes a person, still picture metadata relating to a subject in the image, and still picture metadata relating to a previously registered object which is present in the image, and the effect image arrangement unit may arrange the screen effect based on the still picture metadata indicating that the image includes a face, the still picture metadata indicating that the image includes a person, the still picture metadata relating to a subject in the image, or the still picture metadata relating to a previously registered object which is present in the image.

The effect image arrangement unit may arrange based on a relative positional relationship between a barycenter of the predetermined display region of the thumbnail image and a barycenter of a region of the thumbnail image in which a predetermined object is detected, the screen effect in a region other than the region in which the predetermined object is detected.

When the image includes the plurality of facial regions, the image size determination unit may make the thumbnail image by performing an enlargement processing so as to include all of the facial regions.

Further, to solve the issues mentioned above, according to another embodiment of the present invention, there is provided an information processing method including the steps of analyzing moving picture data which is data of a moving picture including a plurality of images and audios associated with time information and generating moving picture metadata which is metadata relating to feature quantities characterizing the moving picture, extracting a plurality of images from the moving picture data based on the moving picture metadata and dividing a predetermined display region into frames and converting an arrangement of the plurality of extracted images into an comic-like arrangement and generating frame information including information about the images arranged in each of the frames, and generating comic display data including at least the frame information, data of the extracted images, and the audio data of the moving picture.

Furthermore, to solve the issues mentioned above, according to still another embodiment of the present invention, there is provided a program for causing a computer to realize the functions of analyzing moving picture data which is data of a moving picture including a plurality of images and audios associated with time information and generating moving picture metadata which is metadata relating to feature quantities characterizing the moving picture, extracting a plurality of images from the moving picture data based on the moving picture metadata and dividing a predetermined display region into frames and converting an arrangement of the plurality of extracted images into a comic-like arrangement and generating frame information including information about the images arranged in each of the frames, and generating comic display data including at least the frame information, data of the extracted images, and the audio data of the moving picture.

As described above, according to the present invention, images useful for a user to understand the contents of the moving picture can be automatically extracted and displayed in such a manner as to enable a user to easily understand the contents, for extracting the plurality of images from the moving picture based on the moving picture metadata relating to the feature quantities characterizing the moving picture and for arranging and displaying the plurality of extracted images in a comic-like manner.

BRIEF DESCRIPTION OF THE DRAWINGS

FIG. 5 is an explanatory diagram for illustrating moving picture metadata;

FIG. 13 is an explanatory diagram for illustrating the image size determination unit according to the embodiment;

FIG. 20 is an explanatory diagram for illustrating an effect image arrangement unit according to the embodiment;

FIG. 30 is a block diagram for illustrating the first variation of the moving picture analysis unit according to the embodiment;

DETAILED DESCRIPTION OF THE EMBODIMENTS

Figure 1:
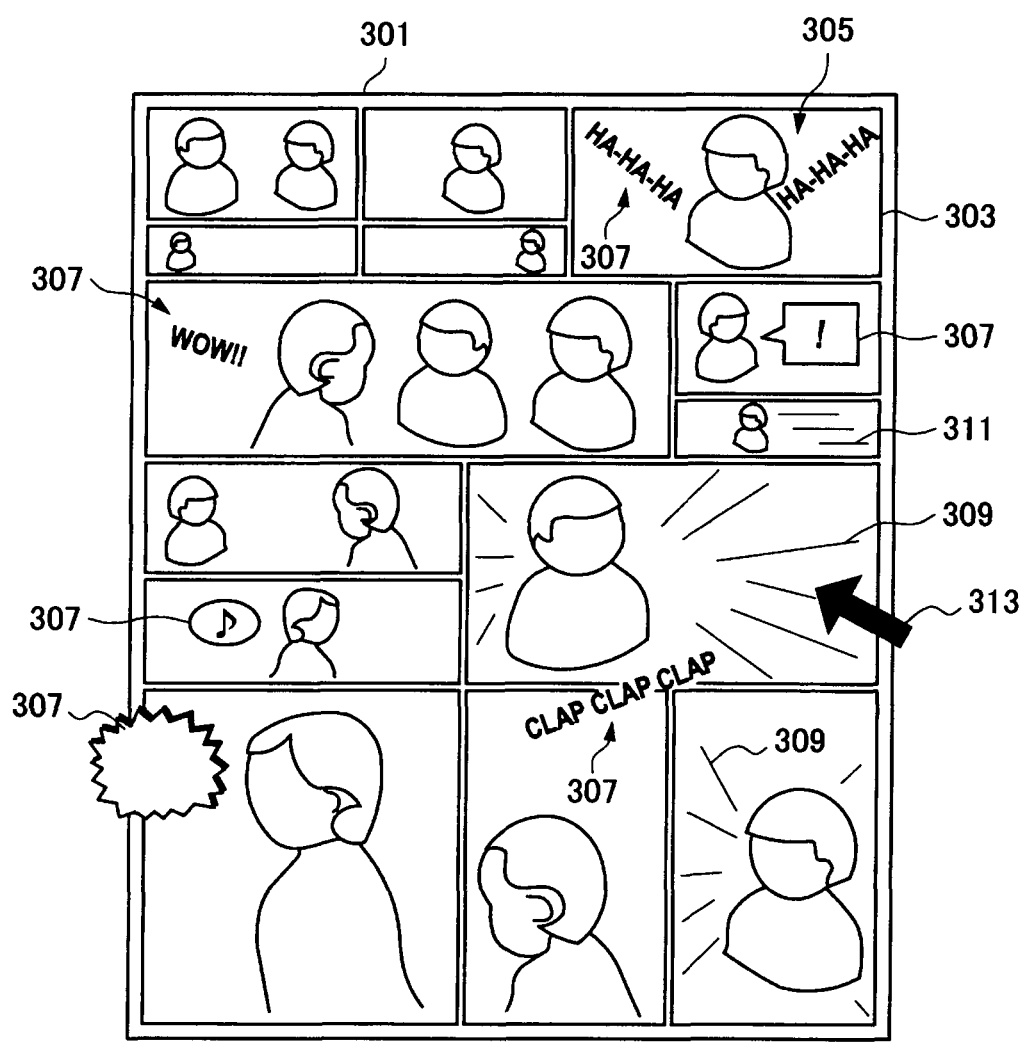
FIG. 1 is an explanatory diagram for illustrating comic-like representation of a moving picture according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) First Embodiment
   (1-1) Overview of comic-like representation
   (1-2) Configuration of information processing apparatus
   (1-3) Information processing method
   (1-4) First Variation
(2) Second Embodiment
   (2-1) Configuration of information processing apparatus
   (2-2) Information processing method
(3) Third Embodiment
   (3-1) Configuration of information processing apparatus
(4) Hardware configuration of information processing apparatus according to each embodiment of the present invention
(5) Summary

First Embodiment

Overview of Comic-Like Representation

First, before explaining the information processing apparatus and the information processing method according to the first embodiment of the present invention in detail, overview of comic-like representation of a moving picture according to the present embodiment will be described with reference to FIG. 1. FIG. 1 is an explanatory diagram for illustrating comic-like representation of a moving picture according to the present embodiment.

When a single or a plurality of moving picture data are specified, the information processing apparatus according to the present embodiment automatically extracts important scenes from a plurality of images included in the moving picture data. For example, the information processing apparatus converts the arrangement of the extracted images into a comic-like arrangement, and displays the extracted images, as shown in FIG. 1.

A display region 301 as shown in FIG. 1 will be considered. This display region 301 corresponds to a page of an ordinary comic. The display region 301 is divided into a plurality of frames 303. In each of the plurality of frames 303, an image (for example, a thumbnail image) 305 included in the moving picture data is arranged.

Screen effects such as various kinds of speech-balloons 307, radial lines 309, and effect lines 311 are automatically arranged on the thumbnail image 305 based on later-described moving picture metadata. The speech-balloons 307, the radial lines 309, the effect lines 311, and the like can be freely arranged in the frame 303 or outside of the frame 303 in the same manner as in an ordinary paper comic.

There may be a case where a user of the information processing apparatus wants to know what kind of scene a certain thumbnail image 305 is representing. In this case, the user operates an input apparatus arranged on the information processing apparatus such as a mouse and a keyboard to move a position selection object 313 such as a mouse pointer to the desired thumbnail image 305 so as to bring about a state called mouseover. In response, the information processing apparatus executes an animation for the thumbnail image 305 on which the position selection object 313 is positioned. The animation starts from a scene of the corresponding thumbnail image 305 in the frame.

In FIG. 1, only one display region 301 is shown. However, the size of the display region 301 may be changed in accordance with the size of the display screen and the like. Alternatively, a plurality of display regions 301 may be arranged in one display screen.

The information processing apparatus arranges images constituting the moving picture in order of time information associated with each image, and therefore, a user can easily understand the contents of the moving picture data in the same manner as he reads an ordinary comic. In addition, screen effects such as speech-balloons (hereinafter, also referred to as effects) are automatically arranged in accordance with the moving picture metadata associated with the thumbnail images, and therefore, a user can enjoy reviewing the contents of the moving picture data.

<Configuration of Information Processing Apparatus>

A configuration of the information processing apparatus capable of realizing the above-described comic-like representation of a moving picture will be hereinafter described in detail with reference to FIG. 2 to FIG. 22.

[Overall Configuration of Information Processing Apparatus]

Figure 2:
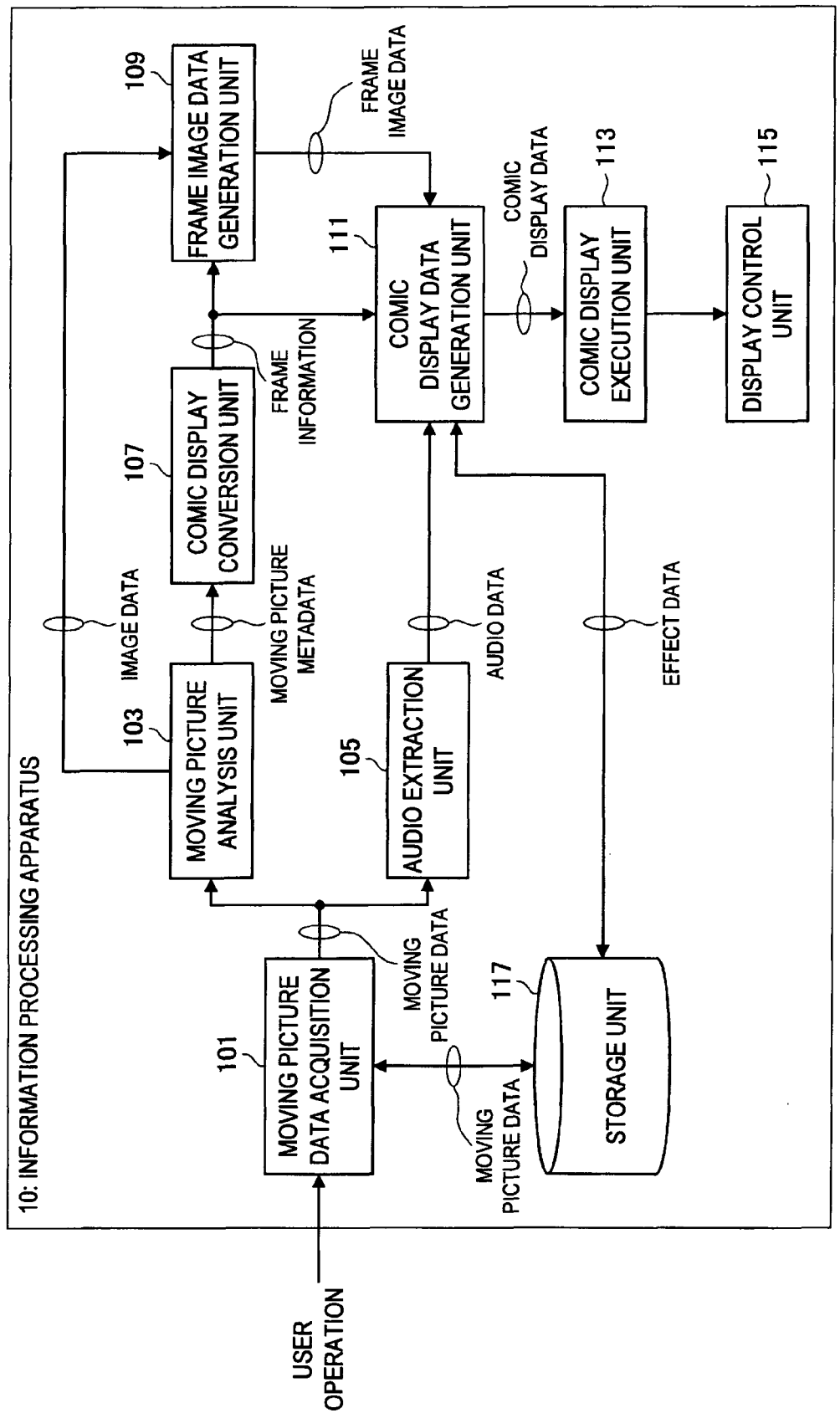
FIG. 2 is a block diagram for illustrating a configuration of an information processing apparatus according to the embodiment.

First, the overall configuration of the information processing apparatus according to the present embodiment will be described in detail with reference to FIG. 2. FIG. 2 is a block diagram for illustrating the configuration of the information processing apparatus according to the present embodiment.

For example, as shown in FIG. 2, the information processing apparatus 10 according to the present embodiment includes a moving picture data acquisition unit 101, a moving picture analysis unit 103, an audio extraction unit 105, a comic display conversion unit 107, a frame image data generation unit 109, and a comic display data generation unit 111. The information processing apparatus 10 further includes a comic display execution unit 113, a display control unit 115, and a storage unit 117. In addition to the above-described units, the information processing apparatus 10 may include, for example, a communication control unit (not shown) for controlling communication with any apparatus via any communication network.

The moving picture data acquisition unit 101 is constituted by, for example, a CPU (Central Processing Unit), a ROM (Read Only Memory), a RAM (Random Access Memory), a communication apparatus, and the like. The moving picture data acquisition unit 101 obtains moving picture data corresponding to a moving picture specified by a user from the later-described storage unit 117 and various kinds of recording media inserted into the information processing apparatus 10 and the like, in accordance with user operation performed toward the information processing apparatus 10. The moving picture data referred to herein means data of a moving picture including a plurality of images and audios associated with time information. Alternatively, the moving picture data acquisition unit 101 can obtain moving picture data from other apparatuses connected to the information processing apparatus 10, and can obtain moving picture data from various kinds of servers connected via a communication network such as the Internet and the like. The moving picture data acquisition unit 101 transfers the obtained moving picture data to the moving picture analysis unit 103 and the audio extraction unit 105, respectively.

The moving picture analysis unit 103 is constituted by, for example, a CPU, a ROM, a RAM, and the like. The moving picture analysis unit 103 analyses the transferred moving picture data and extracts feature quantities characterizing the moving picture. The moving picture analysis unit 103 generates moving picture metadata, i.e., metadata relating to the feature quantities by using the extracted feature quantities. The feature quantities are extracted for both of image data and audio data which constitute the moving picture data. The generated moving picture metadata include not only feature quantity metadata relating to the image data but also feature quantity metadata relating to the audio data. The moving picture analysis unit 103 transfers the generated moving picture metadata to the later-described comic display conversion unit 107. The moving picture analysis unit 103 can use not only the moving picture metadata generated by analyzing the moving picture but also metadata that can be obtained on an imaging apparatus such as a camcorder, as moving picture metadata to be used by the later-described comic display conversion unit 107. Herein, the metadata that can be obtained on an imaging apparatus includes, for example, a shooting being recorded and operation history of a favorite button, a zoom-in button, a zoom-out button, and the like. Further, the moving picture analysis unit 103 transfers to the later-described frame image data generation unit 109 the image data included in the moving picture data transferred from the moving picture data acquisition unit 101.

This moving picture analysis unit 103 will be described in detail later again.

The audio extraction unit 105 is constituted by, for example, a CPU, a ROM, a RAM, and the like. The audio extraction unit 105 extracts audio data from the moving picture data transferred from the moving picture data acquisition unit 101. When the audio extraction unit 105 extracts the audio data, the audio extraction unit 105 can reference a database and the like, relating to a format and the like of the moving picture data stored in the ROM, the storage unit 117, and the like. Further, the audio extraction unit 105 may perform a conversion processing such as compressing the extracted audio data as necessary. The audio extraction unit 105 transfers the extracted audio data to the later-described comic display data generation unit 111.

The comic display conversion unit 107 is constituted by, for example, a CPU, a ROM, a RAM, and the like. The comic display conversion unit 107 extracts a plurality of images from the moving picture data based on the moving picture metadata. The comic display conversion unit 107 also divides a predetermined display region into frames, and converts the arrangement of the extracted plurality of images into a comic-like arrangement. Further, the comic display conversion unit 107 generates frame information including information about the image arranged in each frame. The comic display conversion unit 107 transfers the generated frame information to the frame image data generation unit 109 and the comic display data generation unit 111, which are described later.

This comic display conversion unit 107 will be described in detail again in the below.

The frame image data generation unit 109 is constituted by, for example, a CPU, a ROM, a RAM, and the like. The frame image data generation unit 109 generates frame image data based on the image data transferred from the moving picture analysis unit 103 and the frame information transferred from the comic display conversion unit 107. More specifically, the frame image data generation unit 109 extracts frame images described in the frame information from the plurality of frame images constituting the moving picture. Further, the frame image data generation unit 109 enlarges or reduces the extracted frame image based on the information described in the frame information, thus makes the frame image into a thumbnail image corresponding to the size of the frame. Further, the frame image data generation unit 109 generates an image for animation reproduction based on the frame information. Then, the frame image data generation unit 109 transfers the generated frame image data (i.e., the thumbnail image data and the image data for animation reproduction) to the comic display data generation unit 111.

Figure 3:
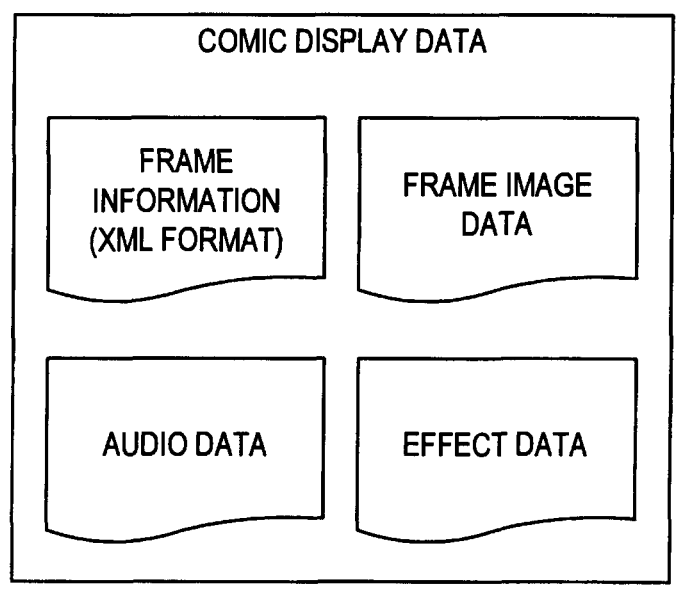
FIG. 3 is an explanatory diagram for illustrating comic display data.

The comic display data generation unit 111 is constituted by, for example, a CPU, a ROM, a RAM, and the like. The comic display data generation unit 111 generates comic display data by using the effect data obtained from the storage unit 117 and the like and various kinds of information transferred from the audio extraction unit 105, the comic display conversion unit 107, and the frame image data generation unit 109. For example, as shown in FIG. 3, the comic display data includes at least the frame information in, e.g., XML format, the frame image data, the audio data, and the effect data. The information processing apparatus 10 and other apparatuses can generate a comic display screen in various applications by reading and displaying the frame information in XML format.

Comic-like representation can be achieved in, for example, a standalone network application using Visual C++(registered trademark) and the like, an application for portable telephone such as Java Brew, and a browser application using Flash, JavaScript, and the like. For example, a generally-available web browser can display a comic display screen by using a Flash file (SWF file) with Action Script to read the frame information serving as arrangement information of comic images in XML.

When comic display data are generated with Flash, the contents can be represented more interactively, such that, e.g., the pages can be turned with a button or can be scrolled with a mouse wheel. When the frames are displayed with animation in chronological order, a user can smoothly review the contents having many frames without any confusion. When a user clicks a thumbnail image to reproduce audio, the degree of transparency may be increased in the frames other than the clicked frame, so that the frame currently reproduced can be emphasized in an easy-to-understand manner. As described above, when the frame information is output as a file in XML format, various applications including Flash can reference the frame information.

The comic display data generation unit 111 transfers the generated comic display data to the comic display execution unit 113. The comic display data generation unit 111 can also provide the generated comic display data to other information processing apparatuses via various recording media such as CD-ROM and DVD-ROM and via a communication network such as the Internet and the like.

The comic display execution unit 113 is constituted by, for example, a CPU, a ROM, a RAM, and the like. The comic display execution unit 113 can display, for example, a comic as shown in FIG. 1 by executing an application for executing the comic display data transferred from the comic display data generation unit 111. The application for executing the comic display data may be a dedicated application for executing comic display, or may be a generally-available application such as a web browser. The comic display execution unit 113 executes the comic display data to cause the comic to be displayed on a display unit (not shown in the figures) via the later-described display control unit 115.

The display control unit 115 is constituted by, for example, a CPU, a ROM, a RAM, and the like. The display control unit 115 obtains data, corresponding to the contents to be displayed on the display screen, recorded in the storage unit 117 and the like, and displays the obtained data on the display screen. When the display control unit 115 receives a signal representing a movement of the position selection object such as a mouse pointer from the input unit arranged on the information processing apparatus 10, the display control unit 115 displays the movement of the position selection object on the display screen in accordance with the received signal. When the comic display execution unit 113 requests the display control unit 115 to change the display content, the display control unit 115 changes the display content displayed on the display screen based on the request from the comic display execution unit 113.

The storage unit 117 stores moving picture data taken with a video camera, a portable telephone, and the like, and also stores various kinds of moving picture data, for example, moving picture contents such as TV contents. The storage unit 117 also stores object data to be displayed on the display screen. The object data referred to herein include, for example, any part constituting a graphical user interface (GUI) such as icons, buttons, and thumbnails.

The storage unit 117 may also store, as necessary, various databases or intermediate data and various parameters, which are saved when the information processing apparatus 10 according to the present embodiment performs a certain processing. This storage unit 117 can be freely read and written by the moving picture data acquisition unit 101, the moving picture analysis unit 103, the audio extraction unit 105, the comic display conversion unit 107, the frame image data generation unit 109, the comic display data generation unit 111, the comic display execution unit 113, the display control unit 115, and the like.

[Configuration of the Moving Picture Analysis Unit 103]

Figure 4:
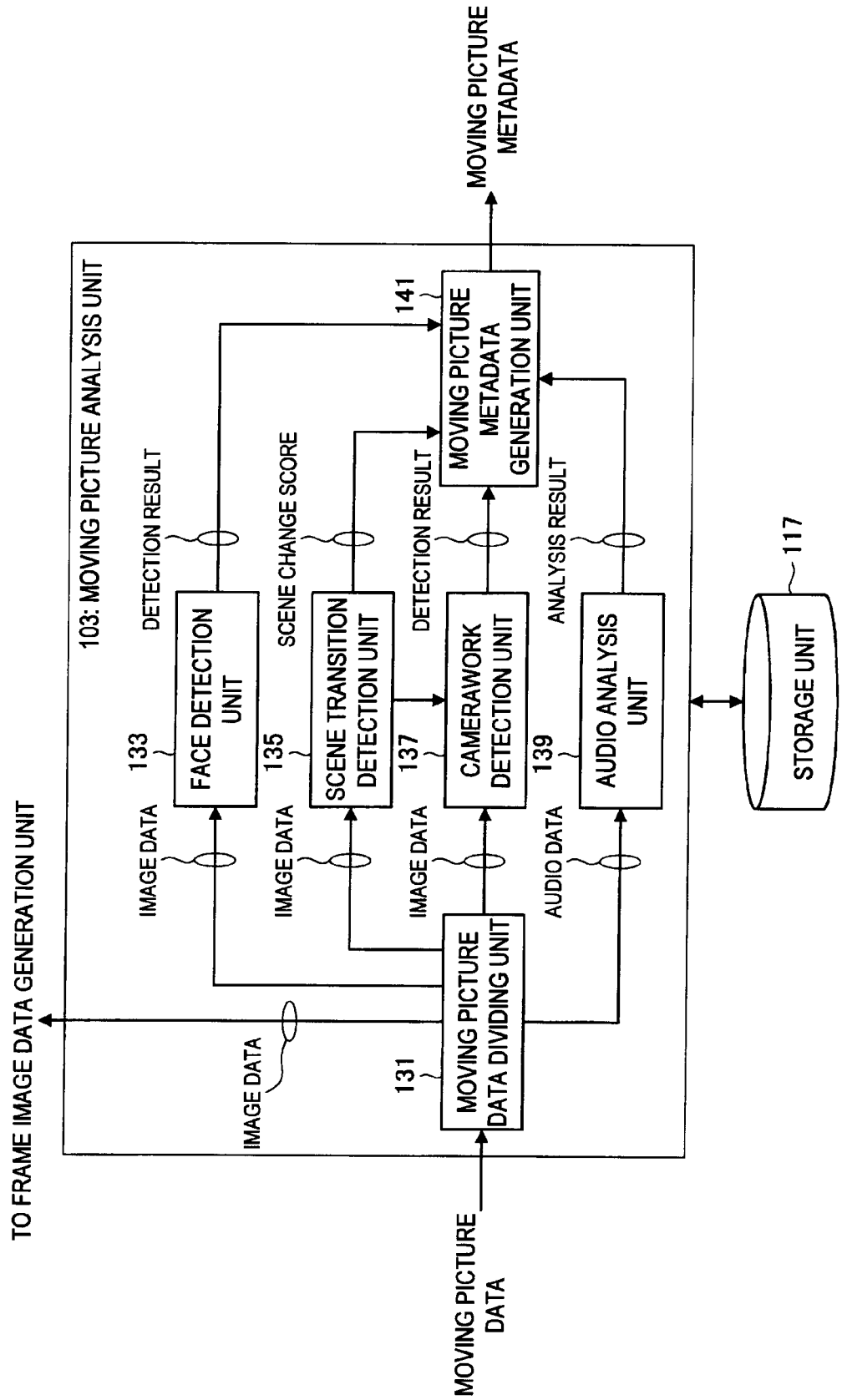
FIG. 4 is a block diagram for illustrating a configuration of a moving picture analysis unit according to the embodiment.
Figure 6:
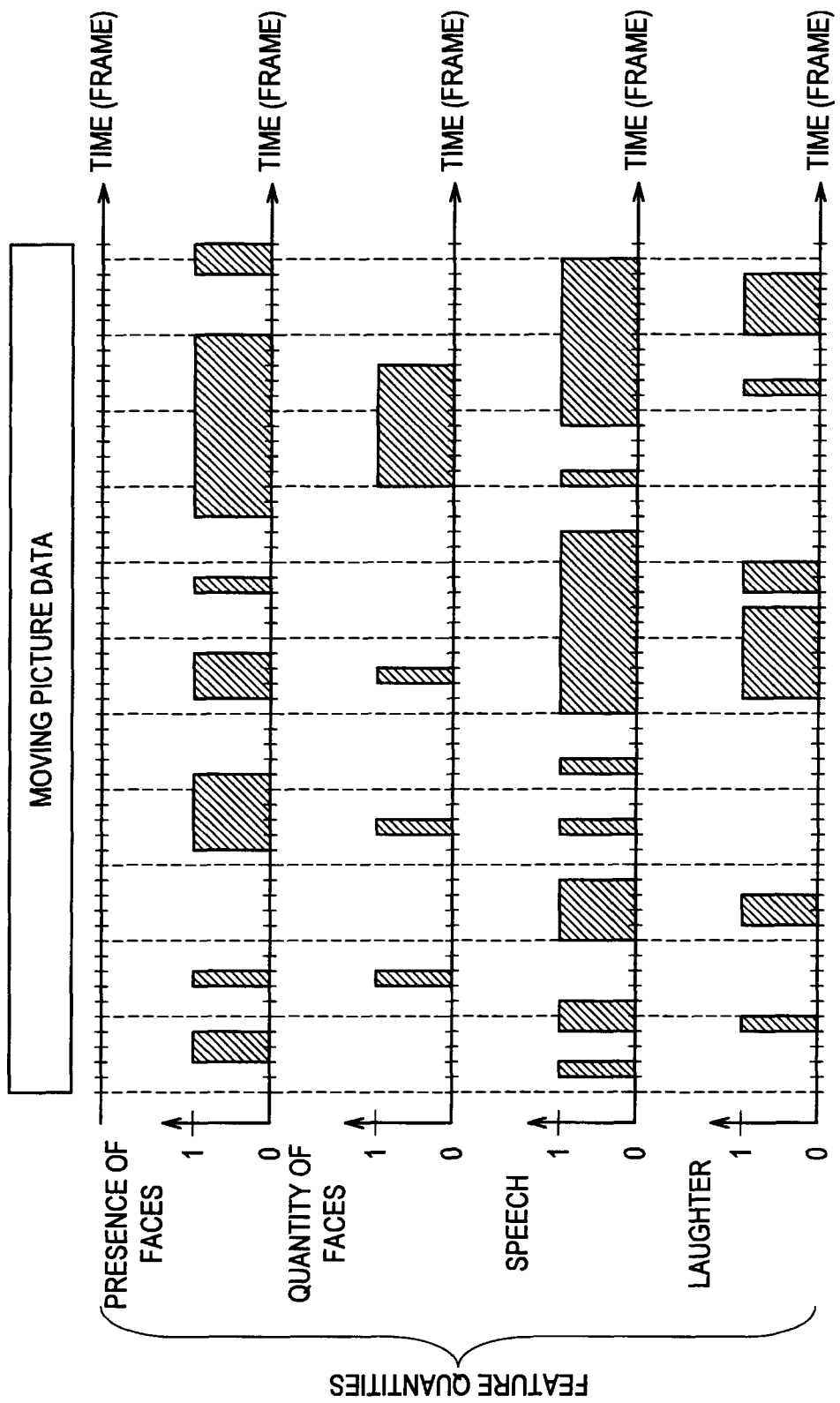
FIG. 6 is an explanatory diagram for illustrating moving picture metadata.

Subsequently, the configuration of the moving picture analysis unit 103 according to the present embodiment will be described in detail with reference to FIG. 4 to FIG. 6. FIG. 4 is a block diagram for illustrating the configuration of the moving picture analysis unit 103 according to the present embodiment. FIG. 5 and FIG. 6 are explanatory diagrams for illustrating the moving picture metadata.

For example, as shown in FIG. 4, the moving picture analysis unit 103 mainly includes a moving picture data dividing unit 131, a face detection unit 133, a scene transition detection unit 135, a camerawork detection unit 137, an audio analysis unit 139, and a moving picture metadata generation unit 141.

The moving picture data dividing unit 131 is constituted by, for example, a CPU, a ROM, a RAM, and the like. The moving picture data dividing unit 131 divides the moving picture data transferred from the moving picture data acquisition unit 101 into image data and audio data. The moving picture data dividing unit 131 transfers the obtained moving picture data to the frame image data generation unit 109, the face detection unit 133, the scene transition detection unit 135, and, the camerawork detection unit 137. The moving picture data dividing unit 131 also transfers the obtained audio data to the audio analysis unit 139.

The face detection unit 133 is constituted by, for example, a CPU, a ROM, a RAM, and the like. The face detection unit 133 detects a face of a person in each of the frame image constituting the moving picture. When a face of a person is present in a frame image, the face detection unit 133 further performs detections of various kinds of information relating to the face, such as the number of faces present in the image, whether the face is smiling or not, the position of the face, the direction of the face, and whether the face is zoomed. When the face detection unit 133 performs the above detections, the face detection unit 13 may reference, for example, a detection database and the like previously stored in the storage unit 117 and the like, and may execute a detection program and the like.

Among the above detections results, for detection results of items such as whether the face is present, whether the face is smiling, and whether the face is zoomed or not can be represented by two values, i.e., "yes/no", the face detection unit 133 outputs a value "1" in a case of "yes" and outputs a value "0" in a case of "no". For items such as the direction of the face and the number of faces present in the image, the face detection unit 133 may output the detection results as it is, or may output a detection result which was converted into a value in accordance with a predetermined conversion method.

The face detection unit 133 transfers these detection results to the later-described moving picture metadata generation unit 141.

The scene transition detection unit 135 is constituted by, for example, a CPU, a ROM, a RAM, and the like. The scene transition detection unit 135 determines whether a scene transition occurs in each of the frame images constituting the moving picture, and outputs the detection result as a value called a scene change score. The scene change score is a numerical value representing how far the frame image of interest differs from the previous frame image. In other words, the scene change score represents a degree of similarity between the frame image of interest and the previous frame image. This scene change score may be defined with, for example, color histogram. When the scene transition detection unit 135 performs the above detection, the scene transition detection unit 135 may reference, for example, a scene transition detection database and the like previously stored in the storage unit 117 and the like, and may execute a detection program and the like.

The scene transition detection unit 135 transfers the obtained scene change score to the later-described moving picture metadata generation unit 141.

The camerawork detection unit 137 is constituted by, for example, a CPU, a ROM, a RAM, and the like. The camerawork detection unit 137 detects a camerawork of each of the frame images constituting the moving picture. The camerawork represents how an imaging apparatus such as a video camera is moved when taking the moving picture. More specifically, for example, the camerawork detection unit 137 compares the frame image of interest and the previous frame image to detect the direction in which the imaging apparatus moved and detects the distance the imaging apparatus moved. In this occasion, the camerawork detection unit 137 may perform the detection processing of the camerawork based on the detection result of the scene transition detection unit 135. The camerawork detection unit 137 may reference, for example, a camerawork detection database previously stored in the storage unit 117 and the like, and may execute a detection program and the like.

Here, the movement distance of the imaging apparatus can be represented by, for example, the number of pixels of the image having moved between the frames. Examples of the camerawork thus detected include, for example, fix, pan, tilt, roll, zoom in, zoom out, and the like. Here, the fix means the moving picture is taken with the imaging apparatus being fixed. The pan (Panoramic Viewing) means that the moving picture is take with the imaging apparatus being moved in a horizontal direction. The tilt means that the moving picture is take with the imaging apparatus being moved in a vertical direction. The roll means that the moving picture is take with the imaging apparatus being rotated around an axis.

The camerawork detection unit 137 transfers the above detection result of camerawork to the later-described moving picture metadata generation unit 141.

The audio analysis unit 139 is constituted by, for example, a CPU, a ROM, a RAM, and the like. The audio analysis unit 139 analyzes the audio data transferred from the moving picture data dividing unit 131 and calculates feature quantities relating to the audio data related to the moving picture. More specifically, the audio analysis unit 139 analyzes whether the following sounds are present in the audio data associated with each of the frame images constituting the moving picture. In other words, the audio analysis unit 139 performs a classification processing on the audio data so as to determine whether a sound is a speech, a laughter, a cheering such as "wow", a clapping sound (onomatopoeia) such as "bang", an applause such as clapping sound, and music. This classification processing on the audio data can be executed by referencing, for example, an audio analysis database and the like previously stored in the storage unit 117 and the like and executing an audio analysis program and the like.

For example, the audio analysis unit 139 may also analyze the volume of the sound data, and may, for example, quantify the volume and output it as a numerical value. When the audio data includes a sound made by a person such as a speech and a laughter, the audio analysis unit 139 may also perform an analysis to determine whether the sound is made by a male, a female, a child, and the like. The above analyses can be performed by referencing, for example, a spectrum representing the audio and analyzing the amplitude of a corresponding waveform, the frequency of audio data, and the like.

The audio analysis unit 139 transfers the above analysis results to the moving picture metadata generation unit 141.

The moving picture metadata generation unit 141 is constituted by, for example, a CPU, a ROM, a RAM, and the like. The moving picture metadata generation unit 141 collects the detection results and the analysis results transferred from the face detection unit 133, the scene transition detection unit 135, the camerawork detection unit 137, the audio analysis unit 139, and the like, and generates the moving picture metadata relating to the feature quantities characterizing the moving picture.

FIG. 5 shows an example of the detection results and the analysis results included in the moving picture metadata which is generated by the moving picture metadata generation unit 141. As shown in FIG. 5, the moving picture metadata includes the metadata relating to the feature quantities extracted from the image data and the metadata relating to the feature quantities extracted from the audio data. FIG. 6 illustrates the feature quantities relating to "whether there is a face", "the quantity of faces", "whether there is a speech", "whether there is a laughter" of the plurality of feature quantities included in the moving picture metadata. In FIG. 6, each value of the feature quantities is represented in a graph. In each of the graphs shown in FIG. 6, the abscissa represents a time associated with the moving picture data or numbers attached to the frame images constituting the moving picture, and the ordinate represents the feature quantities. FIG. 6 shows a case where each feature quantity is either one or zero, but the present embodiment can be applied in the same manner even when each feature quantity is a continuous value between 0 and 1.

As shown in FIG. 6, in the moving picture metadata, the values of the respective feature quantities are individually described in the chronological order for all of the images constituting the moving picture and for the audios associated with the images. The moving picture metadata may not necessarily be in a form of the graph shown in FIG. 6. The moving picture metadata may be in a form of a table describing the feature quantities, in which each column represents a number attached to a frame image constituting the moving picture.

The moving picture metadata generation unit 141 transfers the moving picture metadata thus generated to the comic display conversion unit 107.

The above analysis methods performed by the processing units are merely examples. The present embodiment is not limited to the above examples. The moving picture analysis unit 103 may include various analysis units other than the above processing units in accordance with the moving picture metadata to be generated.

[Configuration of the Comic Display Conversion Unit 107]

Figure 7:
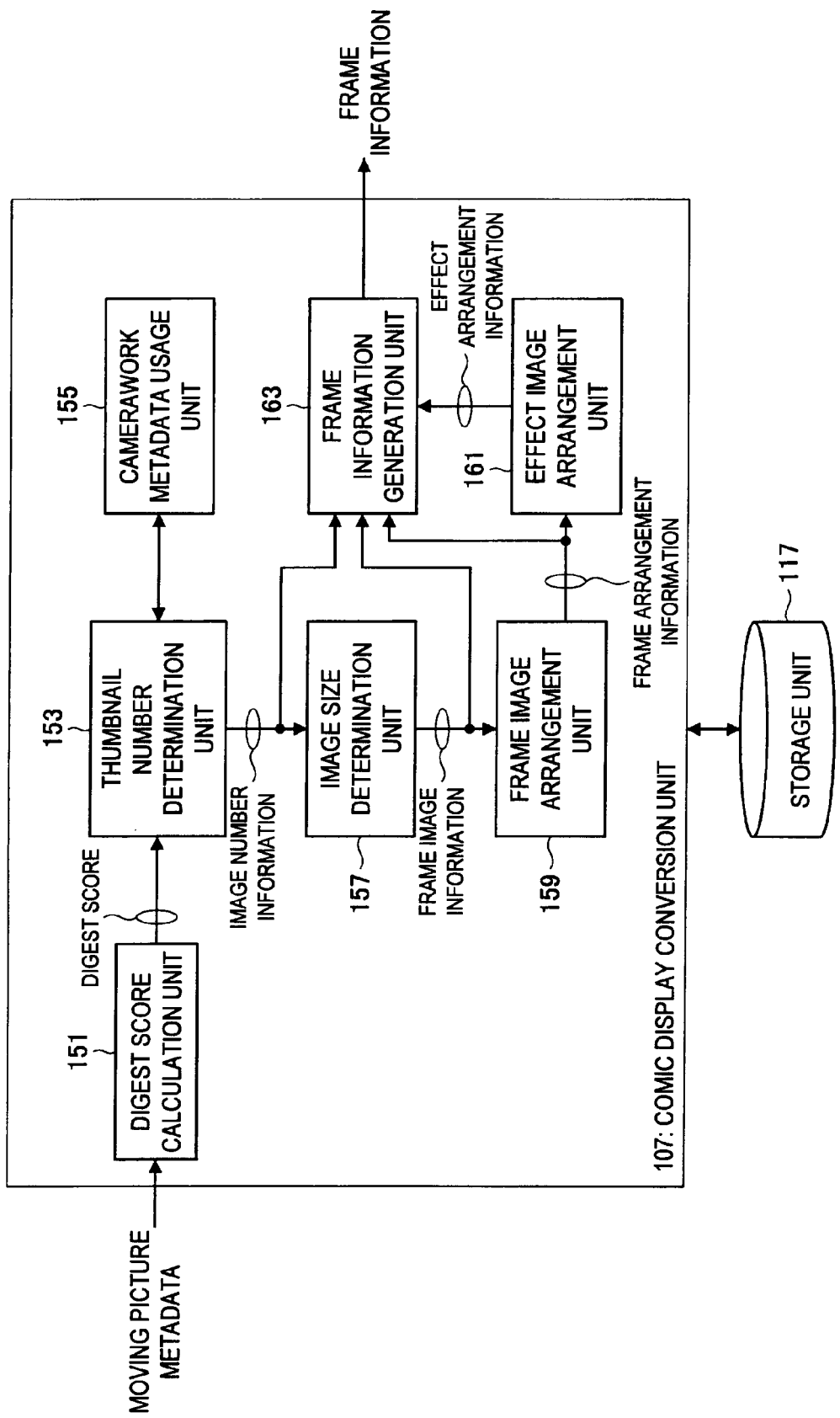
FIG. 7 is a block diagram for illustrating a configuration of a comic display conversion unit according to the embodiment.

Next, the configuration of the comic display conversion unit 107 according to the present embodiment will be described in detail with reference to FIG. 7 to FIG. 22. First, the entire configuration of the comic display conversion unit 107 will be described in detail with reference to FIG. 7. FIG. 7 is a block diagram for illustrating the configuration of the comic display conversion unit 107 according to the present embodiment.

For example, as shown in FIG. 7, the comic display conversion unit 107 includes a digest score calculation unit 151, a thumbnail number determination unit 153, a camerawork metadata usage unit 155, an image size determination unit 157, a frame image arrangement unit 159, and an effect image arrangement unit 161. The comic display conversion unit 107 further includes the frame information generation unit 163 for collecting various kinds of information generated by the above processing units and for generating frame information.

The digest score calculation unit 151 is constituted by, for example, a CPU, a ROM, a RAM, and the like. For each of the plurality of images constituting the moving picture, the digest score calculation unit 151 calculates a digest score (which may be hereinafter abbreviated as DS), i.e., a value obtained by weighting and adding the plurality of feature quantities, based on the transferred moving picture metadata.

Figure 8:
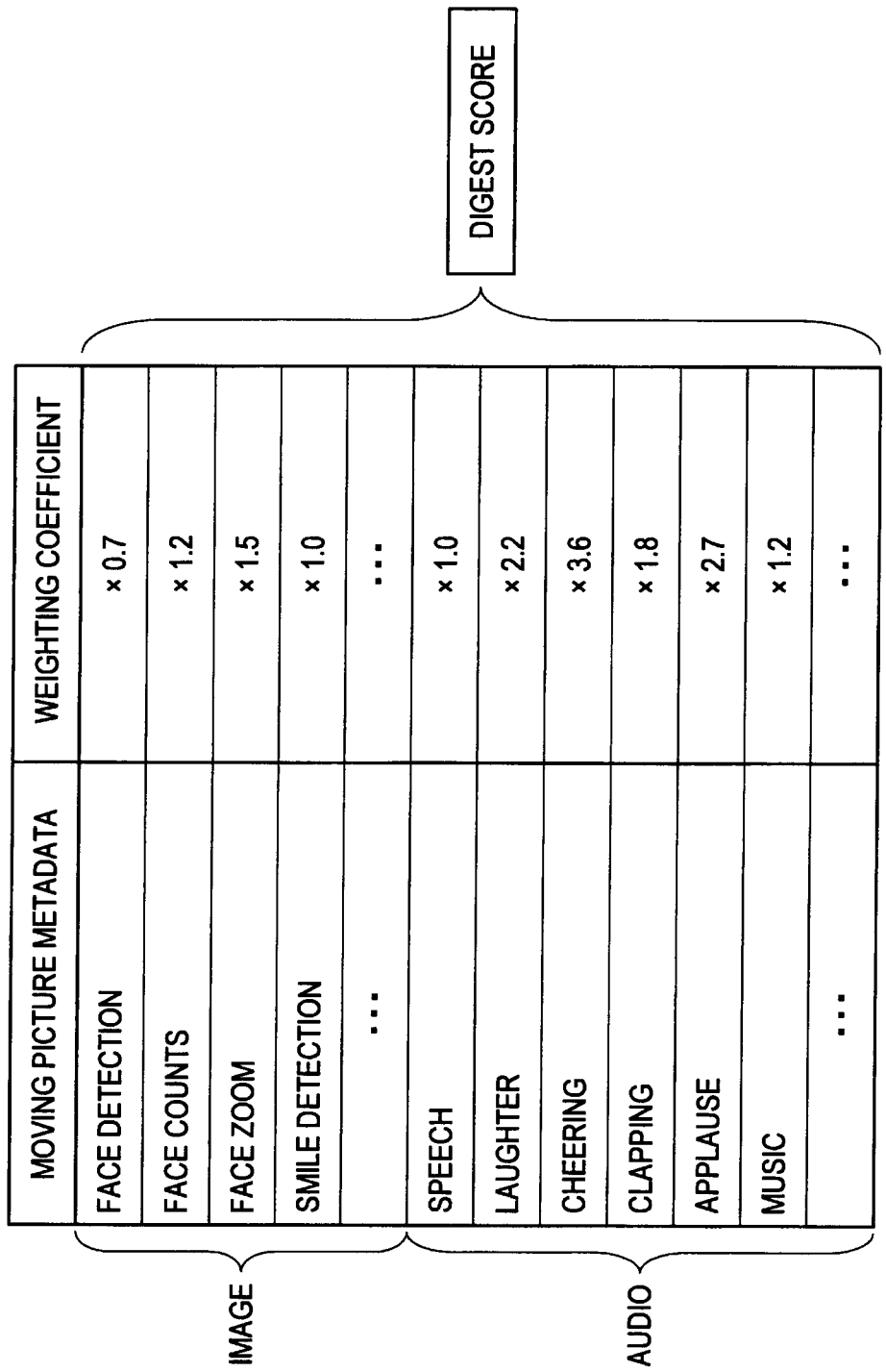
FIG. 8 is an explanatory diagram for illustrating a method for calculating digest scores according to the embodiment.

For example, as shown in FIG. 8, weighting coefficients are set for the feature quantities in the moving picture metadata used for calculating the digest scores. In FIG. 8, for example, a feature quantity Face relating to whether there is a face or not is set to a weighting coefficient 0.7, and a feature quantity FaceCounts relating to quantity of faces is set to a weighting coefficient 1.2. A feature quantity FaceZoom relating to whether a face is zoomed is set to a weighting coefficient 1.5, and a feature quantity FaceSmile relating to whether a face is smiling is set to a weighting coefficient 1.0.

Further, not only the above moving picture metadata relating to the image data but also the moving picture metadata relating to the audio data are set to weighting coefficients in the same manner. For example, in FIG. 8, a feature quantity Speech relating to whether there is a speech is set to a weighting coefficient 1.0, and a feature quantity Laughter relating to whether there is a laughter is set to a weighting coefficient 2.2. A feature quantity Cheering relating to whether there is a cheering is set to a weighting coefficient 3.6, and a feature quantity Clapping sound relating to whether there is a clapping sound is set to a weighting coefficient 1.8. A feature quantity Applause relating to whether there is an applause is set to a weighting coefficient 2.7, and a feature quantity Music relating to whether there is music is set to a weighting coefficient 1.2.

The digest score DS is calculated using these weighting coefficients and the feature quantities included in the moving picture metadata. The digest score DS is calculated by respectively multiplying the feature quantities by their weighting coefficients and adding all of the weighted feature quantities for use in calculation of DS.

The weighting coefficients shown in FIG. 8 represent how far each feature quantity contributes to make the video scene exciting. In the example of FIG. 8, the weighting coefficient of the feature quantity relating to whether a face is zoomed, the weighting coefficient of the feature quantity relating to whether there is a laughter, the weighting coefficient of the feature quantity relating to whether there is a cheering, the weighting coefficient of the feature quantity relating to whether there is a clapping sound, and the weighting coefficient of the feature quantity relating to whether there is an applause are set to relatively large values. This is based on an empirical rule that a video scene with a sound and a video scene in which a person is zoomed are more likely to be "interesting" or "exciting". Alternatively, parameters obtained through statistical learning may be used as weighting coefficients, or a user may be allowed to input and set the weighting coefficients. Further, these weighting coefficients may be updated in response to feedbacks from users.

As described above, various moving picture metadata are weighted, and a scene having a wide variety of features can be extracted as an exciting scene. The exciting scenes can be automatically detected so as to reflect the features of the moving picture.

The digest score calculation unit 151 can transfer the digest score DS thus calculated to the later-described thumbnail number determination unit 153.

The thumbnail number determination unit 153 is constituted by, for example, a CPU, a ROM, a RAM, and the like. The thumbnail number determination unit 153 extracts thumbnail images to be arranged in frames from the plurality of images constituting the moving picture data and determines the number of thumbnail images based on the transferred digest score. The extraction method of thumbnail images will be hereinafter described in detail with reference to FIG. 9.

Figure 9:
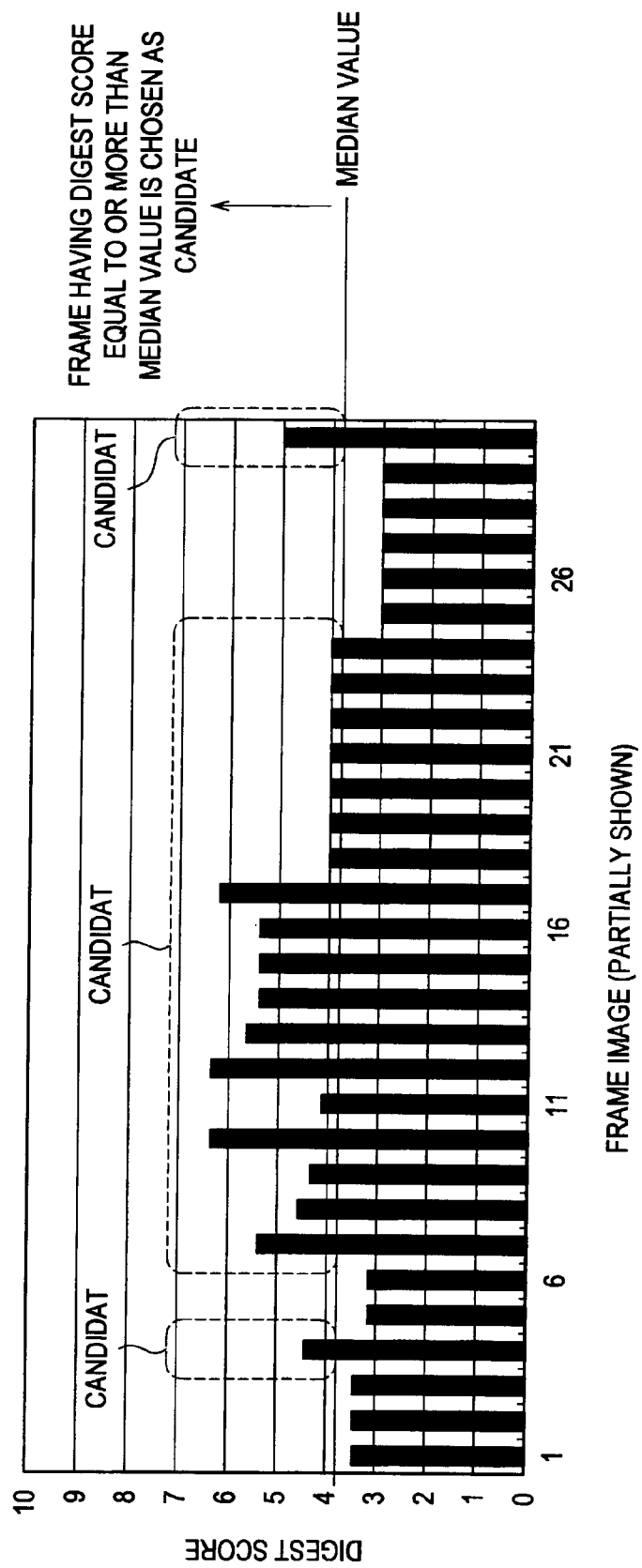
FIG. 9 is an explanatory diagram for illustrating a method for extracting representing frame images according to the embodiment.

As described above, the digest score calculation unit 151 calculates the digest scores for all of the frame images constituting the moving picture. Then, the thumbnail number determination unit 153 calculates a distribution of the digest scores in all of the frame images constituting the moving picture, and calculates a median value (Median) of the digest scores of the moving picture data of interest. Thereafter, for example, as shown in FIG. 9, the thumbnail number determination unit 153 extracts the frame images having digest scores equal to or more than the calculated median value as candidates for the thumbnail images. When the candidates of the thumbnail images are extracted in this way, it is possible to extract exciting scenes while cutting frame images which have low digest scores and are considered not to be exciting.

How the thumbnail number determination unit 153 employs frames for thumbnail images from among the frame images having digest scores equal to or more than the median value will be hereinafter specifically described in the order of steps. In this occasion, if the frame the thumbnail number determination unit 153 simply employs all of the frame images having digest scores equal to or more than the median value, a large amount of frames of similar images are lined up, which causes an issue in that the arrangement of frames become monotonous. Alternatively, if the frame the thumbnail number determination unit 153 simply employs the frame images in descending order of the digest score, large frames of similar sizes are lined up, which may not achieve dynamic frame arrangement. Therefore, in order to avoid such circumstances, the thumbnail images are selected as follows.

First, the thumbnail number determination unit 153 determines whether the scene change score included in the moving picture metadata is equal to or more than a predetermined threshold value. When the scene change score is large, the scene is considered to have changed to another scene, and the change in the scene can be detected. When the scene change score is more than the threshold value, the thumbnail number determination unit 153 recognizes that the picture is blurry because the camera has moved much, and does not employ the image as a thumbnail image and removes the image. In particular, in private video contents, the scene change score tends to increase rapidly when the camera moves rapidly. An image taken in such occasion is usually blurry and not good, and therefore, such image is not employed as a thumbnail image.

Next, the thumbnail number determination unit 153 calculates the distribution and the median value of the digest scores. As described above, the median value is used to determine whether a frame image is to be employed as a thumbnail image or not.

When the number of frame images as candidate for thumbnail image is equal to or more than a predetermined setting value m, the thumbnail number determination unit 153 sets a threshold value T=the median value. When the number of frame images as candidate for thumbnail image is less than the setting value m, the thumbnail number determination unit 153 sets the threshold value T=the smallest digest score. It should be noted that the above setting value may be set to, for example, about 100. This processing is performed to prevent the number of displayed frames from being too small when a reproduction time is very short.

Subsequently, the thumbnail number determination unit 15 determines not to employ candidates having the same digest score successively or having digest scores less than T. This processing is performed to avoid the situation where frames having high digest scores are employed as exciting scenes and frames having the same degree of excitement in the same scene are employed successively. If frames having the same degree of excitement appear successively, similar frames of the same size are lined up successively, which give a monotonous impression. Therefore, such frames are not employed.

Thereafter, the thumbnail number determination unit 153 calculates the total number of the employed frame images, and performs a skipping processing when this total number is equal to or more than a predetermined threshold value. The threshold value used here is determined in accordance with the number of pages to be displayed. From among the employed frames, only the frames that can fit in the page are employed as thumbnail images. For example, the thumbnail number determination unit 153 may sort the frame images in descending order of the digest score and skip the frame images at a constant interval. Thereby, the skipping processing can be performed while maintaining the distribution of the digest scores.

Finally, the thumbnail number determination unit 153 performs the skipping processing in a case where frames having small digest scores appear successively. When similar small frames appear successively in the comic-like display of the moving picture, the arrangement of the frames is orderly, which gives a very monotonous impression. Since a small frame tends to have a small digest score, the arrangement of the frames can be made more comic-like by preferentially skipping such frames. The thumbnail number determination unit 153 employs the frame images still remaining after the above screening as frames in the comic display (namely, thumbnail images). Hereinafter, these thumbnail images may be referred to as representing frames (or representing frame images).

Figure 10:
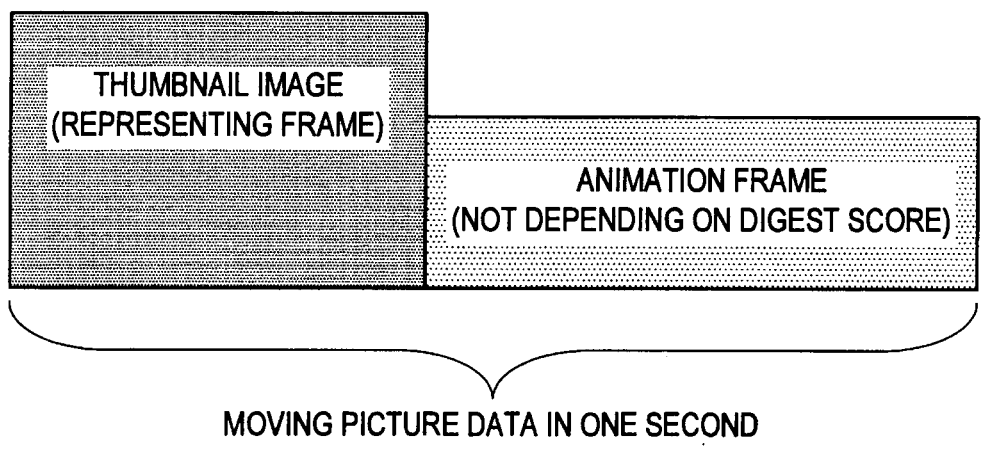
FIG. 10 is an explanatory diagram for illustrating animation frame images according to the embodiment.

When the thumbnail number determination unit 153 selects the frame images to be uses as the thumbnail images as described above, the thumbnail number determination unit 153 subsequently selects images to be uses for animation of thumbnail images in frames (which may be hereinafter referred to as animation frame images). More specifically, as shown in FIG. 10, the thumbnail number determination unit 153 extracts frame images connected to each of the extracted thumbnail images (representing frame images) for a predetermined time as animation frame images. When the animation frame images are extracted, the magnitude of the digest score is not taken into consideration. "The predetermined time", for which the frame images are extracted, may be set to any value. For example, the predetermined time may be set to such a value that the animation including the representing frames lasts about one second. For example, when the frame rate of the moving picture data is 30 FPS (Frames Per Second), the number of frame images for one second is about 30 frames.

The thumbnail number determination unit 153 sets image number information, i.e., information about the number of the thumbnail images (representing frames) extracted as described above and the number of thumbnail images, and information about animation frame images. Herein, the information about the thumbnail images and the number of the thumbnail images describes, for example, what numbers of the frame images from the first in the moving picture frame are selected as the thumbnail images and how many thumbnail images there are in total. The thumbnail number determination unit 153 transfers this image number information to the image size determination unit 157 and the frame information generation unit 163, which will be described later.

In the above explanation, a case where the thumbnail number determination unit 153 selects the animation frame images for the preset time has been described. Alternatively, the number of selected animation frame images can be dynamically changed using the feature quantities about camerawork included in the moving picture metadata. This processing is executed by, for example, the later-described camerawork metadata usage unit 155.

The camerawork metadata usage unit 155 is constituted by, for example, a CPU, a ROM, a RAM, and the like. The camerawork metadata usage unit 155 determines, based on the moving picture metadata about camerawork, the number of images extracted as the animation frame images by the thumbnail number determination unit 153.

Before explaining the camerawork metadata usage unit 155, what will happen if the animation frame images are selected without taking camerawork into consideration will be briefly described first.

For example, as shown in FIG. 1, the animation (thumbnail animation), which is started when the position selection object such as a mouse pointer is positioned on the image, is useful for understanding the contents of the entire moving picture, and can also be used as an index or a summary of the contents of the moving picture. However, when the animation is simply reproduced without taking the camerawork into consideration, a major change on the screen caused by a large movement of the camera makes it difficult for a user to see the screen (frame) because the screen (frame) is small. As a result, the animation may possibly appear unnaturally. When the image rapidly changes (for example, the case where the image shown on the screen quickly changes from one person to another person), the story of the animation, serving as a summary of the contents of the moving picture, may become inconsistent. When the animation is simply reproduced, the animation may appear monotonous. Therefore, there is a need for a technique, for example, for cutting cut a portion of the animation where the camera moves largely and fur switching reproduction in response to a scene change. In the present embodiment, the camerawork metadata usage unit 155 as described below is provided to enable selecting the animation frame images taking camerawork into consideration.

The camerawork metadata usage unit 155 receives the image number information from the thumbnail number determination unit 153. The camerawork metadata usage unit 155 calculates an integration value of camerawork based on the feature quantities relating to camerawork described in the moving picture metadata relating to the animation frame images described in the image number information. Herein, there are two kinds of the integration value of camerawork, i.e., an integration value obtained by integrating absolute values of camerawork and an integration value obtained by integrating values of camerawork itself (without taking camerawork into consideration). In the present embodiment, both of the above two kinds of camerawork can be used. The integration value of absolute values of camerawork means a total distance the camera moves. When the integration value is used without taking absolute values into consideration, the integration value of camerawork returns back to zero when the camera returns back to the original position or the original direction before the movement, which makes it impossible to evaluate the amount of camerawork based on other than a relative value with respect to the initial position. However, the integration value used without taking absolute values into consideration has an advantage in that it is tolerant to camera shakes and noises. In contrast, an integration value of absolute values of camerawork may be affected by hand shakes and noises, but always increases regardless of to which direction the camera moves, thus being advantageous in that the integration value can be easily evaluated based on the total movement distance of the camera.

Figure 11B:
FIG. 11B is an explanatory diagram for illustrating the camerawork metadata usage unit according to the embodiment.
Figure 11A:
FIG. 11A is an explanatory diagram for illustrating a camerawork metadata usage unit according to the embodiment.

The camerawork metadata usage unit 155 determines the number of the animation frame images by using the calculated integration value of camerawork and a preset threshold TH. Hereafter, the method used by the camerawork metadata usage unit 155 for determining the number of the animation frame images will be described in detail with reference to FIG. 11A and FIG. 11B. FIG. 11A and FIG. 11B show the method for determining the number of the animation frame images by using the integration value of absolute values of camerawork. When the integration value of camerawork is used without taking absolute values into consideration, the integration value may be a negative value, and therefore, the number of images can be determined by setting positive and negative thresholds TH so that their absolute values become equal (namely, by setting the thresholds +TH and −TH).

For example, as shown in FIG. 11A and FIG. 11B, the camerawork metadata usage unit 155 detects i frames in which the integration value of absolute values of camerawork is equal to or more than the predetermined threshold TH, and divides the section from zero to i with a predetermined setting value n into n equal parts. Thereafter, the camerawork metadata usage unit 155 selects the animation frame images by using a value of i/n. For example, in FIG. 11A and FIG. 11B, where an origin point 0 is the position of the representing frame, frame images having frame numbers closest to (i/n), 2×(i/n), . . . , n×(i/n)=i are selected as the animation frame images.

Herein, the setting value n is determined in accordance with the integration value of camerawork so as to correspond to the number of the animation frame images. For example, n is set such that n=2 to 12, and n is set such that n=2, 4, 8, 12 and the like in accordance with the integration value. More specifically, when the integration value of camerawork is large, n is set to a small value. When the integration value of camerawork is small, n is set to a large value. The setting value n may be determined by any method using the integration value of camerawork. For example, the setting value n may be determined based on the following criteria. In the below, FPS represents the frame rate of the moving picture data.

(1) n=2, where integration value of camerawork>(0.1× FPS×2)

(2) n=4, where (0.1×FPS×2)≧integration value of camerawork>(0.1×FPS×1)

(3) n=8, where (0.1×FPS×1)≧integration value of camerawork>(0.1×FPS×0.5)

(4) n=12, where (0.1×FPS×0.5)≧integration value of camerawork

As described above, the setting value n corresponding to the number of the animation frame images is determined, so that the animation frame images can be dynamically determined according to whether camerawork is large or small. In other words, in a case where camerawork is relative small as shown in FIG. 11A, the integration value of camerawork does not reach the threshold TH easily. Therefore, the number of frames tends to be a value close to 30 at the time when the integration value of camerawork reaches the threshold TH. In a case where the integration value of camerawork is relatively small, the setting value n is set to a large value, and therefore, many images are selected from a relatively large section from 0 to i. In a case where the images are taken with small camerawork, the images hardly change. Therefore, the animation can be reproduced more smoothly by increasing the number of the animation frame images.

In contrast, in a case where camerawork is relative large as shown in FIG. 11B, the integration value of camerawork easily reaches the threshold TH. Therefore, the value i tends to be a small value at the time when the integration value of camerawork reaches the threshold TH. In a case where the integration value of camerawork is relatively large, the setting value n is set to a small value, and therefore, a few images are selected from a relatively small section from 0 to i. In a case where the images are taken with large camerawork, the images change greatly. Therefore, proximate frame images (namely, images of a high degree of similarity) can be selected by decreasing the number n of the animation.

Further, the camerawork metadata usage unit 155 sets a reproduction speed of the animation including the thumbnail images and the animation frame images in accordance with the magnitude of the integration value of camerawork. More specifically, when the number of the selected animation frame images is large, the camerawork metadata usage unit 155 sets the reproduction speed to a large value so as to reproduce the animation at a fast speed. When the number of the selected animation frame images is small, the camerawork metadata usage unit 155 sets the reproduction speed to a small value so as to reproduce the animation at a slow speed. In particular, for example, the reproduction speed of the animation is set as follows.

(1) reproduction speed=1 (FPS), where the number of animation images (n) is 2 or less (2) reproduction speed=2 (FPS), where the number of animation images (n) is more than 2 but 4 or less (3) reproduction speed=8 (FPS), where the number of animation images (n) is more than 4 but 8 or less (4) reproduction speed=24 (FPS), where the number of animation images (n) is more than 8

The camerawork metadata usage unit 155 can employ similar frame images from among the plurality of candidate animation frame images by performing the processings as described above, thus being able to prevent a sudden scene change and being able to generate a natural animation.

Next, the image size determination unit 157 will be described with reference back to FIG. 7. The image size determination unit 157 is constituted by, for example, a CPU, a ROM, a RAM, and the like. The image size determination unit 157 determines the size of the thumbnail image placed in the predetermined display region based on the digest scores.

Figure 12:
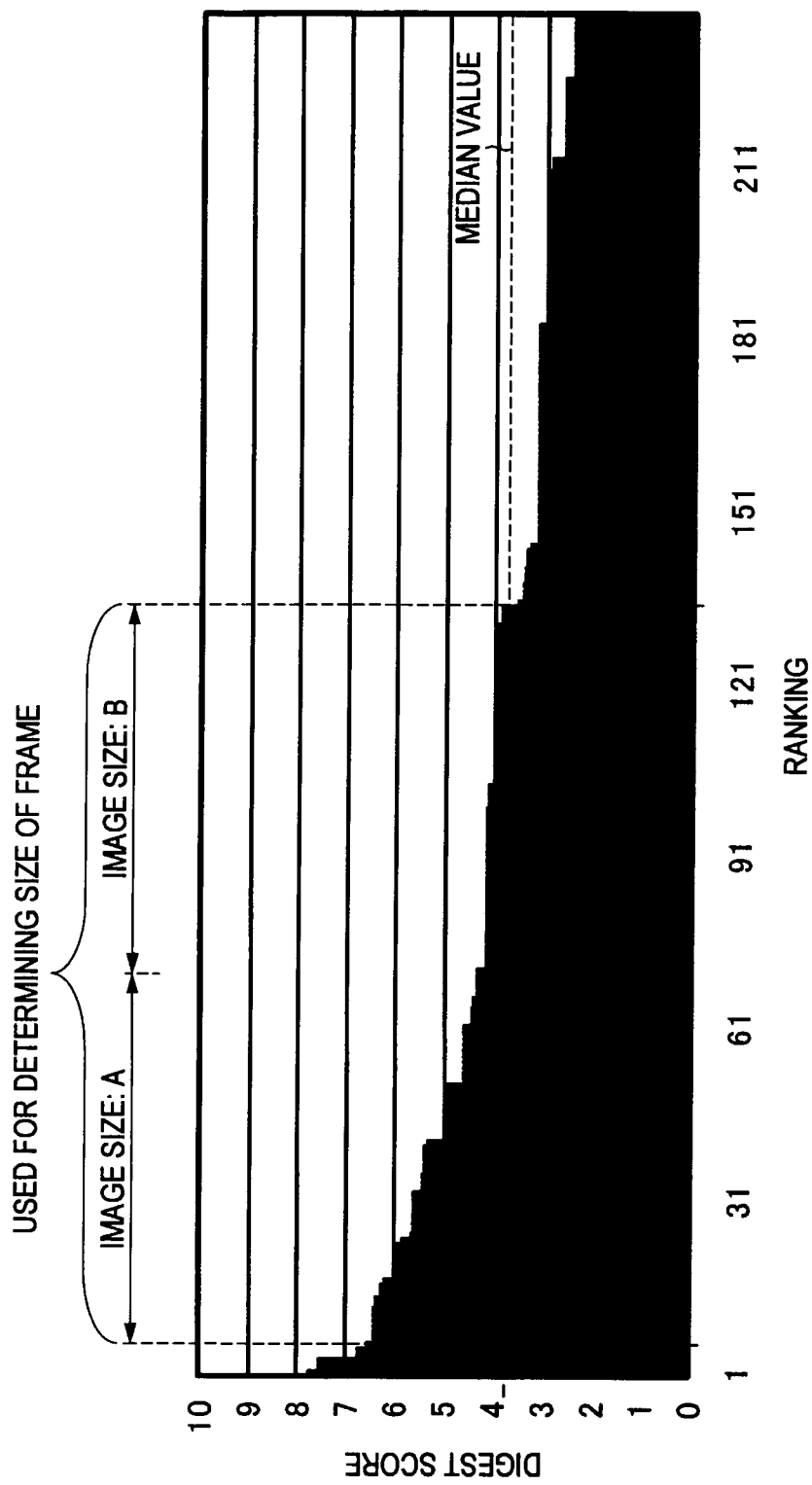
FIG. 12 is an explanatory diagram for illustrating an image size determination unit according to the embodiment.

More specifically, for example as shown in FIG. 12, the image size determination unit 157 sorts all of the images constituting the moving picture in descending order of the digest score. Then, the image size determination unit 157 determines not to use images having the top several percent digest scores (for example, top 3%) for determining the size of the image, since such images are outlier value. Thereafter, the image size determination unit 157 divide images having digest scores equal to or more than the median value but less than the outlier value into m equal parts in accordance with the magnitude of the digest score, and generates image sizes for m levels. Herein, the setting value m may be set to any value in accordance with the size and the like of the display region displayed on the screen. For example, the setting value m is set to 2 or 3.

FIG. 12 shows a case where image sizes for two levels are set. An image size B is smaller than an image size A in FIG. 12. The image size determination unit 157 determines, for the thumbnail images described in the image number information transferred from the thumbnail number determination unit 153, which of the region in the image size A or the region in the image size B shown in FIG. 12 the digest scores of the corresponding image belong to. In accordance with this determination result, the image size determination unit 157 determines the image sizes of all of the thumbnail images described in the image number information. When the image sizes are determined in this way, images having relatively large digest scores have the large image size, and images having relatively small digest scores have the small image size. Thereby, in the information processing apparatus 10 according to the present embodiment, the image sizes can be automatically determined in accordance with the degree of excitement.

When the selected thumbnail image has moving picture data indicating that a face is present in an image, the image size determination unit 157 determines the image size in such a manner as to enlarge a facial region, i.e., a region in which a face is shown. When a plurality of facial regions are present in the image, the image size determination unit 157 enlarges the size of the image data in such a manner that all of the facial regions are included in the image.

For example, as shown in FIG. 13, a frame image a including only one facial region is selected as a thumbnail image, the image size determination unit 157 determines the image size for the comic display screen in such a manner as to enlarge the facial region. When a frame image b including two facial regions is selected as a thumbnail image, the image size determination unit 157 enlarges the image in such a manner that the two facial regions are included in the image.

The image size determination unit 157 sets frame image information, i.e., information about the sizes of the thumbnail images thus set (the sizes of the animation frame images), and transfers the frame image information to the frame image arrangement unit 159 and the frame information generation unit 163, which are described later.

Subsequently, the frame image arrangement unit 159 will be described with reference back to FIG. 7. The frame image arrangement unit 159 is constituted by, for example, a CPU, a ROM, a RAM, and the like. The frame image arrangement unit 159 arranges the thumbnail images, whose image sizes have been determined, into the frames in a predetermined order. The frame arrangement processing performed by the frame image arrangement unit 159 will be hereinafter described in detail with reference to FIG. 14 to FIG. 17.

As described above, the frame image arrangement unit 159 dynamically arranges the thumbnail images, whose image sizes have been determined, onto the display region. In this occasion, the frame image arrangement unit 159 achieves the frame arrangement reflecting the contents of the video by arranging the thumbnail images in the chronological order of the video. An ordinary comic book basically includes a plurality of lines in a page, and each line includes a plurality of frames. A reader of such comic book understands contents of a comic book by reading frames included in one line from left to right and moving on to a next line upon reaching the end of the frames. In this method, the thumbnail images are arranged in each line from left to right, and the lines are arranged from top to bottom, in the same manner as in an actual comic book.

Figure 14:
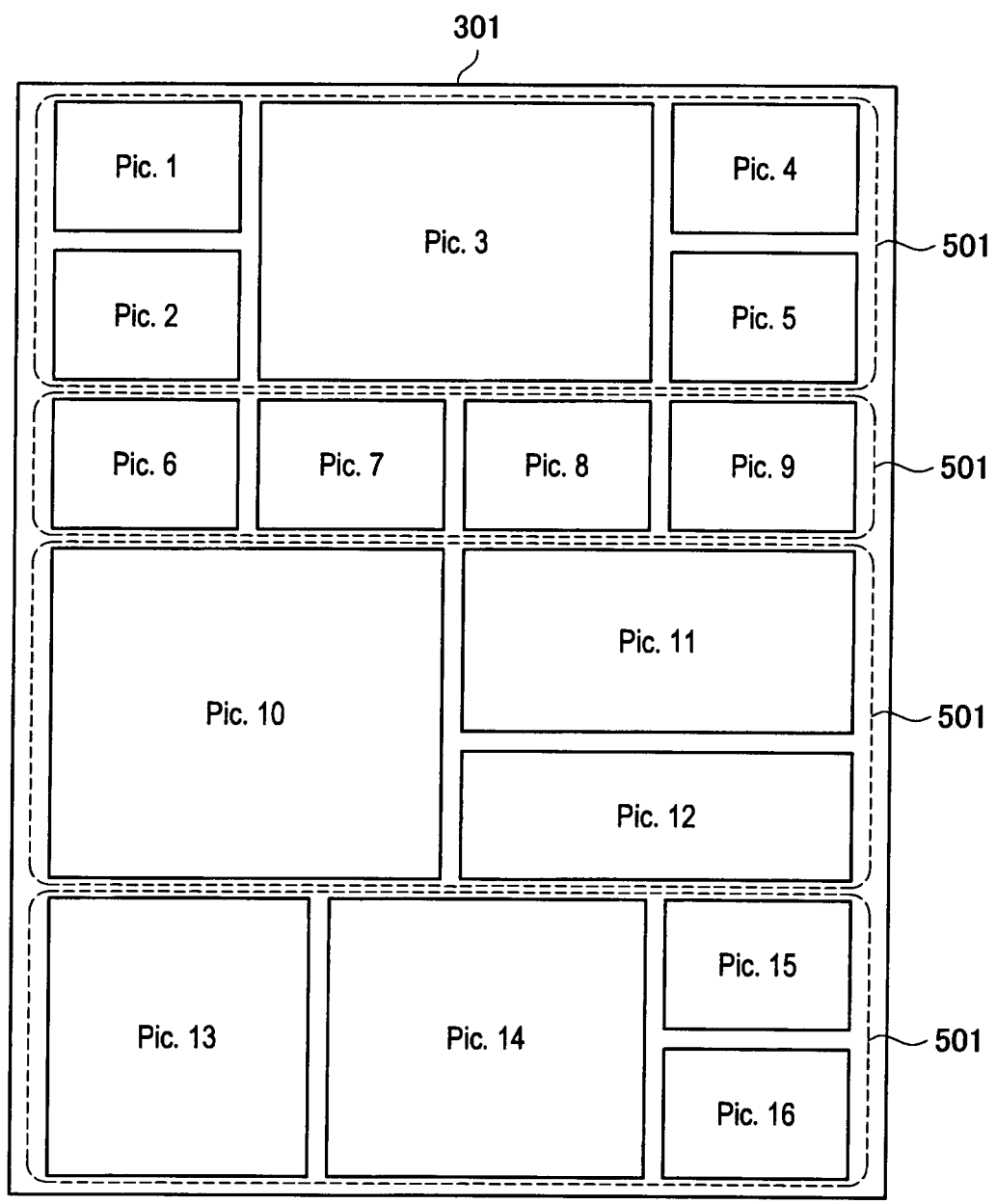
FIG. 14 is an explanatory diagram for illustrating a frame image arrangement unit according to the embodiment.

In order to achieve the same page sequence as a right-bound book, the frame image arrangement unit 159 arranges the thumbnail images from right to left when arranging the thumbnail images into a certain line. On the contrary, in order to achieve the same page sequence as a left-bound book, the frame image arrangement unit 159 arranges the thumbnail images from left to right when arranging the thumbnail images into a certain line FIG. 14 is an explanatory diagram showing an exemplary arrangement of the thumbnail images. In FIG. 14, the same page sequence as the right-bound book is assumed. In the display region 301, sixteen thumbnail images (represented as Pic. 1 to Pic. 16 in the figure) are arranged. In FIG. 14, the attached numbers, Pic. 1 to Pic. 16, are in the chronological order of the moving picture.

In this occasion, the frame image arrangement unit 159 defines an area having the same size as the size of the smallest thumbnail image as an arrangement unit box 501. This arrangement unit box 501 serves as a line in which the thumbnail images are arranged. The frame image arrangement unit 159 can achieve the arrangement of the images as shown in FIG. 14 by arranging the thumbnail images while enlarging this arrangement unit box 501. If, however, the thumbnail images are simply arranged, there may be a gap between images. In such case, a thumbnail image is enlarged so as to achieve a comic-like frame arrangement.

Figure 15:
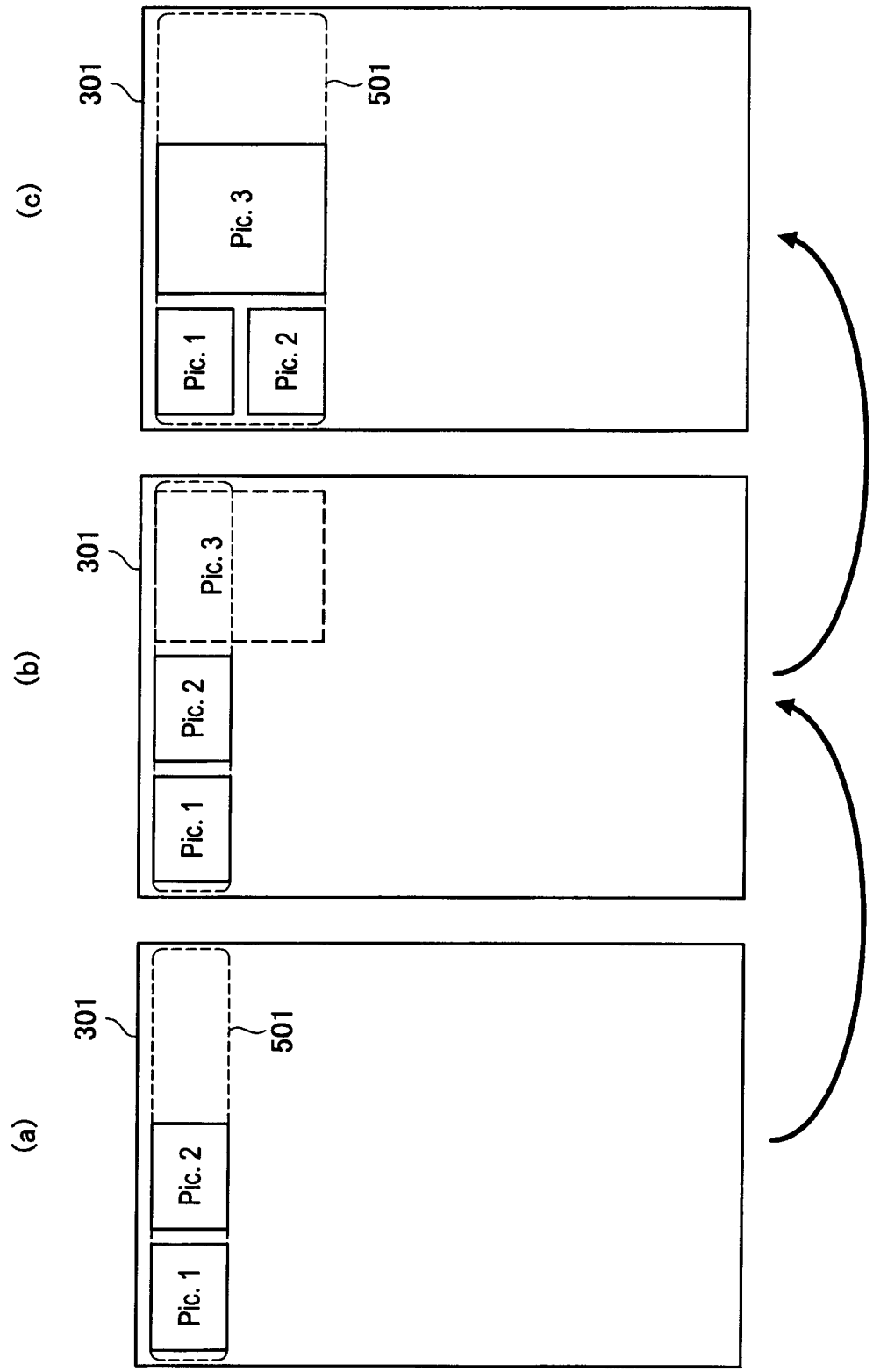
FIG. 15 is an explanatory diagram for illustrating the frame image arrangement unit according to the embodiment.
Figure 16:
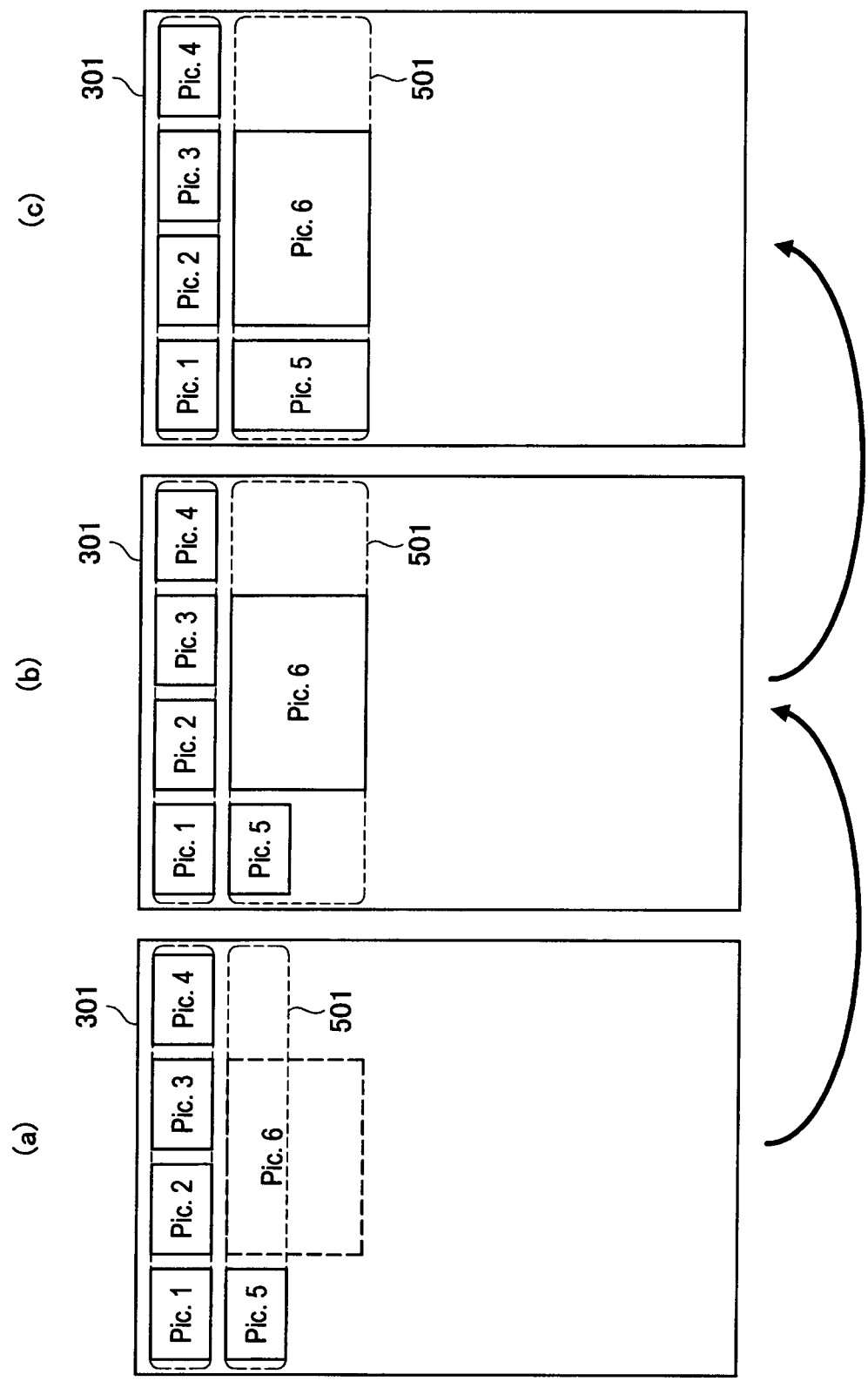
FIG. 16 is an explanatory diagram for illustrating the frame image arrangement unit according to the embodiment.

Hereinafter, the explanation will be made in a concrete manner with reference to FIG. 15 to FIG. 17. First, the frame image arrangement unit 159 sets the arrangement unit box 501 (which may be hereinafter referred to as the unit frame 501) based on the smallest size of the image to be arranged (the minimum height). The frame image arrangement unit 159 arranges the thumbnail images by using this unit frame 501.

As shown in FIG. 15A, the frame image arrangement unit 159 determines whether the thumbnail images are smaller than the unit frame 501, and arranges the first thumbnail image, i.e., the image Pic. 1, in the chronological order. When arranging the subsequent thumbnail image Pic. 2, the frame image arrangement unit 159 compares the height of the unit frame 501 and the height of the thumbnail image Pic. 2 so and determines whether the image can be arranged. In the example shown in FIG. 15A, the height of the thumbnail image Pic. 1 and the height of the thumbnail image Pic. 2 are the same, and therefore, the frame image arrangement unit 159 arranges the thumbnail image Pic. 2 adjacent to and on the right of the thumbnail image Pic. 1.

Subsequently, as shown in FIG. 15B, a case where a thumbnail image Pic. 3 having a larger height than the unit frame 501 is to be arranged will be described. The frame image arrangement unit 159 compares the height of the unit frame 501 and the height of the thumbnail image Pic. 3. In this case, the height of the thumbnail image is larger than the height of the unit frame 501, and therefore, as shown in FIG. 15C, the frame image arrangement unit 159 increases the height of the unit frame 501, and rearranges the thumbnail images from the beginning of that line.

Where the height of the thumbnail image is smaller than that of the unit frame 501, the frame image arrangement unit 159 determines whether the thumbnail image can be arranged. When the thumbnail image can be arranged, the frame image arrangement unit 159 arranges the image in that place, and moves to a position one line below the arranged image and determines whether a subsequent thumbnail image can be arranged therein. As a result, as shown in FIG. 15C, Pic. 2 is arranged below Pic. 1, and Pic. 3 is arranged adjacent to and on the right of Pic. 1 and Pic. 2.

When a thumbnail image Pic. 6 arranged as shown in FIG. 16A lies extending out of the unit frame 501 toward a downward direction, the frame image arrangement unit 159 changes the size of the unit frame 501, and rearranges the thumbnail images from the beginning of the line whose size has been changed. At this occasion, the image size of the image Pic. 6 to be placed subsequently to Pic. 5 is larger than that of Pic. 5. Therefore, if the image Pic. 6 is placed below Pic. 5, the image Pic. 6 extends off the unit frame 501. In order to avoid such circumstance, the frame image arrangement unit 159 arranges the thumbnail image Pic. 6 adjacent to and on the right of Pic. 5. When there is a gap between the current image and the previous image as shown in FIG. 16B, the frame image arrangement unit 159 enlarges the previous thumbnail image to fill the gap therebetween. In other words, in the case shown in FIG. 16B, Pic. 5 is enlarged as shown in FIG. 16C to fill the gap therebetween.

Figure 17:
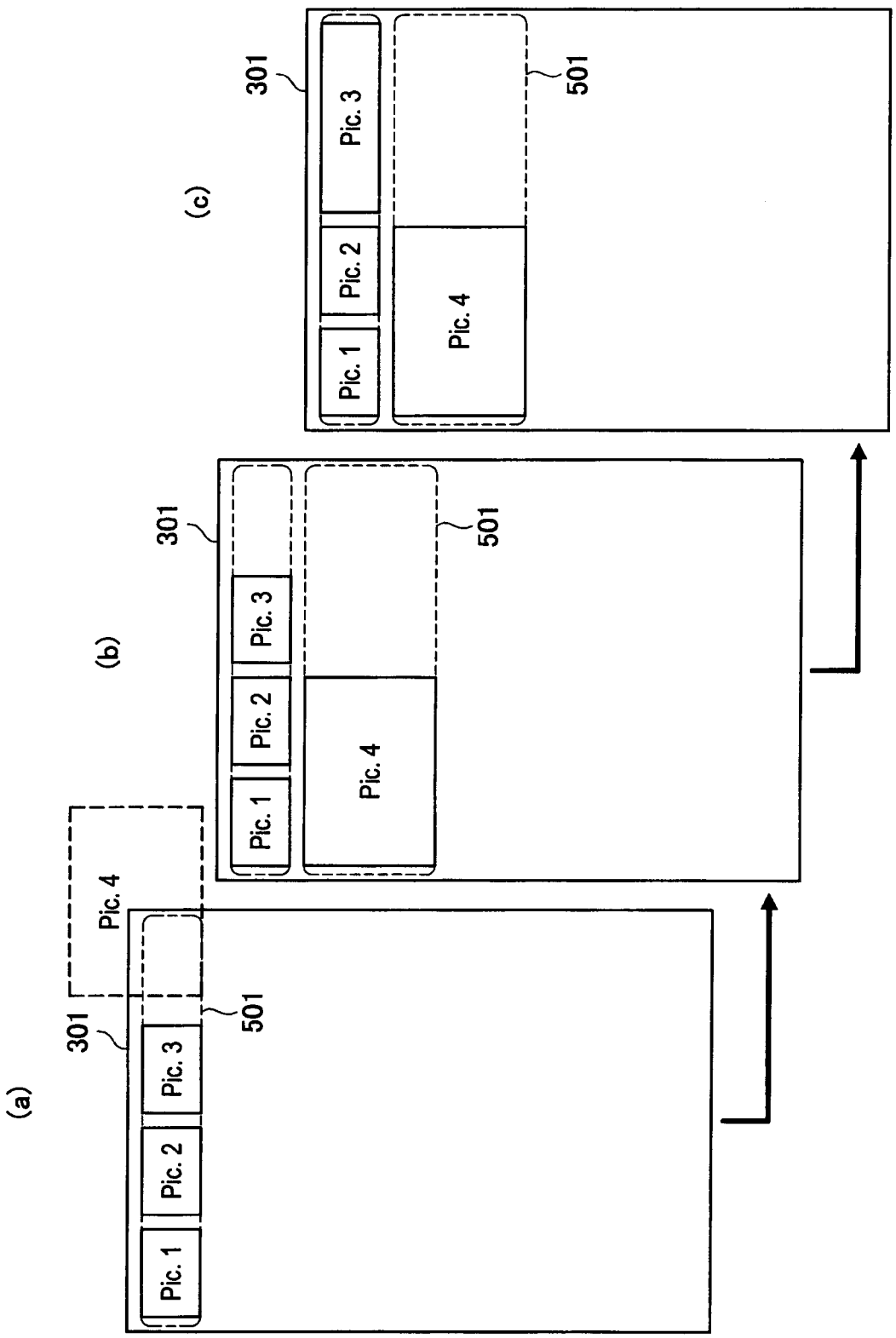
FIG. 17 is an explanatory diagram for illustrating the frame image arrangement unit according to the embodiment.

As shown in FIG. 17A, when the image Pic. 4 lies extending off the right end of the display region 301 toward the right direction, the frame image arrangement unit 159 recognizes that the current line is all filled up, and moves on to the next line. In the next line, the frame image arrangement unit 159 arranges the thumbnail image Pic. 4 as shown in FIG. 17B while changing the size of the unit frame 501 by the above method. Also in this case, when there is a gap between the previous image and the current image, the previous image is enlarged to fill the gap in the same manner as the case of FIG. 16. In the case shown in FIG. 17, the frame image arrangement unit 159 enlarges Pic. 3 so as to eliminate the gap as shown in FIG. 17C.

The frame image arrangement unit 159 arranges the thumbnail images in accordance with the procedure as described above. When all of the thumbnail images have been arranged, the frame image arrangement unit 159 terminates the arrangement processing.

When the arrangement of the thumbnail images is finished, the frame image arrangement unit 159 transfers frame arrangement information to the effect image arrangement unit 161 and the frame information generation unit 163, which are described later. The frame arrangement information represents which thumbnail images are arranged, what sizes the thumbnail images are made into, and where the thumbnail images are arranged. When an enlargement processing for a thumbnail image is performed to fill a gap occurred in the image arrangement, the frame image arrangement unit 159 may notify the image size determination unit 157 and the frame information generation unit 163 to that effect, and may request the image size determination unit 157 and the frame information generation unit 163 to correct the frame image information.

Figure 18:
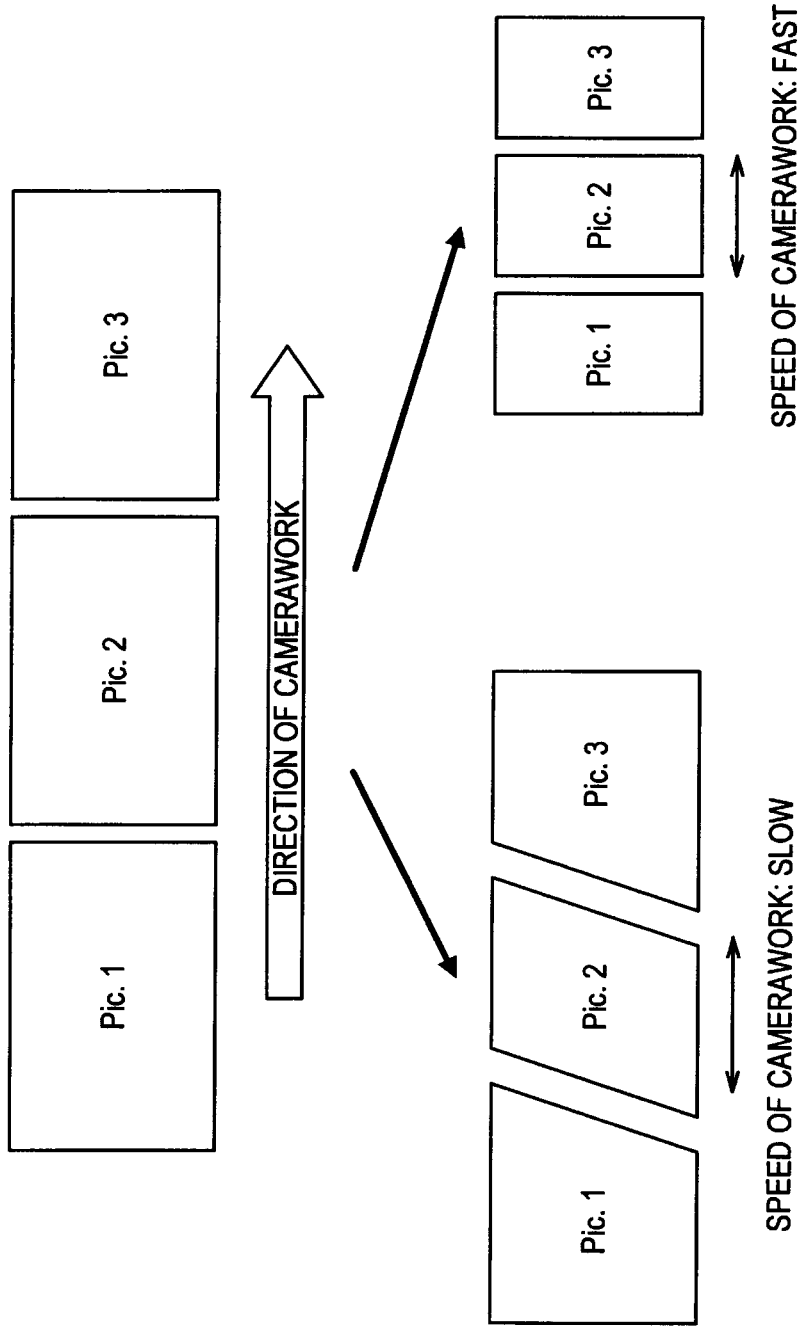
FIG. 18 is an explanatory diagram for illustrating image arrangement with camerawork taken into consideration.

It should be noted that camerawork may be taken into consideration when the image size determination unit 157 determines the sizes of the thumbnail images and the frame image arrangement unit 159 arranges the thumbnail images. For example, as shown in FIG. 18, a case will be considered where there are three thumbnail images Pic. 1 to Pic. 3, and the camerawork direction of each of these images is in the horizontal direction (namely, the camerawork is pan). In this case, the image size determination unit 157 may determine the size and the shape of each of the thumbnail images in accordance with the camerawork direction and camerawork speed. Alternatively, the frame image arrangement unit 159 may arrange each of the thumbnail images along the camerawork direction.

In the example as shown in FIG. 18, the camerawork is pan, and therefore, the frame mage arrangement unit 159 arranges the thumbnail images in the horizontal direction as shown in the lower column of FIG. 18. Further, the image size determination unit 157 processes the thumbnail images so that the thumbnail image is vertically long, and may determine the widths of the thumbnail images in accordance with the camerawork speed. In other words, when the camerawork speed is slow, the width of the thumbnail image is set to be large, and when the camerawork speed is fast, the width of the thumbnail image is set to be narrow.

Figure 19:
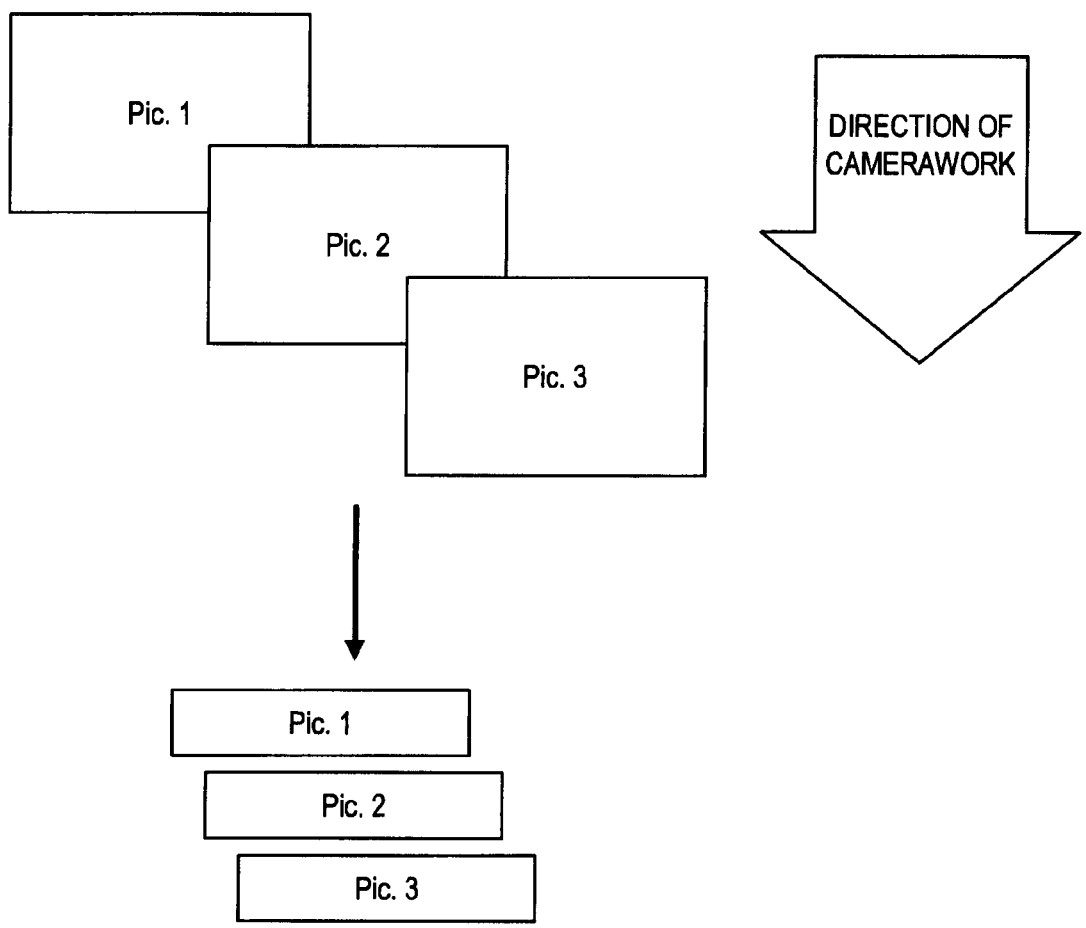
FIG. 19 is an explanatory diagram for illustrating image arrangement with camerawork taken into consideration.

Further, as shown in FIG. 19, when the camerawork is tilt, the frame image arrangement unit 159 may arrange the thumbnail images in the vertical direction. Alternatively, the image size determination unit 157 may process the thumbnail images so that the thumbnail image is vertically long, and may determine the heights of the thumbnail images in accordance with the camerawork speed.

As described above, the image sizes, the image shapes, and the image arrangement directions are changed in accordance with the direction and speed of camerawork. Thereby, the thumbnail images can be displayed in a more comic-like manner.

The effect image arrangement unit 161 will be described with reference back to FIG. 7. The effect image arrangement unit 161 is constituted by, for example, a CPU, a ROM, a RAM, and the like. The effect image arrangement unit 161 arranges at least one of a speech balloon and a screen effect on a frame is which a thumbnail image is arranged, based on the moving picture metadata. For example, the effect image arrangement unit 161 arranges at least one of a speech balloon and a screen effect by using the moving picture metadata relating to the audio data included in the moving picture data.

FIG. 20 shows a relationship between audio metadata and speech balloons. As shown in FIG. 20, the effect image arrangement unit 161 arranges a speech balloon on a frame arranged with a thumbnail image having corresponding audio metadata, which allows the information processing apparatus 10 according to the present embodiment to achieve comic-like representation. Given that the speech balloon will be displayed on the Web, it may be generated as vector data such as a SWF format, which enables not only to save the capacity but also to achieve animation processings such as enlarging and reducing operation.

When the thumbnail image has moving picture metadata indicating that a face is present, the effect image arrangement unit 161 arranges the speech balloon so as not to cover the facial region. Thereby, the comic display image can created in a more comic-like manner. Further, this allows the predetermined speech balloon to be represented so that the speech balloon expresses the words of a person appearing in the corresponding display image. More specifically, first, the effect image arrangement unit 161 compares the horizontal to vertical ratio of the frame. When the frame is vertically long, the speech balloon is arranged in the vertical direction. When the frame is horizontally long, the speech balloon is arranged in the horizontal direction. At this occasion, the effect image arrangement unit 161 compares the coordinate of the center of the facial region and the coordinate of the center of the frame, and arranges the speech balloon in the side opposite to the place where the face is present. For example, when the frame is vertically long, and the coordinate of the center of the facial region is below the coordinate of the center of the frame, the effect image arrangement unit 161 arranges the speech balloon in the upper side of the frame.

Further, the effect image arrangement unit 161 may change the size of the speech balloon in accordance with the duration of the audio metadata. For example, three levels of time lengths, i.e., one second or less, three seconds or less, and more than three seconds, may be set. The longer the audio continues, the higher the importance of the audio metadata is determined to be. In this way, the effect image arrangement unit 161 can emphasize a more important scene.

The effect image arrangement unit 161 can change the color of the speech balloon in accordance with the type of the audio metadata. For example, metadata "Speech" is attached to a conversation scene including audios, and three different classifications "male", "female", and "children" may be added to the metadata "speech". The three classifications "male", "female", and "children" are metadata attached after conversation audios of men, women, and children, respectively, are extracted. The effect image arrangement unit 161 may preset colors such as blue, red, and yellow for each metadata, and may change the color of the speech balloon. Thereby, a different speaker can be represented by a different color in the comic.

Further, the effect image arrangement unit 161 can arrange screen effects such as radial lines and effect lines based on feature quantities of camerawork included in the moving picture metadata. The effect lines are a plurality of horizontal lines arranged in the horizontal direction. The radial lines are a plurality of lines arranged in such a manner as to radiate from the center of a certain region. The effect image arrangement unit 161 may arrange the radial lines and the effect lines in accordance with the type and direction of camerawork, and may increase or decrease the number of lines or the concentration of lines of the radial lines and the effect lines in accordance with the speed of camerawork.

Figure 21:
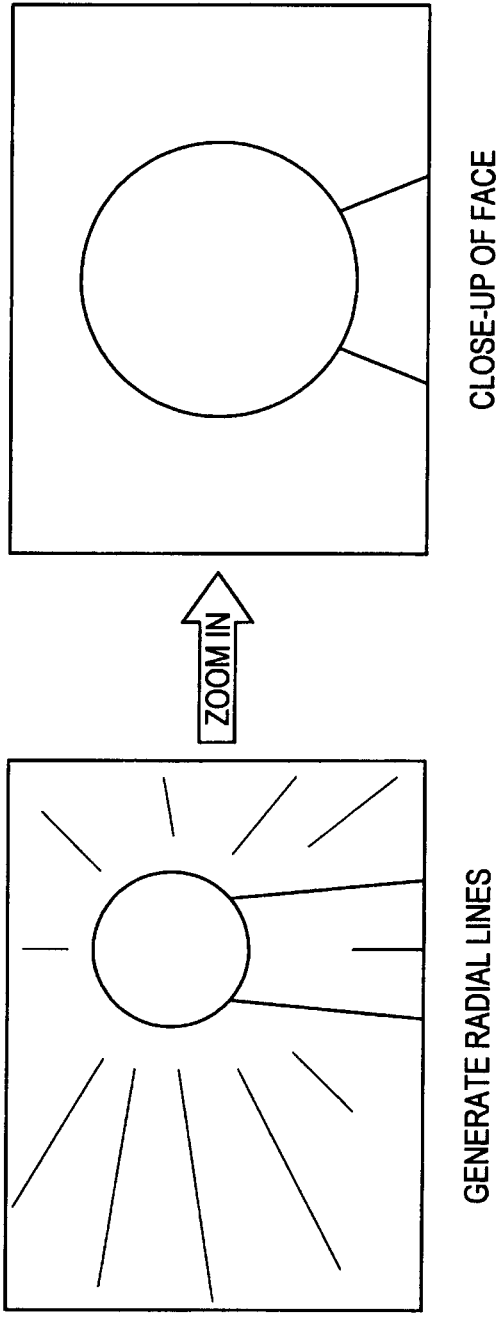
FIG. 21 is an explanatory diagram for illustrating the effect image arrangement unit according to the embodiment.

For example, as shown in FIG. 21, when the thumbnail image has moving picture metadata indicating that a facial region is present and has moving picture metadata indicating that a camerawork called zoom-in is performed, a plurality of radial lines 309 are arranged around the facial region. In this way, the thumbnail image showing a zoomed face as shown in FIG. 21 is arranged on the thumbnail image arranged with the radial lines, the comic display screen becomes more comic like. It should be noted that when the speed of zoom-in is fast, many radial lines 309 are arranged, and when the speed of zoom-in is slow, a few radial lines 309 are arranged.

Figure 22:
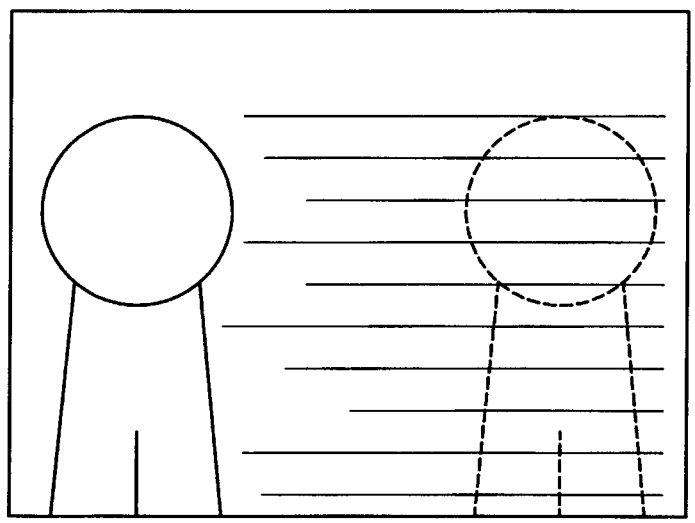
FIG. 22 is an explanatory diagram for illustrating the effect image arrangement unit according to the embodiment.

In a thumbnail image having moving picture metadata indicating that the camerawork is pan, the effect image arrangement unit 161 arranges, for example, the effect lines along the camerawork direction as shown in FIG. 22. In the same manner as the radial lines, when the camerawork speed is fast, many effect lines are arranged, and when the camerawork speed is slow, a few effect lines are arranged.

In this way, the image relating to the screen effects such as the radial lines and the effect lines are arranged in accordance with the camerawork, so that the comic display screen becomes more comic-like. Thereby, a user of the information processing apparatus 10 can understand the contents of the moving picture while enjoying seeing them.

The frame information generation unit 163 will be hereinafter described with reference back to FIG. 7. The frame information generation unit 163 is constituted by, for example, a CPU, a ROM, a RAM, and the like. The frame information generation unit 163 generates frame information relating to each frame in which the thumbnail image is arranged. The frame information includes various kinds of information generated by each processing unit of the comic display conversion unit 107, such as image number information, frame image information, frame arrangement information, and effect arrangement information. By referencing this frame information, the information processing apparatus 10 can obtain information used to generate the comic display screen, such as where the thumbnail image is to be arranged, what size the thumbnail image is to be made into, and what kind of effect is to be arranged.

Exemplary functions of the information processing apparatus 10 according to the present embodiment have been described hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the technical level at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed, for example, via a network, without using the recording medium.

<Information Processing Method>

The information processing method according to the present embodiment (more specifically, a comic display method of the moving picture data) will be hereinafter described in detail with reference to FIG. 23 to FIG. 29. FIG. 23 to FIG. 29 are flowcharts for illustrating the information processing method according to the present embodiment.

[Overall Flow of Information Processing Method]

Figure 23:
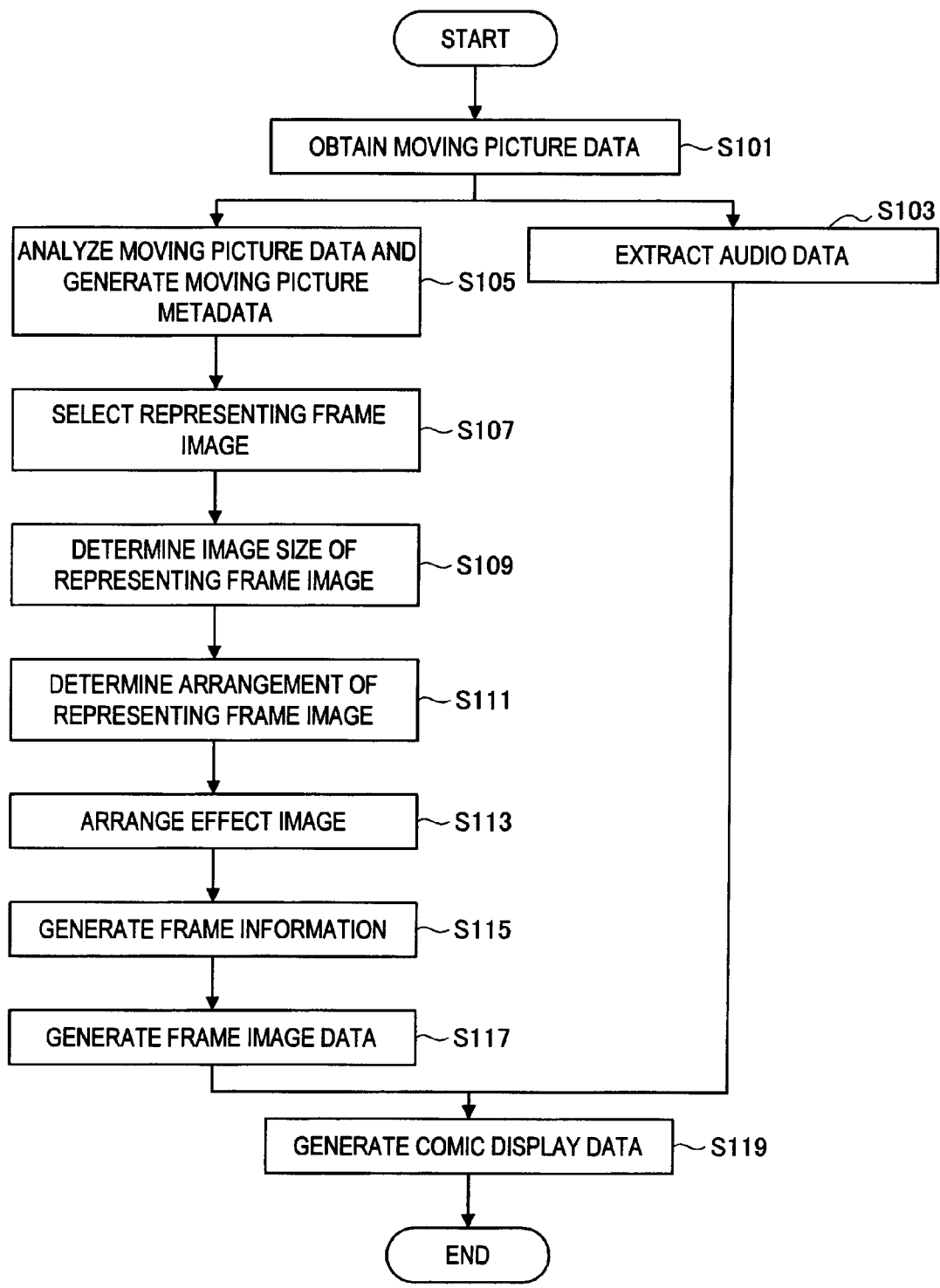
FIG. 23 is a flow diagram for illustrating overall flow of an information processing method according to the embodiment.

First, the overall flow of the information processing method according to the present embodiment will be described in detail with reference to FIG. 23.

First, the moving picture data acquisition unit 101 of the information processing apparatus 10 according to the present embodiment obtains moving picture data corresponding to a moving picture specified by a user in accordance with users's operation (step S101). The moving picture data acquisition unit 101 may obtain the moving picture data from the storage unit 117 and the like in the information processing apparatus 10 or from various kinds of recording media integrated in the information processing apparatus 10. Alternatively, the moving picture data acquisition unit 101 may obtain the moving picture data from another apparatus connected wirelessly or connected via wire, and may obtain the moving picture data from another apparatus connected via a communication network such as the Internet. The moving picture data acquisition unit 101 transfers the obtained moving picture data to the moving picture analysis unit 103 and the audio extraction unit 105.

The audio extraction unit 105 extracts audio data from the moving picture data transferred from the moving picture data acquisition unit 101 (step S103), and transfers the obtained audio data to the comic display data generation unit 111.

On the other hand, the moving picture analysis unit 103 analyzes the moving picture data transferred from the moving picture data acquisition unit 101, and generates moving picture metadata, i.e., metadata relating to feature quantities characterizing a moving picture corresponding to the transferred moving picture data (step S105). The moving picture analysis unit 103 transfers the generated moving picture metadata to the comic display conversion unit 107.

Subsequently, the digest score calculation unit 151 of the comic display conversion unit 107 calculates digest scores of all of the images (frame images) constituting the moving picture based on the transferred moving picture metadata. The digest score calculation unit 151 transfers the calculated digest scores to the thumbnail number determination unit 153.

Subsequently, the thumbnail number determination unit 153 selects representing frame images used as thumbnail images by using the transferred digest scores and the moving picture metadata (step S107). When the thumbnail number determination unit 153 finishes selecting the representing frame images, the thumbnail number determination unit 153 selects the animation frame images used for the thumbnail animation. The thumbnail number determination unit 153 generates image number information including information for identifying the selected representing frame images, information about the number of the representing frame images, information about the animation frame images relating to the representing frame images, and the like. The thumbnail number determination unit 153 transfers the generated image number information to the image size determination unit 157 and the frame information generation unit 163.

When the reproduction speed of the animation frame images and the thumbnail animation are determined, it is possible to reflect the analysis results provided by the camerawork metadata usage unit 155.

Subsequent, the image size determination unit 157 determines the image sizes of the selected representing frame images to be displayed as comic, based on the image number information, the moving picture metadata, the digest scores, and the like having been transferred (step S109). The image size determination unit 157 generates frame image information including information about the image sizes of the representing frame images, and transfers the frame image information to the frame image arrangement unit 159 and the frame information generation unit 163.

Subsequently, the frame image arrangement unit 159 automatically arranges the representing frame images into the display region and determines the arrangement of the representing frame images, by using the frame image information, the moving picture metadata, and the like, which have been transferred (step S111). When the frame image arrangement unit 159 determines the arrangement of the representing frame images, the frame image arrangement unit 159 generates frame arrangement information including information about which representing frame images are arranged at which positions, and transfers the generated frame arrangement information to the effect image arrangement unit 161 and the frame information generation unit 163.

Subsequently, the effect image arrangement unit 161 arranges effect images such as speech balloons and the like based on the frame arrangement information, the moving picture metadata, and the like having been transferred (step S113). When the effect image arrangement unit 161 finishes arranging the effect images, the effect image arrangement unit 161 generates effect arrangement information including information about which effects are arranged and where the effects are arranged, and transfers the generated effect arrangement information to the frame information generation unit 163.

When the image size is determined, and the frame images and the effect images are arranged, it is possible to use the feature quantities relating to camerawork included in the moving picture metadata.

Subsequently, the frame information generation unit 163 generates frame information based on the image number information, the frame image information, the frame arrangement information, the effect arrangement information, and the like transferred from each processing unit (step S115). The frame information generation unit 163 transfers the generated frame information to the frame image data generation unit 109 and the comic display data generation unit 111.

Subsequently, the frame image data generation unit 109 performs processing for adjusting the sizes and the shapes of the frame images used for displaying the comic based on the image data and the frame information, and generates frame image data used for displaying the comic (step S117). The frame image data generation unit 109 transfers the generated frame image data to the comic display data generation unit 111.

The comic display data generation unit 111 generates audio data used for displaying the comic based on the audio data transferred from the audio extraction unit 105 and the frame information transferred from the comic display conversion unit 107. Further, the comic display data generation unit 111 generates comic display data, i.e., a set of data used to display the comic, by using the frame information, the audio data, the frame image data, and the effect data (step S119).

The information processing apparatus 10 can present the comic, serving as the summary of the contents of the moving picture, on the display screen, by executing the generated comic display data.

[Method for Selecting Representing Frame Images]

Figure 24:
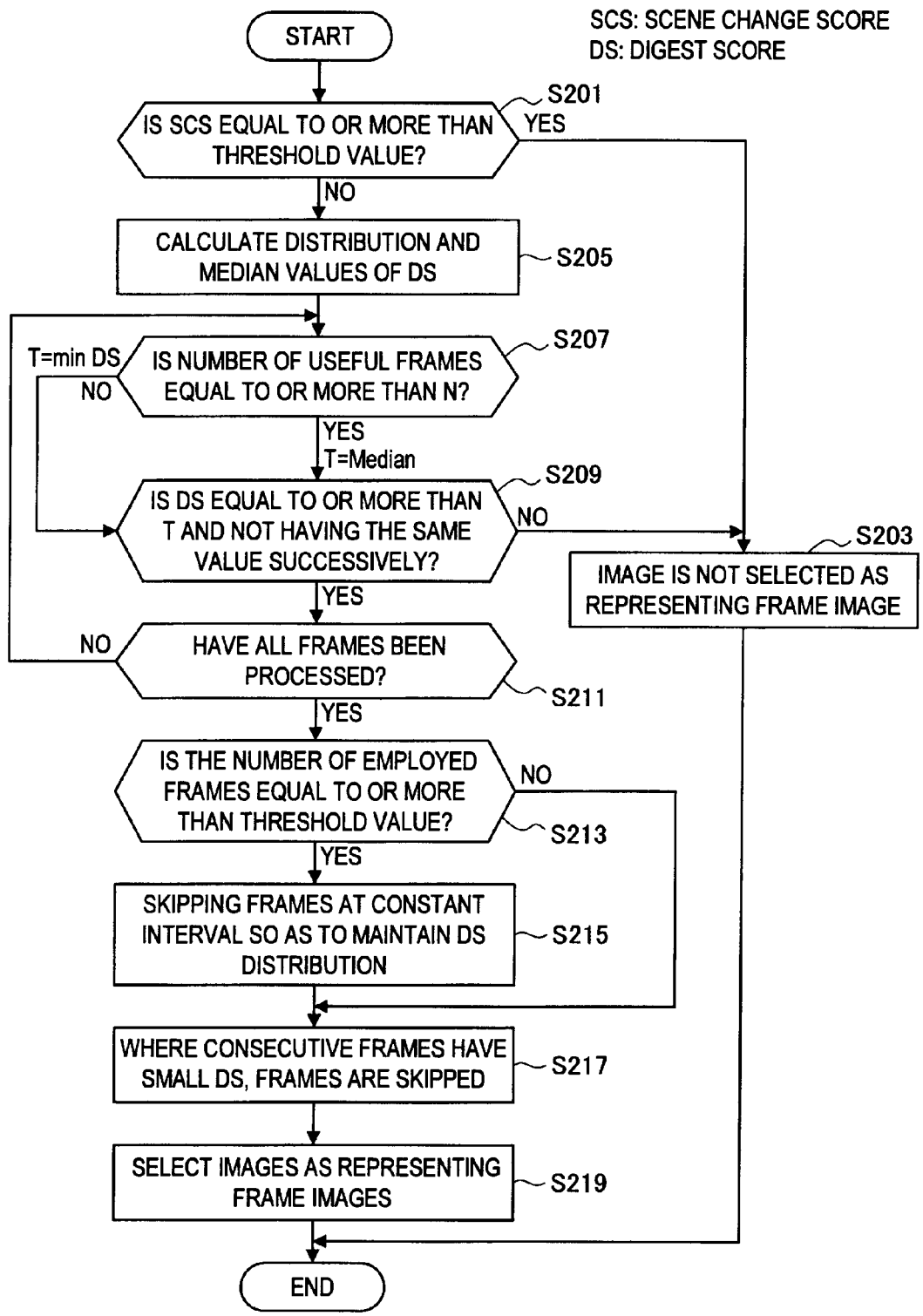
FIG. 24 is a flow diagram for illustrating a method for selecting the representing frame images according to the embodiment.

Next, the flow of the method for selecting the representing frame images will be described in detail with reference to FIG. 24. FIG. 24 is a flow diagram for illustrating the method for selecting the representing frame images according to the present embodiment.

First, the thumbnail number determination unit 153 determines whether the scene change score (SCS) included in the moving picture metadata is equal to or more than a predetermined threshold value (step S201). When the scene change score is more than the threshold value, the thumbnail number determination unit 153 recognizes that the picture is blurry because the camera has moved much, and determines not to select the image as the representing frame images (step S203).

Subsequently, the thumbnail number determination unit 153 calculates the distribution and the median value of the digest scores (DS) (step S205). As described above, the median value is used to determine whether the frame image is to be selected as the representing frame image.

Then, the thumbnail number determination unit 153 determines whether the number of useful frames as candidates for the representing frame images is equal to or more than a predetermined setting value N (step S207). When the number of the useful frames is equal to or more than m, the threshold value T is set such that the threshold value T=the median value. When the number of the useful frames is less than m, the threshold value T is set such that the threshold value T=the smallest digest score.

Subsequently, the thumbnail number determination unit 153 determines not to select candidates having the same digest score successively or having digest scores less than T, as the representing frame images. The thumbnail number determination unit 153 selects candidates having digest scores equal to or more than T but not having the same digest score successively from among the representing frame images candidates.

Subsequently, the thumbnail number determination unit 153 determines whether the above processings have been performed on all of the frames (step S211). When the processings have not been performed on all of the frames, the flow returns back to step S207 to perform the processings.

When the processings have been performed on all of the frames, the thumbnail number determination unit 153 calculates the total number of the employed frame images, and determines whether this total number is equal to or more than a predetermined threshold value (step S213). When the number of the employed frame images is equal to or more than the predetermined threshold value, the thumbnail number determination unit 153 performs the skipping processing at a constant interval so as to maintain the distribution of the digest scores (step S215).

Subsequently, the thumbnail number determination unit 153 performs the skipping processing in a case where frames having small digest scores appear successively (step S217). The thumbnail number determination unit 153 selects the frame images still remaining after the above screening as frames in the comic display (namely, the representing frame images) (step S219).

[Method for Selecting Animation Frame Images in Accordance with Camerawork]

Figure 25:
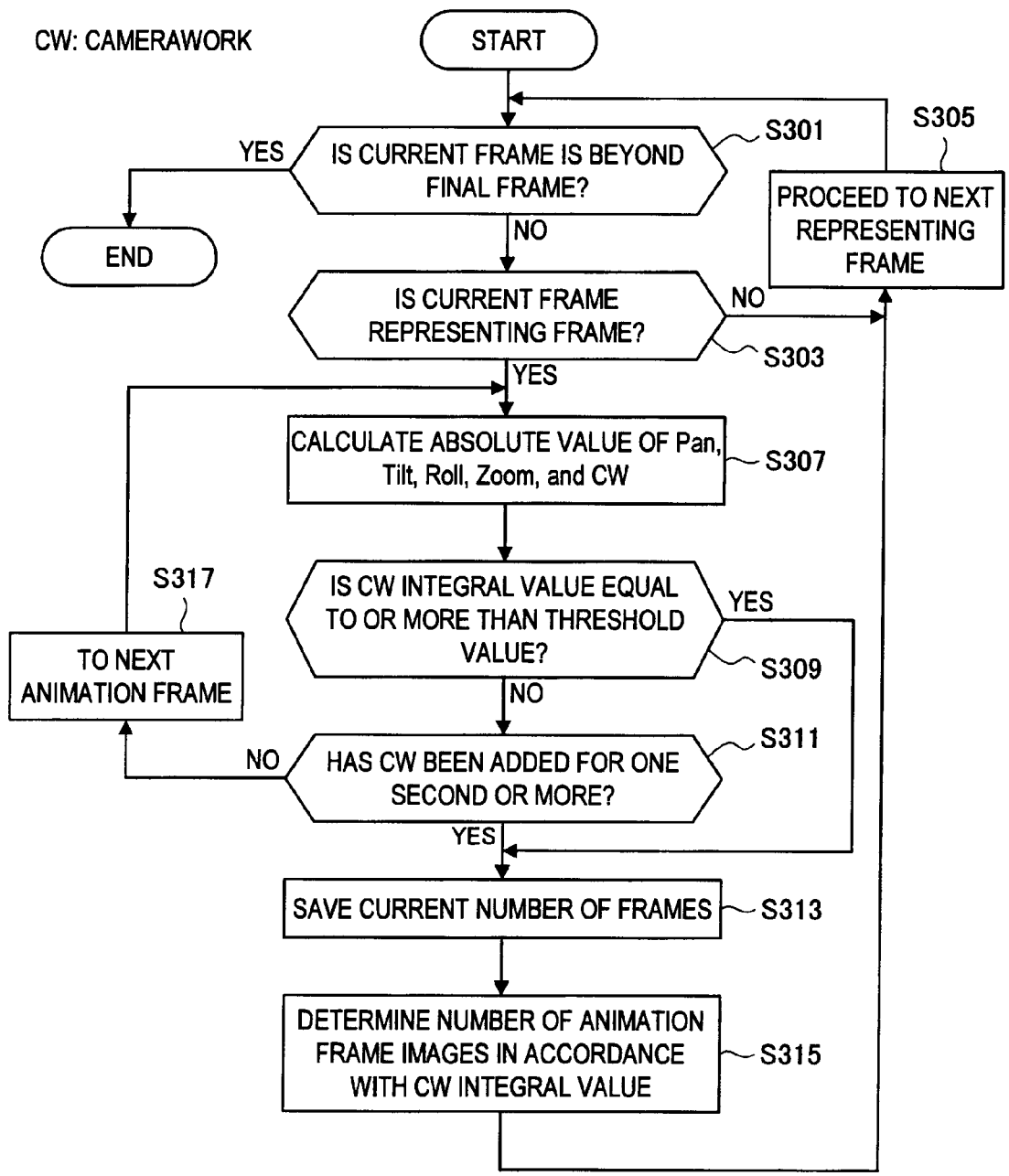
FIG. 25 is a flow diagram for illustrating a method for selecting the animation frame images in accordance with camerawork.

Next, the method for selecting the animation frame images in accordance with the camerawork will be described in detail with reference to FIG. 25. FIG. 25 is a flow diagram for illustrating the method for selecting the animation frame images in accordance with the camerawork.

First, the camerawork metadata usage unit 155 determines whether the current frames beyond the final frame image (step S301). When the current frame image is beyond the final frame image, the camerawork metadata usage unit 155 terminates the processings. When the current frame image is not beyond the final frame image, the camerawork metadata usage unit 155 performs the following processings.

Subsequently, the camerawork metadata usage unit 155 determines whether the current frame image is a representing frame image to be displayed (step S303). When the current frame is not a representing frame to be displayed, the camerawork metadata usage unit 155 performs the processing on the next representing frame (step S305). When the current frame is a representing frame to be displayed, the camerawork metadata usage unit 155 references the feature quantities relating to the camerawork included in the moving picture metadata. More specifically, the camerawork metadata usage unit 155 calculates the absolute values of the camerawork relating to pan, tilt, roll, and zoom (step S307).

Subsequently, the camerawork metadata usage unit 155 performs the integration processing on the animation frame images selected in relation to the representing frame images, i.e., adding the absolute values of the camerawork in order. Every time the camerawork metadata usage unit 155 finishes adding the absolute values for one animation frame image, the camerawork metadata usage unit 155 determines whether the integration value is equal to or more than a predetermined threshold value (step S309). When the integration value is equal to or more than the predetermined threshold value, the camerawork metadata usage unit 155 performs the processing of step S313, which will be described later. When the integration value is less than the predetermined threshold value, the camerawork metadata usage unit 155 determines whether the feature quantities of the frames relating to the camerawork have been added for a predetermined time or more (for example, one second) (step S311). When the feature quantities of the frames have been added for the predetermined time or more, the camerawork metadata usage unit 155 saves the frame number currently being processed (step S313). When the feature quantities of the frames have not been added for the predetermined time or more, the camerawork metadata usage unit 155 moves on to the subsequent animation frame image (step S317), and returns back to step S307 to continue the processings.

Subsequently, the camerawork metadata usage unit 155 determines the number of the animation frame images in accordance with the integration value of camerawork (step S315). Subsequently, the camerawork metadata usage unit 155 determines the animation frame images used for the thumbnail animation based on the number of the animation frame images having been determined and the frame number having been saved.

With the above processings, the information processing method according to the present embodiment can achieve natural thumbnail animation in accordance with the camerawork.

[Method for Dynamically Arranging Representing Frame Images]

Figure 26A:
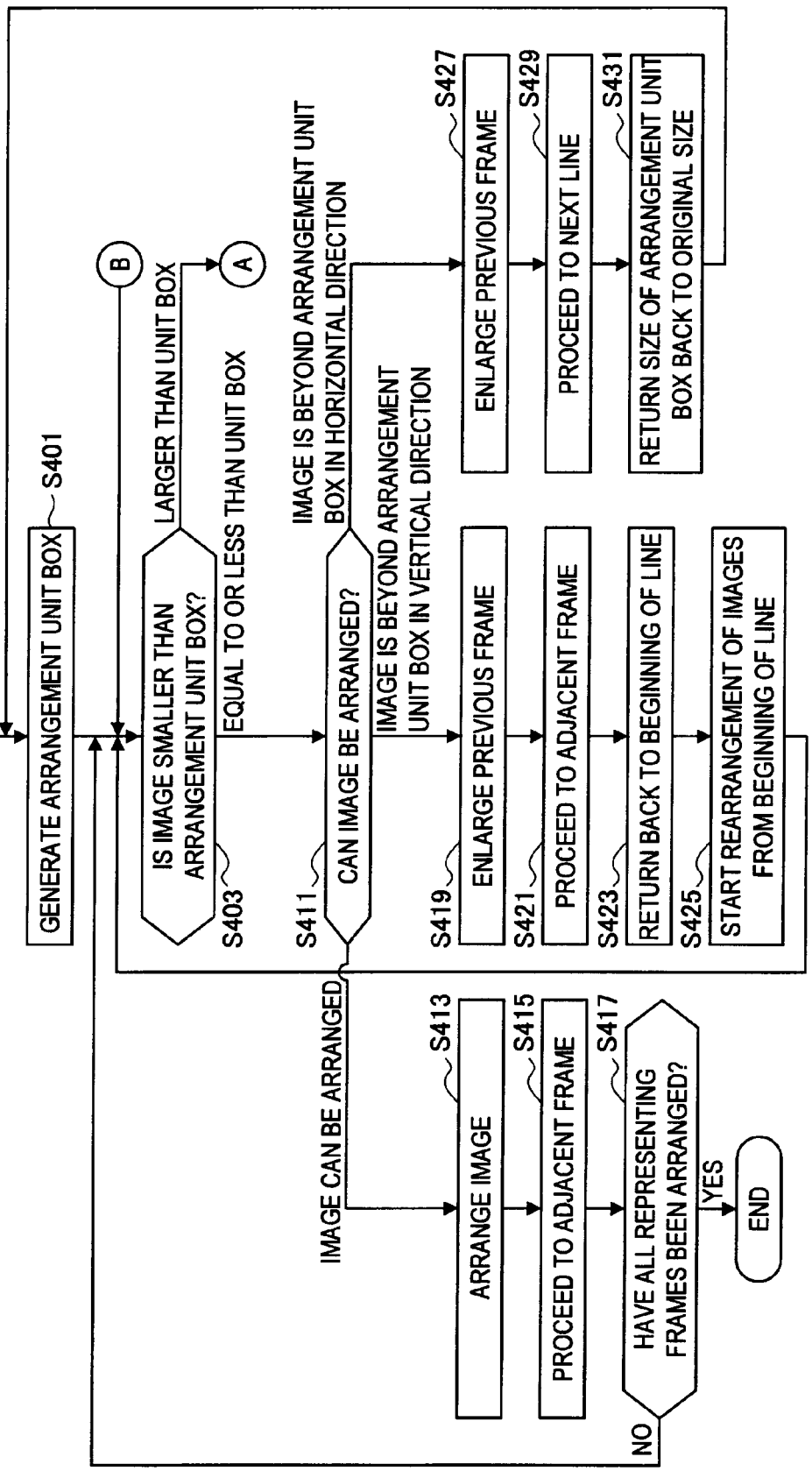
FIG. 26A is a flow diagram for illustrating a method for dynamically arranging the representing frame images according to the embodiment.
Figure 26B:
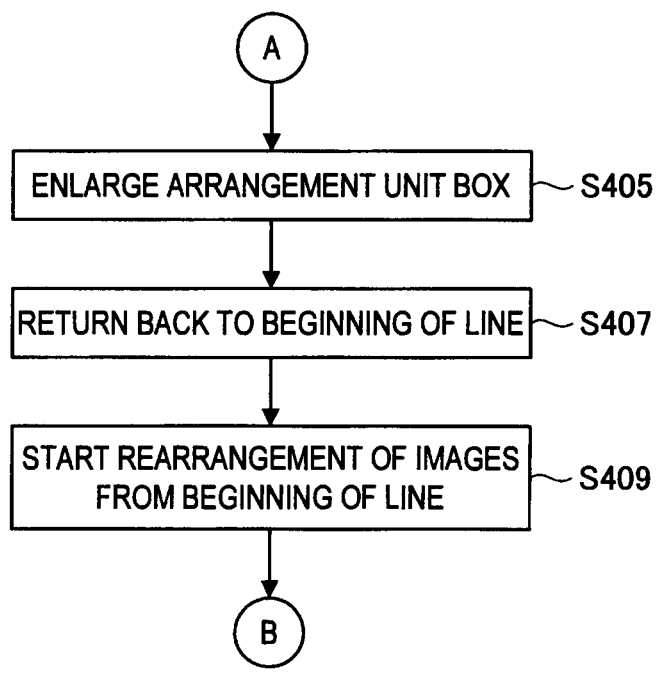
FIG. 26B is a flow diagram for illustrating the method for dynamically arranging the representing frame images according to the embodiment.

Subsequently, the method for dynamically arranging the representing frame images according to the present embodiment will be described in detail with reference to FIG. 26A and FIG. 26B. FIG. 26A and FIG. 26B are flow diagrams for illustrating the method for dynamically arranging the representing frame images according to the present embodiment.

First, the frame image arrangement unit 159 generates an arrangement unit box used for arranging the representing frame images (step S401). At this occasion, the frame image arrangement unit 159 makes the height of the arrangement unit box the same as the smallest height of the image size determined by the image size determination unit 157.

Subsequently, the frame image arrangement unit 159 determines whether the representing frame image being arranged is smaller than the arrangement unit box (step S403). When the height of the representing frame image being arranged is larger than the height of the arrangement unit box, the frame image arrangement unit 159 performs the processings of step S405 to step S409, which are described later. When the height of the representing frame image being arranged is equal to or less than the height of the arrangement unit box, the frame image arrangement unit 159 performs the processings of step S411 and subsequent steps, which are described later.

When the height of the representing frame image being arranged is larger than the height of the arrangement unit box, the frame image arrangement unit 159 enlarges the height of the arrangement unit box to the height of the representing frame image being arranged (step S405). Subsequently, the frame image arrangement unit 159 returns back to the beginning of the line (i.e., the beginning in the arrangement unit box whose height has been enlarged) (step S407), and starts rearranging the images from the beginning of the line (step S409).

When the height of the representing frame image being arranged is equal to or less than the height of the arrangement unit box, the frame image arrangement unit 159 determines whether the representing frame image being arranged can be arranged (step S411).

When the representing frame image being arranged can be arranged, the frame image arrangement unit 159 arranges the representing frame image to the corresponding position (step S413). Subsequently, the frame image arrangement unit 159 moves the frame, in which the image is to be arranged, to the adjacent frame (step S415). When the height of the representing frame image arranged in step S413 is less than the height of the arrangement unit box, the frame image arrangement unit 159 sets the frame below the frame in which the image is arranged in step S413 as the adjacent frame of step S415. When the height of the representing frame image arranged in step S413 is equal to the height of the arrangement unit box, the frame image arrangement unit 159 sets the frame on the right or left of the frame in which the image is arranged in step S413 as the adjacent frame of step S415.

Subsequently, the frame image arrangement unit 159 determines whether all of the representing frame images have been arranged or not (step S417). When all of the representing frame images have been arranged, the frame image arrangement unit 159 terminates the frame arrangement processing. When all of the representing frame images have not been arranged, the frame image arrangement unit 159 performs the processing of step S403 and subsequent steps on the subsequent representing frame image.

In step S411, when the representing frame image being arranged extends off the arrangement unit box in the vertical direction (height direction), the frame image arrangement unit 159 enlarges the image arranged in the frame previous to the image currently being arranged (step S419). Subsequently, the frame image arrangement unit 159 changes the current frame to the adjacent frame (step S421). Thereafter, the frame image arrangement unit 159 returns back to the beginning of the line (step S423), and starts rearranging the images from the beginning of the line (step S425).

Further, in step S411, when the representing frame image being arranged lies extending off the arrangement unit box in the horizontal direction (width direction), the frame image arrangement unit 159 enlarges the image arranged in the frame previous to the image currently being arranged (step S427). Subsequently, the frame image arrangement unit 159 moves on to the next line (step S429), and sets the size of the arrangement unit box back to its original size (step S431). Thereafter, the frame image arrangement unit 159 returns back to step S401, and restarts the arrangement processing of the representing frame images.

The arrangement processing of the representing frame images is performed in accordance with the procedure as described above. Thereby, the information processing apparatus according 10 to the present embodiment can dynamically arrange the representing frame images in the chronological order.

[Method for Arranging Representing Frame Images with Camerawork Taken into Consideration]

Figure 27:
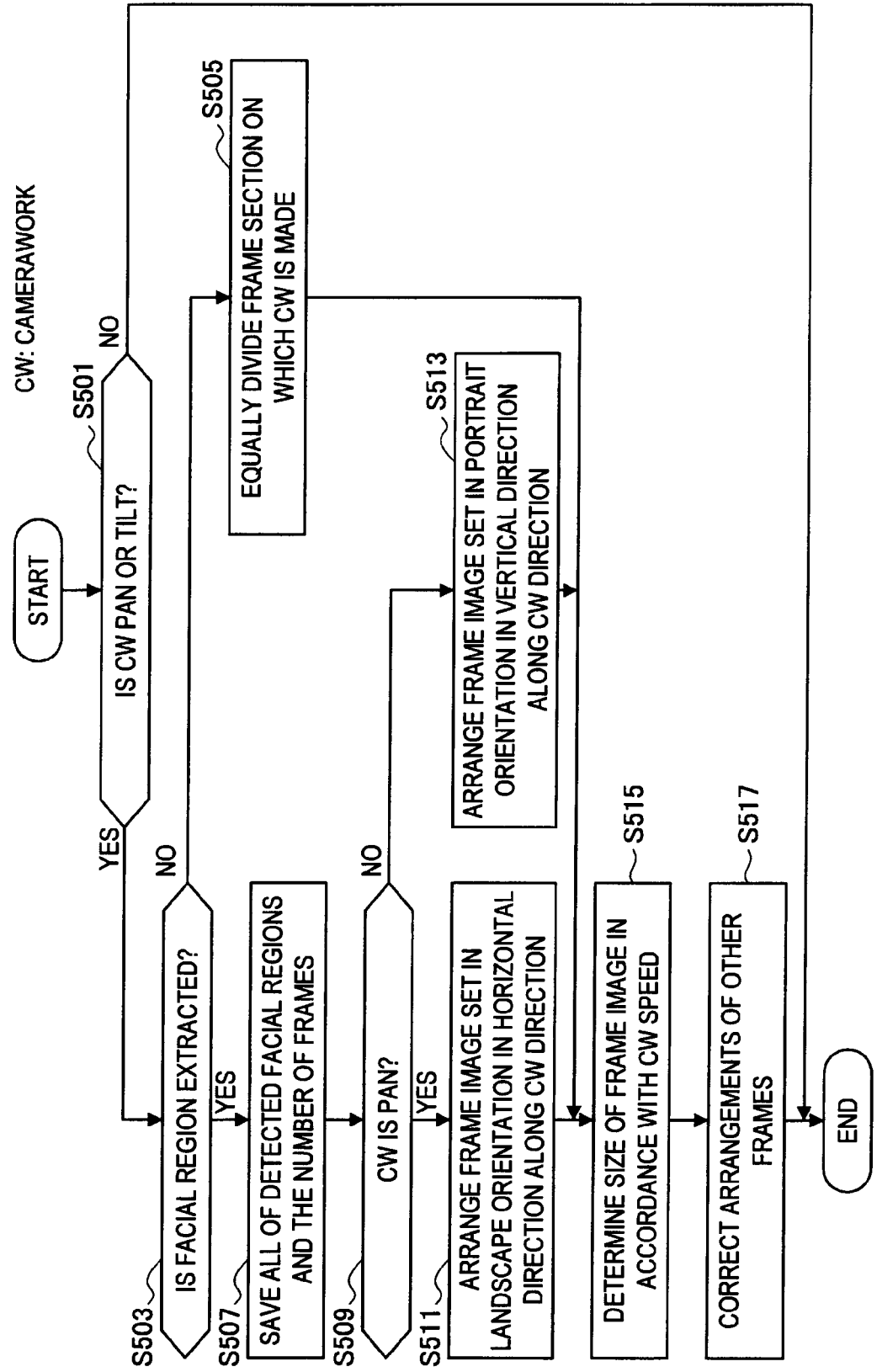
FIG. 27 is a flow diagram for illustrating a method for arranging the representing frame images with camerawork taken into consideration.

Next, the method for arranging the representing frame images with camerawork taken into consideration will be described in detail with reference to FIG. 27. FIG. 27 is a flow diagram for illustrating the method for arranging the representing frame images with camerawork taken into consideration.

Hereinafter, a case will be described where the method for arranging the representing frame image with camerawork taken into consideration is carried out after, for example, the representing frame images have been arranged as described with reference to FIG. 26A and FIG. 26B. It is to be understood, however, that the representing frame images can also be arranged with camerawork taken into consideration in FIG. 26A and FIG. 26B.

First, the frame image arrangement unit 159 determines whether there is any moving picture metadata indicating that pan or tilt camerawork is performed (step S501). When the camerawork is neither pan nor tilt, the frame image arrangement unit 159 terminates the rearrangement processing of the representing frame images with camerawork taken into consideration. When the camerawork is pan or tilt, the frame image arrangement unit 159 determines whether the corresponding image is made by extracting the facial region (step S503). When the facial region is not included, the frame image arrangement unit 159 equally divides the frame section in which the camerawork is made (step S505).

Subsequently, the frame image arrangement unit 159 saves all of the detected facial regions and their frame numbers (step S507).

Subsequently, the frame image arrangement unit 159 determines whether the camerawork in the corresponding representing frame image is pan or not based on the moving picture metadata (step S509). When the camerawork is pan, the frame image arrangement unit 159 sets the representing frame images (frame images) to be vertically long, and arranges the corresponding images along the camerawork direction, i.e., the horizontal direction (step S511). When the camerawork is tilt, the frame image arrangement unit 159 sets the representing frame images (frame images) to be horizontally long, and arranges the corresponding images along the camerawork direction, i.e., the vertical direction (step S513).

Subsequently, the image size determination unit 157 determines the sizes of the representing frame images (frame images) in accordance with the specification transferred from the frame image arrangement unit 159 as to whether the representing frame image is vertically or horizontally long and in accordance with the camerawork speed obtained from the moving picture metadata (step S515).

Subsequently, the frame image arrangement unit 159 corrects arrangements of other frames as necessary (step S617).

The above-described method for arranging the representing frame images with camerawork taken into consideration enables the display of comics to be richer in comic-like expression.

[Method for Arranging Effect Images with Camerawork Taken into Consideration]

Figure 28:
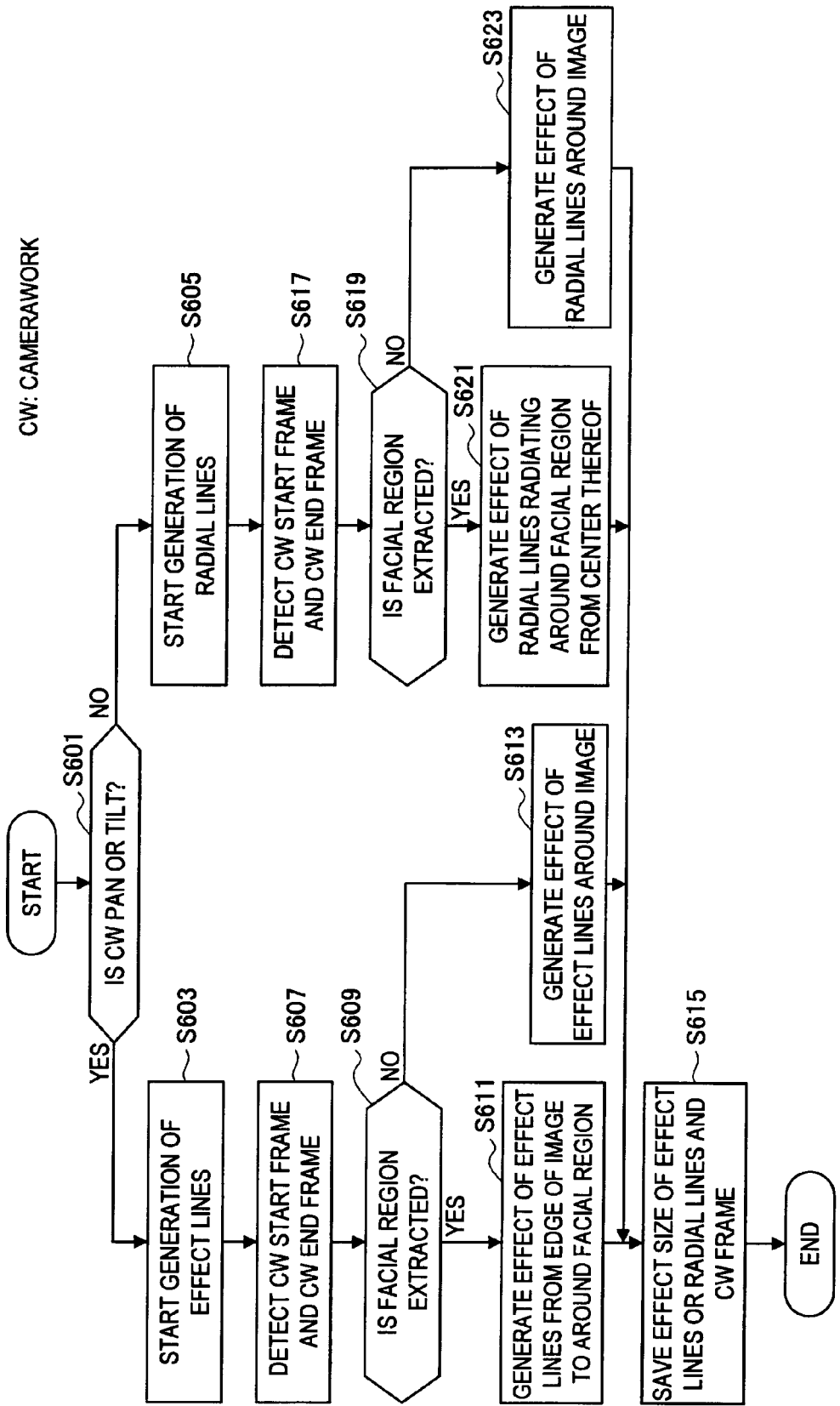
FIG. 28 is a flow diagram for illustrating a method for arranging effect images with camerawork taken into consideration.

Next, the method for arranging the effect images with camerawork taken into consideration will be described in detail with reference to FIG. 28. FIG. 28 is a flow diagram for illustrating the method for arranging the effect images with camerawork taken into consideration.

First, the effect image arrangement unit 161 determines whether there is any moving picture metadata indicating that pan or tilt camerawork is performed (step S601). When the camerawork is pan or tilt, the effect image arrangement unit 161 performs a generation processing of an effect image of effect lines (step S603). When the camerawork is neither pan nor tilt, for example, when the camerawork is zoom and the like, the effect image arrangement unit 161 performs the generation processing of an effect image of radial lines (step S605).

First, a case will be hereinafter described where an effect image of effect lines is generated. The effect image arrangement unit 161 extracts a frame image at which camerawork starts and a frame image at which camerawork ends (step S607). Subsequently, the effect image arrangement unit 161 determines whether there is any facial region in the images based on the moving picture metadata (step S609).

When there is a facial region, the effect image arrangement unit 161 generates an effect image of effect lines from the edge of the image to around the facial region (step S611). When there is no facial region, the effect image arrangement unit 161 generates an effect image of effect lines in the periphery of the image (step S613). It should be noted that the effect image arrangement unit 161 determines the density, the length, the number, and the like of the effect image of effect lines in accordance with the camerawork speed.

When the generation of the effect image of effect lines is finished, the effect image arrangement unit 161 saves information about the size of the effect image of effect lines and to which frame image the effect image is arranged (step S615).

Next, a case will be described where an effect image of radial lines is generated. The effect image arrangement unit 161 detects a frame image at which camerawork starts and a frame image at which camerawork ends (step S617). Subsequently, the effect image arrangement unit 161 determines whether there is any facial region in the image based on the moving picture metadata (step S619).

When there is a facial region, the effect image arrangement unit 161 generates an effect image of radial lines around the facial region (step S621). When there is no facial region, the effect image arrangement unit 161 generates an effect image of radial lines in the periphery of the image (step S623). It should be noted that the effect image arrangement unit 161 determines the density, the length, the number, and the like of the effect image of radial lines in accordance with the camerawork speed.

When the generation of the effect image of radial lines is finished, the effect image arrangement unit 161 saves information about the size of the effect image of radial lines and to which frame image the effect image is arranged (step S615).

The above-described processing for arranging the effect image with camerawork taken into consideration enables the display of comics to be richer in comic-like expression.

[Method for Determining Animation Reproduction Speed]

Figure 29:
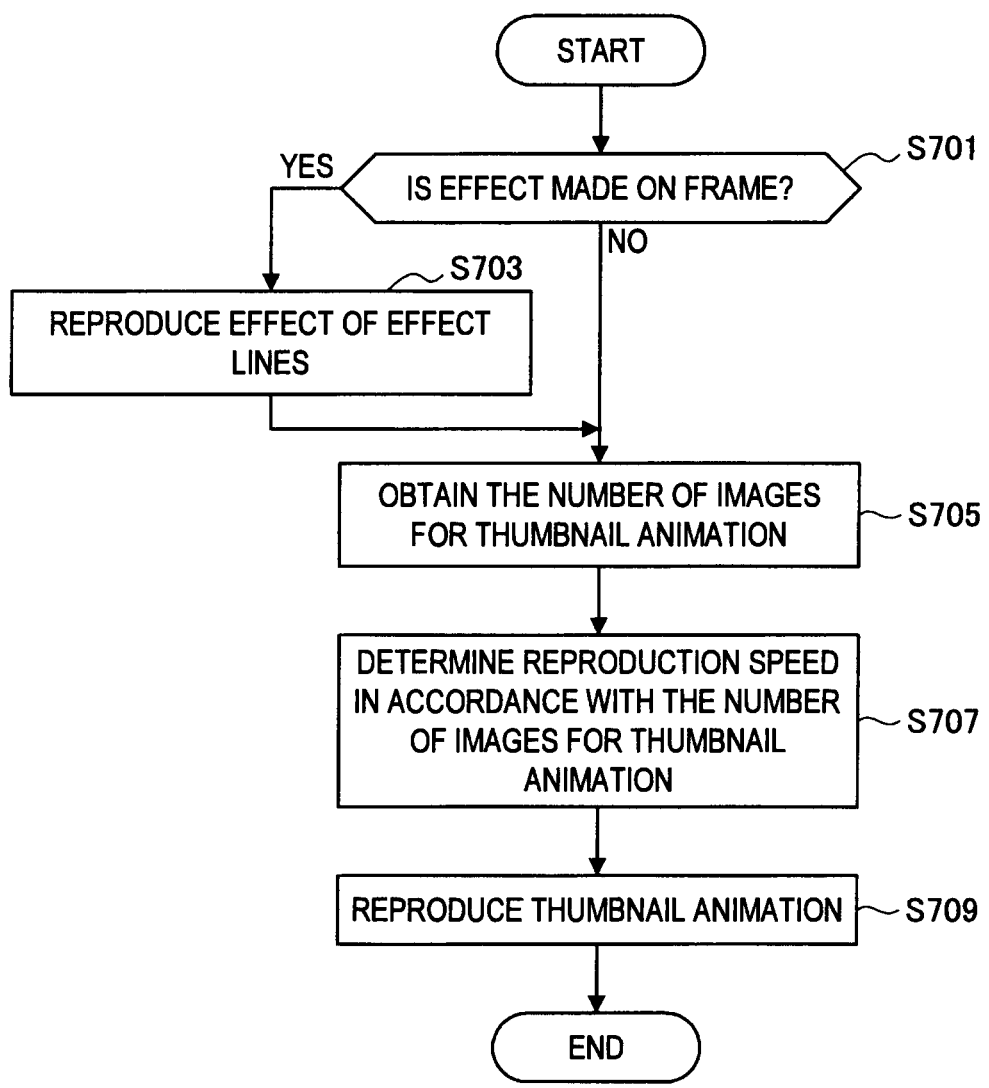
FIG. 29 is a flow diagram for illustrating a method for determining a reproduction speed of thumbnail animation.

Next, the method for determining the reproduction speed of the thumbnail animation will be described in detail with reference to FIG. 29. FIG. 29 is a flow diagram for illustrating the method for determining the reproduction speed of the thumbnail animation.

In the above explanation, a case has been described where the camerawork metadata usage unit 155 previously determines the reproduction speed of the animation. Alternatively, as described below, the comic display execution unit 113 may determine the reproduction speed when the animation is reproduced.

First, the comic display execution unit 113 references the comic display data, and determines whether the image is a frame (representing frame image) arranged with an effect image (step S701).

When the image is a frame arranged with an effect image, the comic display execution unit 113 reproduces the effect of effect lines based on the comic display data (step S703), and proceeds to step S705. Alternatively, when the image is a frame that is not arranged with any effect image, the comic display execution unit 113 executes the processing of step S705 as described below.

Subsequently, the comic display execution unit 113 references the comic display data, and obtains the number of the images used for the thumbnail animation (step S405). The comic display execution unit 113 determines the reproduction speed of the animation based on the number of the animation frame images and based on, for example, the criteria as shown below (step S707).

(1) reproduction speed=1 (FPS), where the number of animation images (n) is 2 or less (2) reproduction speed=2 (FPS), where the number of animation images (n) is more than 2 but 4 or less (3) reproduction speed=8 (FPS), where the number of animation images (n) is more than 4 but 8 or less (4) reproduction speed=24 (FPS), where the number of animation images (n) is more than 8

Subsequently, the comic display execution unit 113 reproduces the thumbnail animation based on the determined reproduction speed (step S709).

The above processings enable determining the reproduction speed with camerawork taken into consideration when the thumbnail animation is reproduced.

<First Variation>

Subsequently, the first variation of the information processing apparatus 10 according to the present embodiment will be described in detail with reference to FIG. 30 to FIG. 32.

The moving picture analysis unit 103 of the information processing apparatus 10 according to the present variation has not only the functions of the moving picture analysis unit 103 according to the first embodiment but also detection functions for detecting a person from the moving picture data, detecting a subject to which a user pays attention, detecting an object specified by a user, and the like. Further, the comic display conversion unit 107 of the information processing apparatus 10 according to the present variation has a function of arranging an effect image so as to avoid occlusion in accordance with the detection result of the moving picture analysis unit 103.

[Configuration of Moving Picture Analysis Unit]

First, the moving picture analysis unit 103 according to the present variation will be described in detail with reference to FIG. 30. FIG. 30 is a block diagram for illustrating the configuration of the moving picture analysis unit 103 according to the present variation.

The moving picture analysis unit 103 according to the present variation has the moving picture data dividing unit 131, the face detection unit 133, the scene transition detection unit 135, the camerawork detection unit 137, the audio analysis unit 139, and the moving picture metadata generation unit 141. In addition, the moving picture analysis unit 103 has processing units as described below, i.e., a person detection unit 171, a subject detection unit 173, and an object detection unit 175.

The moving picture data dividing unit 131, the face detection unit 133, the scene transition detection unit 135, the camerawork detection unit 137, and the audio analysis unit 139 according to the present variation respectively have the same configurations as the respective processing units of the first embodiment of the present invention, and respectively achieve the same effects. Therefore, the detailed descriptions thereabout are omitted in the below explanation.

Further, the moving picture metadata generation unit 141 according to the present variation generates the moving picture metadata based on results and the like output by the face detection unit 133, the scene transition detection unit 135, the camerawork detection unit 137, the person detection unit 171, the subject detection unit 173, and the object detection unit 175. The other functions of the moving picture metadata generation unit 141 according to the variation are the same as those of the moving picture metadata generation unit 141 according to the first embodiment of the present invention, and the present variation can provide substantially the same effects. Therefore, the detailed descriptions thereabout are omitted in the below explanation.

The person detection unit 171 is constituted by, for example, a CPU, a ROM, a RAM, and the like. The person detection unit 171 detects a portion corresponding to a person from the transferred image data, by using a classifier previously generated with a statistical learning processing such as AdaBoost method.

This classifier is generated by combining, for example, a clothes classifier and an outline classifier. The clothes classifier is a relatively strong classifier constituted by a plurality of weak classifiers generated through statistical learning. The clothes classifier is used when a determination is made as to whether the transferred image includes a region of an image of a person based on features of clothes of the person. The outline classifier is a relatively strong classifier constituted by a plurality of weak classifiers generated through statistical learning. The outline classifier is used when a determination is made as to whether the transferred image includes a region of an image of a person based on the outline of the person.

When the person detection unit 171 receives image data transferred from the moving picture data dividing unit 131, the person detection unit 171 extracts clothes features and outline features from the transferred image data. The person detection unit 171 calculates clothes feature quantity and outline feature quantity based on the extracted features. The person detection unit 171 calculates by substituting the calculated clothes feature quantity and the calculated outline quantity into the classifier, determines whether a person is recognized (detected) in the image or not based on the obtained calculation result, and outputs the identification result.

The person detection unit 171 according to the present variation notes the two kinds of feature quantities, i.e., clothes and outline of a person. Thereby, the person detection unit 171 can detect a person from an image as long as the person detection unit 171 can sufficiently extract at least one of the feature quantities from the transferred image.

The person detection unit 171 transfers the detection result as to whether the transferred image includes a person or not to the moving picture metadata generation unit 141. Further, when the person detection unit 171 detects a plurality of persons in the image, the person detection unit 171 may transfer the number of detected persons to the moving picture metadata generation unit 141.

When the image includes a person, the person detection unit 171 may transfer position information representing a position of a pixel corresponding to the person to the moving picture metadata generation unit 141. The position information thus output allows other processing units according to the present variation to easily recognize at which position in the image the person is present. Further, the person detection unit 171 may transfer the calculation result of the image on which the person detection processing is performed (score output by the classifier) to the moving picture metadata generation unit 141.

The subject detection unit 173 is constituted by, for example, a CPU, a ROM, a RAM, and the like. The subject detection unit 173 detects, as a subject to be photographed, an object in the transferred image which a user is expected to be interested in when the user sees the image, namely, an object which a user is considered to look at.

The subject detection unit 173 detects the subject, for example, based on the degree of blur of the transferred image (the degree of out-of-focus), the degree of appropriateness of exposure, the degree of appropriateness of white balance, and the like. The detection processing of the subject performed by the subject detection unit 173 will be concretely described as follows.

When the subject detection unit 173 receives image data transferred from the moving picture data dividing unit 131, the subject detection unit 173 generates a brightness information map representing information about brightness for each region of the corresponding image based on the transferred image. Further, the subject detection unit 173 also generates a color information map representing information about color constituting the image for each region of the corresponding image based on the transferred image. The subject detection unit 173 also generates an edge information map representing information about edges for each region of the corresponding image based on the transferred image. The subject detection unit 173 also generates a facial information map representing information about faces of person as a subject for each region of the corresponding image based on the transferred image. The subject detection unit 173 also generates a movement information map representing information about movement for each region of the corresponding image based on the transferred image.

The information included in these information maps is information which indicates feature quantities of features significantly present in a region including the subject. In the information maps, this information is associated with each region of the transferred image. In other words, the information maps are information representing the feature quantities in each region of the transferred image. The above-described information maps are merely examples. An information map other than the above may be generated. Alternatively, only some of the above-described information maps may be generated.

The subject detection unit 173 generates a subject map by linearly combining the generated information maps. In other words, the subject map is generated by weighting and adding information (feature quantities) of each region of the above-described information maps, for each of the regions are co-located.

Subsequently, the subject detection unit 173 generates an index representing the degree of blur of the subject (out-of-focus index) with respect to the region of the subject in the transferred image, by using the transferred image and the generated subject map. The subject detection unit 173 also generates an index representing the degree of appropriateness of exposure in the entire transferred image (exposure index) based on the transferred image. The subject detection unit 173 also generates an index representing the degree of appropriateness of white balance in the entire transferred image (white balance index) based on the transferred image.

The subject detection unit 173 makes a subject score of the transferred image by linearly combining these generated indexes using preset weights. The subject detection unit 173 detects, as a subject, a region in which the calculated subject score is equal to or more than a predetermined threshold value.

The subject detection unit 173 transfers the detection result as to whether the transferred image includes a subject or not to the moving picture metadata generation unit 141. When a plurality of subjects are detected in the image, the subject detection unit 173 may transfer the number of detected subjects to the moving picture metadata generation unit 141.

When the image includes a subject, the subject detection unit 173 may transfer positional information representing a position of a pixel corresponding to the subject to the moving picture metadata generation unit 141. The output of such positional information allows other processing units according to the present variation to easily recognize at which position in the image the subject is present. Alternatively, the subject detection unit 173 may transfer any or all of the subject sore, the out-of-focus index. the exposure index, the white balance index, which have been calculated, to the moving picture metadata generation unit 141.

The object detection unit 175 is constituted by, for example, a CPU, a ROM, a RAM, and the like. The object detection unit 175 detects from the transferred image an object previously registered in a database. Therefore, when a user of the information processing apparatus 10 according to the present variation previously registers various data characterizing objects to the database, it is possible to detect from the image the object reflecting the user's preferences.

The object detection unit 175 generates an edge image by performing an edge detection processing on an image including general objects and an object specified by a user of the information processing apparatus 10. The object detection unit 175 extracts regional feature quantities at edge points on the generated edge image and points supporting these edge points, associates the extracted points with geometric positional relationship, and registers them to the database.

When the object detection unit 175 receives the image data transferred from the moving picture data dividing unit 131, the object detection unit 175 generates an edge image by performing an edge detection processing on the transferred image. The object detection unit 175 calculates the regional feature quantities at the edge points on the edge image by using the generated edge image. The object detection unit 175 searches the feature quantities and the geometric positional relationship of the edge points registered in the database, and determines whether the database includes data similar to the generated regional feature quantities and the like. When the database includes similar data previously registered, the object detection unit 175 outputs the detection result to the moving picture metadata generation unit 141 because the image includes the corresponding object. When a plurality of objects are detected in the image, the object detection unit 175 may transfer the type and the number of detected objects to the moving picture metadata generation unit 141.

Being provided with these processing units, in addition to the functions of the moving picture analysis unit 103 according to the first embodiment, the moving picture analysis unit 103 according to the present variation is allowed to detect a person from the moving picture, a subject to which a user pays attention, and an object specified by a user, and the like. Thereby, the moving picture analysis unit 103 according to the present variation can analyze the contents of the moving picture with regards to various points. As a result, the information processing apparatus 10 according to the present variation can generate a comic display screen reflecting the contents of the moving picture in a more natural and impressive manner.

The person detection method, the subject detection method, and the object detection method in the above explanation are mere examples. The details of the detection processings executed by the moving picture analysis unit 103 according to the present variation are not limited to the above-described examples. The moving picture analysis unit 103 according to the present variation can also detect a person, a subject, and an object by using processings other than the above-described method.

Alternatively, each of the face detection unit 133, the person detection unit 171, the subject detection unit 173, and the object detection unit 175 may be configured to preferentially detect a predetermined detection object such as a person (object) in the image that is detected first, a person (object) detected with the highest accuracy, a person (face) oriented toward a predetermined direction, a person who is smiling, and the like.

In the above explanation, the detection result and the like transferred to the moving picture metadata generation unit 141 are merely examples. If a detection result and the like other than the above-described detection result is available to be used as a feature quantity characterizing the moving picture, such detection result may be used as the moving picture metadata.

[Arrangement Processing of Effect Image]

Next, the arrangement processing of the effect image performed by the comic display conversion unit 107 according to the present variation will be described in detail with reference to FIG. 31A to FIG. 31E and FIG. 32. FIG. 31A to FIG. 31E and FIG. 32 are explanatory diagrams for illustrating the arrangement method of the effect image according to the present variation.

The effect image arrangement unit 161 of the comic display conversion unit 107 may arrange the effect image in accordance with the analysis result of the moving picture provided by the moving picture analysis unit 103 under the policy described below.

Figure 31A:
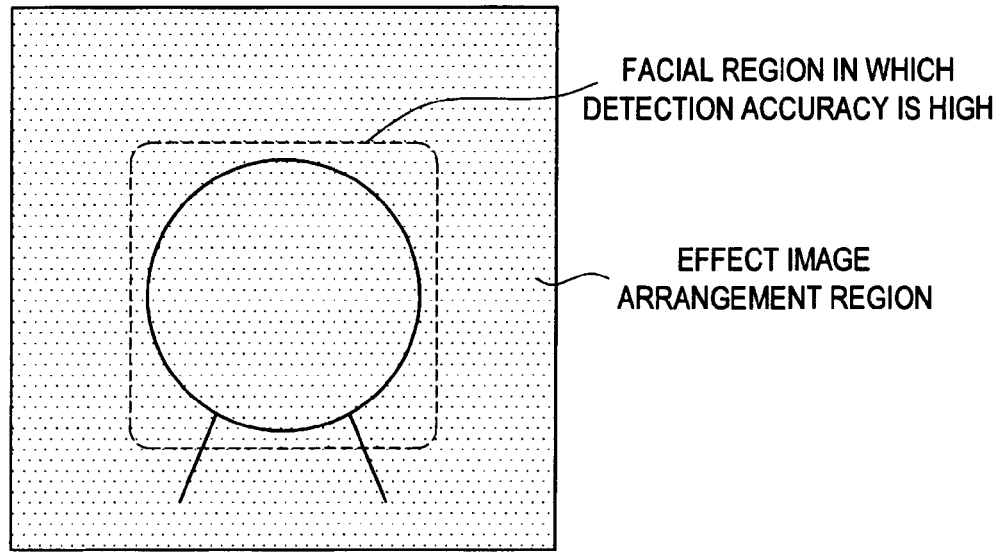
FIG. 31A is an explanatory diagram for illustrating a method for arranging the effect images according to the variation.

For example, when the image includes a facial region detected with a high accuracy, the effect image arrangement unit 161 may arrange an effect of radial lines on the entire frame including the facial region in order to emphasize the facial region as shown in FIG. 31A. Herein, examples of a facial region detected with a high accuracy include a region in which a numerical value (score) calculated in the face detection processing is equal to or more than a predetermined threshold value. As a result, as shown in FIG. 31A, the entire frame becomes an effect image arrangement region, i.e., a region in which the effect image is arranged, and the effect image arrangement unit 161 arranges the effect of radial lines in this effect image arrangement region.

Figure 31B:
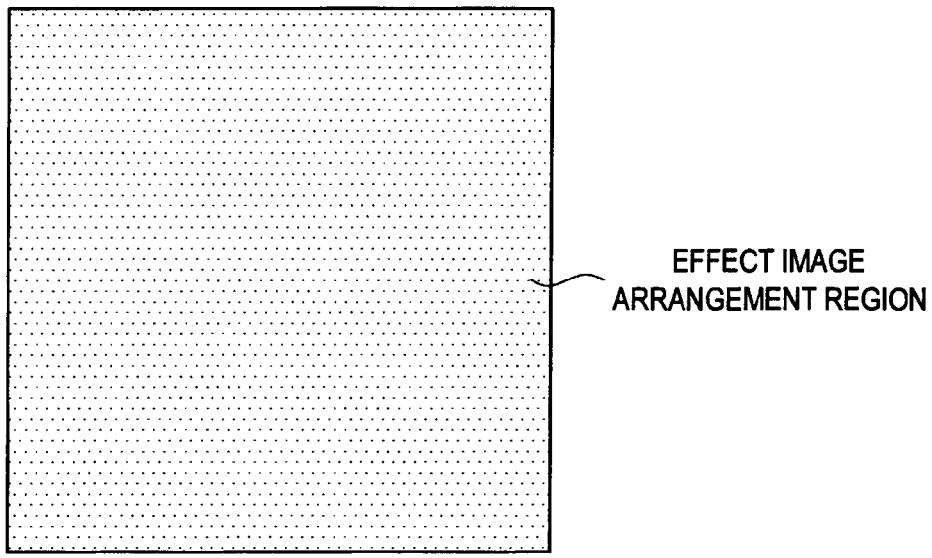
FIG. 31B is an explanatory diagram for illustrating the method for arranging the effect images according to the variation.

There may be a case where the moving picture analysis unit 103 notifies to the comic display conversion unit 107 a result that particular regions (facial region, person region, subject region, object region) and the like are not detected and only audio is detected. At this occasion, the effect image arrangement unit 161 may arrange a predetermined effect image indicating the presence of audio as shown in FIG. 31B, on the entire frame region.

There may also be a case where the moving picture analysis unit 103 notifies to the comic display conversion unit 107 a result that a region is detected without a high accuracy and audio is detected therewith. At this occasion, the effect image arrangement unit 161 may arrange an effect image arrangement region so as to avoid the detected region (region detected without a high accuracy) and arrange an effect of a speech balloon and the like corresponding to the audio in this effect image arrangement region. At this occasion, the effect image arrangement unit 161 preferably takes into consideration a relative positional relationship between the region detected without a high precision and the effect image arrangement region and sets the direction of the effect image being arranged. The size of the effect image arrangement region set herein is determined in accordance with an aspect ratio and the like of the frame as necessary.

Figure 31C:
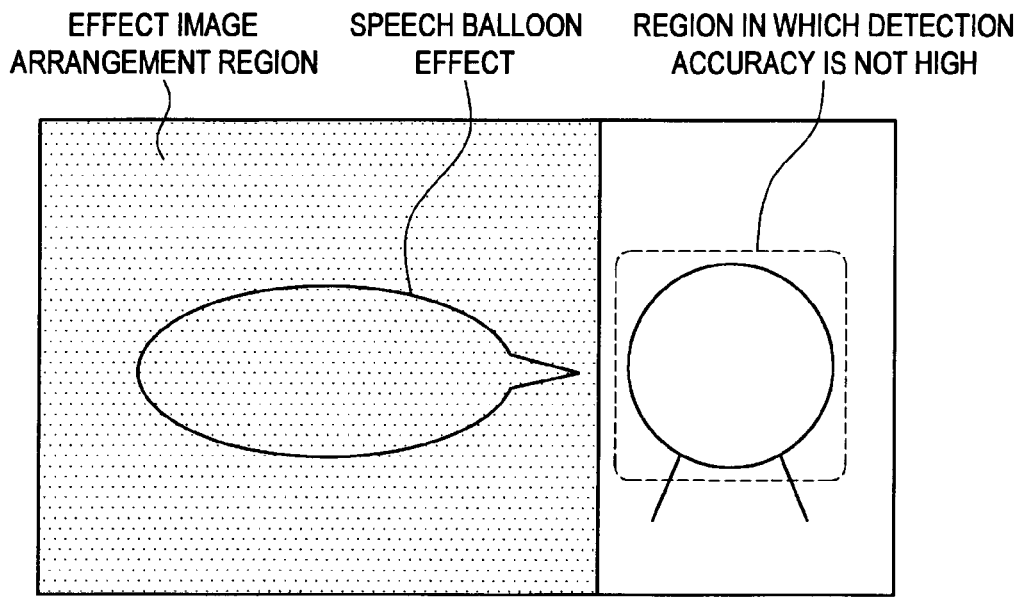
FIG. 31C is an explanatory diagram for illustrating the method for arranging the effect images according to the variation.
Figure 31D:
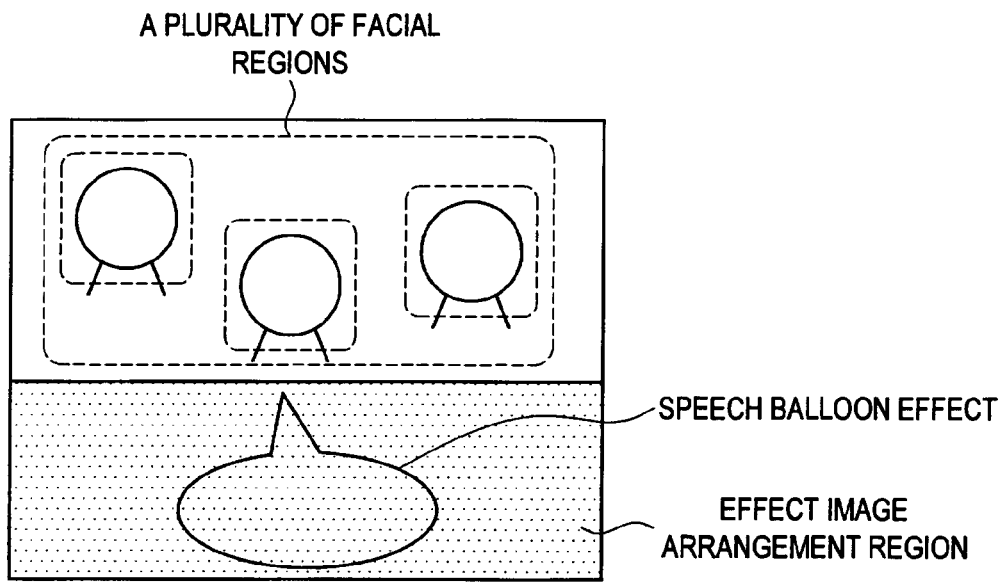
FIG. 31D is an explanatory diagram for illustrating the method for arranging the effect images according to the variation.

For example, as shown in FIG. 31C, when a facial region is detected without a high accuracy on the right side of the frame, and audios is also detected therewith, the effect image arrangement unit 161 arranges the effect image arrangement region on the left side of the frame so as to avoid the detected facial region. Further, the detected audios often have a relation with the detected facial region, the effect image arrangement unit 161 sets the effect of speech balloon in such a direction: from the right side to the left side of the frame in which the facial region is present.

When a region without a high accuracy is detected and an effect image is arranged so as to emphasize the detected region, there arises a possibility that an incorrect detection result is emphasized if the detection has failed. In order to avoid such situation, as shown in FIG. 31C, the effect image is arranged so as to avoid the detected region. Therefore, even when an incorrect detection result is output, it is highly possible that a natural effect can be applied to the image being processed.

Further, there may be a case where the moving picture analysis unit 103 notifies to the comic display conversion unit 107 a result that a plurality of regions are detected and audio is also detected therewith. At this occasion, the effect image arrangement unit 161 sets a larger region so as to include the plurality of detected regions. The effect image arrangement unit 161 may sets an effect image arrangement region so as to avoid the arranged region, and may arrange an effect of speech balloon and the like corresponding to the audio in this effect image arrangement region. At this occasion, the effect image arrangement unit 161 preferably takes into consideration a relative positional relationship between the arranged larger region and the effect image arrangement region and sets the direction of the effect image being arranged.

Figure 31E:
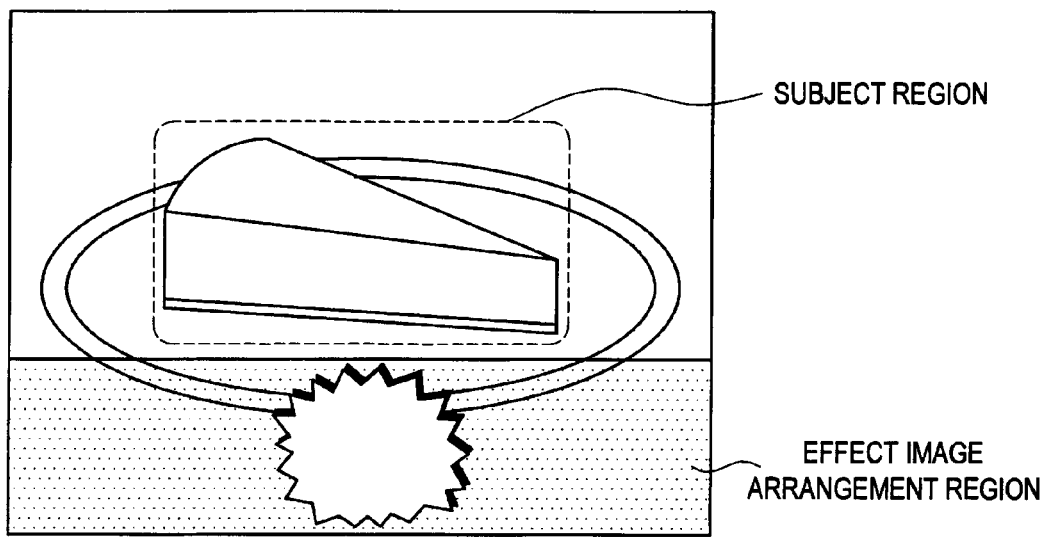
FIG. 31E is an explanatory diagram for illustrating the method for arranging the effect images according to the variation.

The effect image arrangement unit 161 can arrange the effect image as described above, not only when a person and a face are detected but also when an objected detected as a subject to be photographed and an object in general are detected as shown FIG. 31E.

Figure 32:
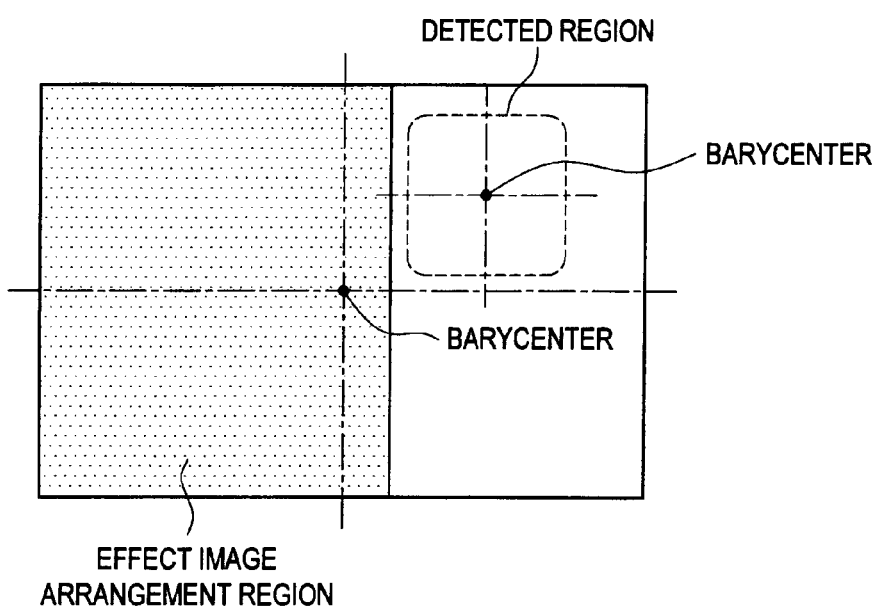
FIG. 32 is an explanatory diagram for illustrating the method for arranging the effect images according to the variation.

When the effect image arrangement unit 161 arranges the effect image out of consideration for the direction of the effect image, the effect image arrangement unit 161 determines the direction of the effect image upon calculating a relative positional relationship between a position of a barycenter of the entire frame and a position of a barycenter of the detected region, for example, as shown in FIG. 32. Thereby, the effect image arrangement unit 161 can effectively arrange the effect image while avoiding occlusion and improving the relativity between the effect image and the detected region.

Second Embodiment

Subsequently, the information processing apparatus and the information processing method according to a second embodiment of the present invention will be described in detail with reference to FIG. 33 to FIG. 37. In the information processing apparatus and the information processing method according to the present embodiment, useful images for recognizing contents of the moving picture and the still picture are automatically extracted by use of a result of analysis on a moving picture and still pictures, and the extracted images are displayed in such a manner as to allow a user to easily understand the contents. Thereby, when an event is recorded using both of a moving picture and still pictures, the content of the event can be easily understood without distinguishing the moving picture and the still pictures.

<Configuration of Information Processing Apparatus>

Figure 33:
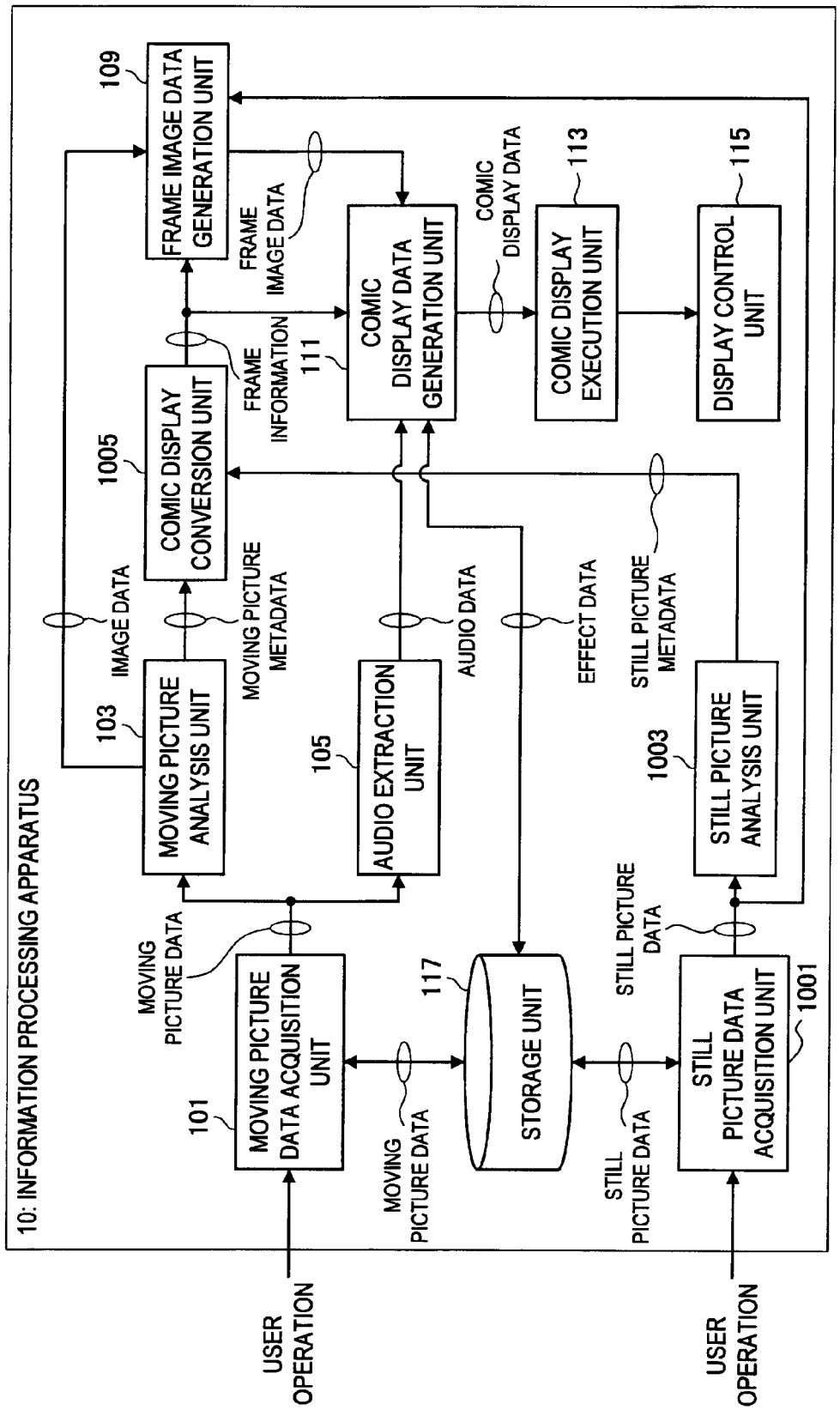
FIG. 33 is a block diagram for illustrating a configuration of an information processing apparatus according to a second embodiment of the present invention.
Figure 34:
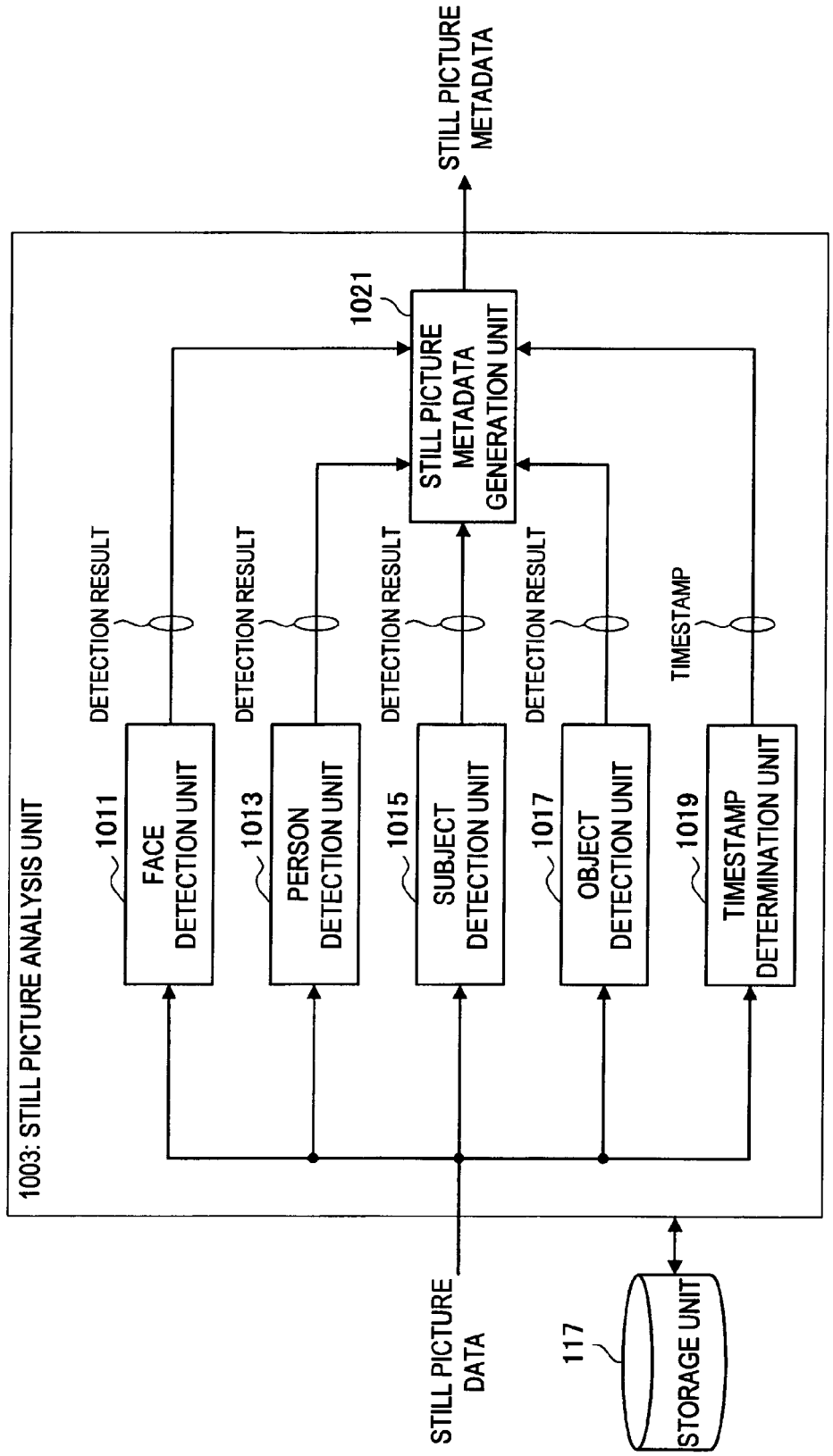
FIG. 34 is an explanatory diagram for illustrating a configuration of a still picture analysis unit according to the embodiment.
Figure 35:
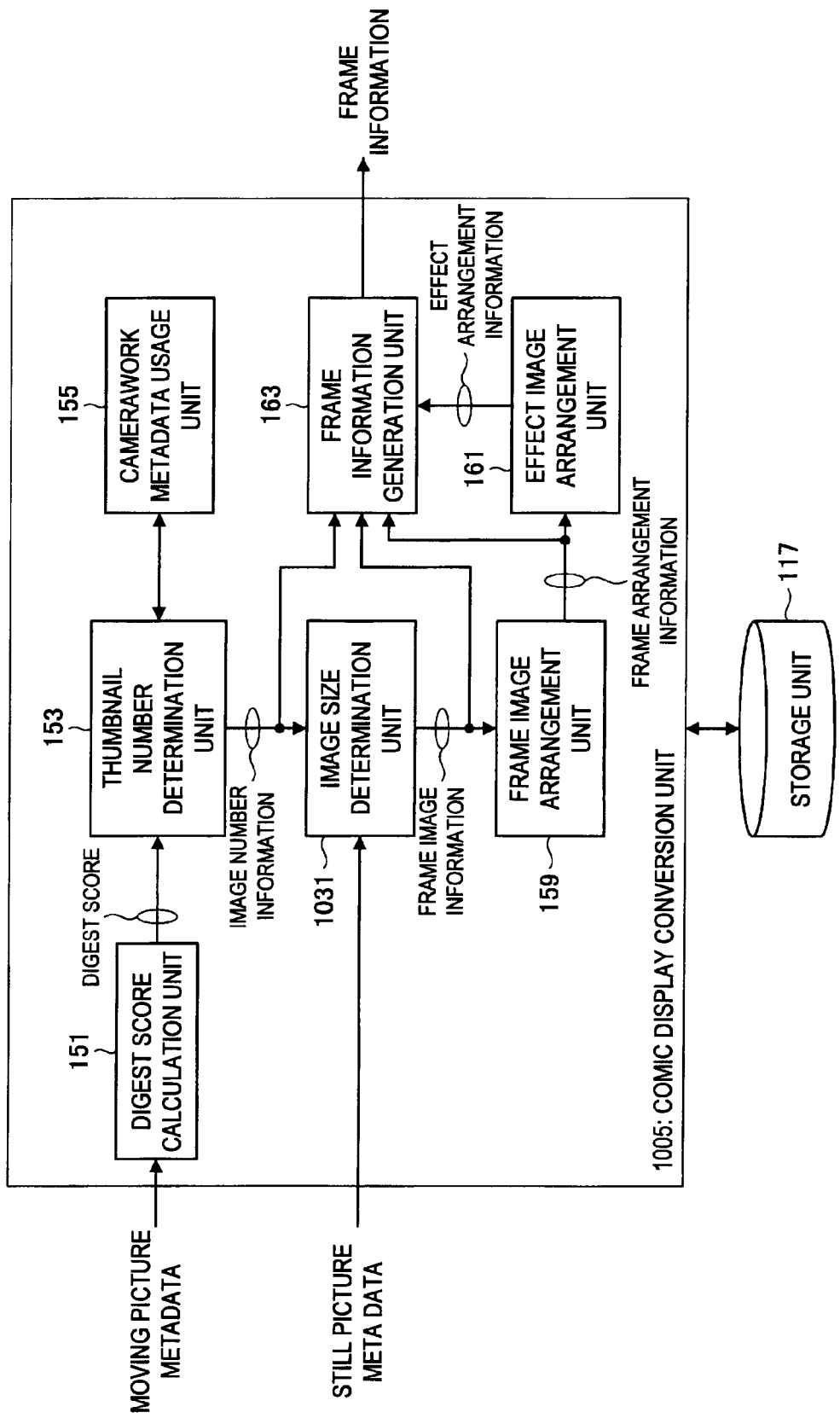
FIG. 35 is an explanatory diagram for illustrating a configuration of a comic display conversion unit according to the embodiment.

First, the configuration of the information processing apparatus according to the present embodiment will be described in detail with reference to FIG. 33 to FIG. 35. FIG. 33 is a block diagram for illustrating the configuration of the information processing apparatus according to the present embodiment. FIG. 34 is a block diagram for illustrating a configuration of a still picture analysis unit 1003 according to the present embodiment. FIG. 35 is a block diagram for illustrating a configuration of a comic display conversion unit 1005 according to the present embodiment.

[Entire Configuration of Information Processing Apparatus]

For example, as shown in FIG. 33, the information processing apparatus 10 according to the present embodiment includes the moving picture data acquisition unit 101, the moving picture analysis unit 103, the audio extraction unit 105, the frame image data generation unit 109, the comic display data generation unit 111, and the comic display execution unit 113. Further, the information processing apparatus 10 includes the display control unit 115, the storage unit 117, a still picture data acquisition unit 1001, the still picture analysis unit 1003, and the comic display conversion unit 1005. In addition to the above-described processing units, the information processing apparatus 10 may include, for example, a communication control unit (not shown) for controlling communication with any apparatus via any communication network.

In this second embodiment, the moving picture data acquisition unit 101, the moving picture analysis unit 103, the audio extraction unit 105, the frame image data generation unit 109, the comic display data generation unit 111, the comic display execution unit 113, the display control unit 115, and the storage unit 117 have substantially the same configurations as the processing units according to the first embodiment, and achieve substantially the same effects. Therefore, the detailed descriptions thereabout will be omitted in the below explanation.

The still picture data acquisition unit 1001 is constituted by, for example, a CPU, a ROM, a RAM, a communication apparatus, and the like. The still picture data acquisition unit 1001 obtains still picture data corresponding to a still picture specified by a user from the storage unit 117 and various kinds of recording media inserted into the information processing apparatus 10, in accordance with user operation performed on the information processing apparatus 10. Herein, the still picture data is assumed to be associated with time information about time at which the still picture data was generated. Alternatively, the still picture data acquisition unit 1001 can obtain still picture data from another apparatus connected to the information processing apparatus 10, and can obtain still picture data from various kinds of servers connected via a communication network such as the Internet. The still picture data acquisition unit 1001 transfers the obtained still picture data to the still picture analysis unit 1003 and the frame image data generation unit 109.

The still picture analysis unit 1003 is constituted by, for example, a CPU, a ROM, a RAM, and the like. The still picture analysis unit 1003 analyses the transferred still picture data and extracts feature quantities characterizing the still picture. The still picture analysis unit 1003 generates still picture metadata, i.e., metadata relating to the feature quantities by using the extracted feature quantities. The still picture analysis unit 1003 transfers the generated still picture metadata to the later-described comic display conversion unit 1005. The still picture analysis unit 1003 may use not only the still picture metadata generated by analyzing the still picture but also metadata that is obtainable from an imaging apparatus such as a digital camera, as still picture metadata which will be used by the later-described comic display conversion unit 1005. Herein, the metadata that is obtainable from an imaging apparatus includes, for example, operation history of a favorite button, a zoom-in button, a zoom-out button, and the like.

The still picture analysis unit 1003 will be described in detail again in the below.

The comic display conversion unit 1005 is constituted by, for example, a CPU, a ROM, a RAM, and the like. The comic display conversion unit 1005 extracts a plurality of images from among the moving picture data and the still picture data based on the moving picture metadata and the still picture metadata. The comic display conversion unit 1005 also divides a predetermined display region into frames, and converts the arrangement of the extracted plurality of images into a comic-like arrangement. Further, the comic display conversion unit 1005 generates frame information including information about the image arranged in each frame. The comic display conversion unit 1005 transfers the generated frame information to the frame image data generation unit 109 and the comic display data generation unit 111.

The comic display conversion unit 1005 will be described in detail again in the below.

[Configuration of Still Picture Analysis Unit 1003]

Subsequently, the configuration of the still picture analysis unit 1003 according to the present embodiment will be described in detail with reference to FIG. 34.

For example, as shown in FIG. 34, the still picture analysis unit 1003 according to the present embodiment mainly includes a face detection unit 1011, a person detection unit 1013, a subject detection unit 1015, an object detection unit 1017, a timestamp determination unit 1019, and the still picture metadata generation unit 1021.

Herein, the face detection unit 1011, the person detection unit 1013, the subject detection unit 1015, and the object detection unit 1017 have the same configurations as the processing units according to the first embodiment and the first variation of the first embodiment of the present invention, and achieve the same effects. Therefore, the detailed descriptions thereabout are omitted.

The timestamp determination unit 1019 is constituted by, for example, a CPU, a ROM, a RAM, and the like. The timestamp determination unit 1019 references the time information associated with the still picture data transferred from the still picture data acquisition unit 1001, and determines when the still picture data was generated. The timestamp determination unit 1019 transfers the timestamp of the still picture data to the later-described still picture metadata generation unit 1021.

Such timestamp, i.e., one of the still picture metadata, transferred to the still picture metadata generation unit 1021 enables other processing units in the information processing apparatus 10 to determine when the corresponding still picture was generated. When such timestamp is identified, the frame image arrangement unit 159 of the comic display conversion unit 1005 can easily determine into which position of the plurality of images selected from the moving picture the extracted still picture is to be inserted.

The still picture metadata generation unit 1021 is constituted by, for example, a CPU, a ROM, a RAM, and the like. The still picture metadata generation unit 1021 generates still picture metadata relating to feature quantities characterizing the still picture, based on the detection result and the like transferred from the face detection unit 1011, the person detection unit 1013, the subject detection unit 1015, the object detection unit 1017, and the timestamp determination unit 1019. In other words, the still picture metadata includes metadata relating to the feature quantities extracted from the image data.

The still picture metadata generation unit 1021 transfers the still picture metadata generated as described above to the comic display conversion unit 1005.

The configuration of the still picture analysis unit 1003 according to the present embodiment has been described hereinabove. FIG. 34 shows a case where the still picture analysis unit 1003 has the face detection unit 1011, the person detection unit 1013, the subject detection unit 1015, and the object detection unit 1017. Alternatively, the still picture analysis unit 1003 may have only some of the above processing units.

In the information processing apparatus 10 according to the present embodiment, each of the moving picture analysis unit 103 and the still picture analysis unit 1003 has the processing units (detection units) of the same functions. Alternatively, the information processing apparatus 10 may be provided with detection units, each of which is shared by both of the moving picture analysis unit 103 and the still picture analysis unit 1003.

[Configuration of Comic Display Conversion Unit 1005]

Subsequently, the configuration of the comic display conversion unit 1005 according the present embodiment will be described in detail with reference to FIG. 35.

The comic display conversion unit 1005 mainly includes the digest score calculation unit 151, the thumbnail number determination unit 153, the camerawork metadata usage unit 155, the frame image arrangement unit 159, the effect image arrangement unit 161, the frame information generation unit 163, and an image size determination unit 1031.

Here, the digest score calculation unit 151, the thumbnail number determination unit 153, the camerawork metadata usage unit 155, the frame image arrangement unit 159, the effect image arrangement unit 161, and the frame information generation unit 163 have the same configurations as the processing units according to the first embodiment and the first variation of the first embodiment of the present invention, and achieve the same effects. Therefore, the detailed descriptions thereabout are omitted.

The image size determination unit 1031 is constituted by, for example, a CPU, a ROM, a RAM, and the like. The image size determination unit 1031 determines sizes of thumbnail images of a moving picture to be arranged in a predetermined display region based on digest scores, in the same manner as the image size determination unit 157 according to the first embodiment.

When the selected thumbnail image has moving picture data indicating that a face is present, the image size determination unit 1031 determines the image size in such a manner as to enlarge a facial region, i.e., a region in which a face is shown. When a plurality of facial regions are present in the image, the image size determination unit 1031 enlarges the size of the image data in such a manner that all of the facial regions are included in the image.

The image size determination unit 1031 determines the sizes of the thumbnail images of the still pictures to be arranged in the predetermined display region, based on the still picture metadata transferred from the still picture analysis unit 1003. The image size determination unit 1031 can also select still pictures used for displaying the comic from among the plurality of still pictures input to the information processing apparatus 10, based on the still picture metadata and the sizes of the still pictures. For example, the image size determination unit 1031 may preferentially select still pictures having metadata indicating a detection of a face, a person, a subject, and the like. The image size determination unit 1031 may preferentially select still pictures of large image sizes based on the image sizes of the still pictures, which were determined by a below-described method for determining an image size. The method for determining an image size of a still picture based on the still picture metadata will be described in detail again in the below.

The image size determination unit 1031 transfers information about the sizes of the thumbnail images of the moving picture and the still picture thus set (furthermore, the sizes of the animation frame images) as frame image information to the frame image arrangement unit 159 and the frame information generation unit 163.

Exemplary functions of the information processing apparatus 10 according to the present embodiment have been described hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the technical level at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed, for example, via a network, without using the recording medium.

<Information Processing Method>

Figure 36:
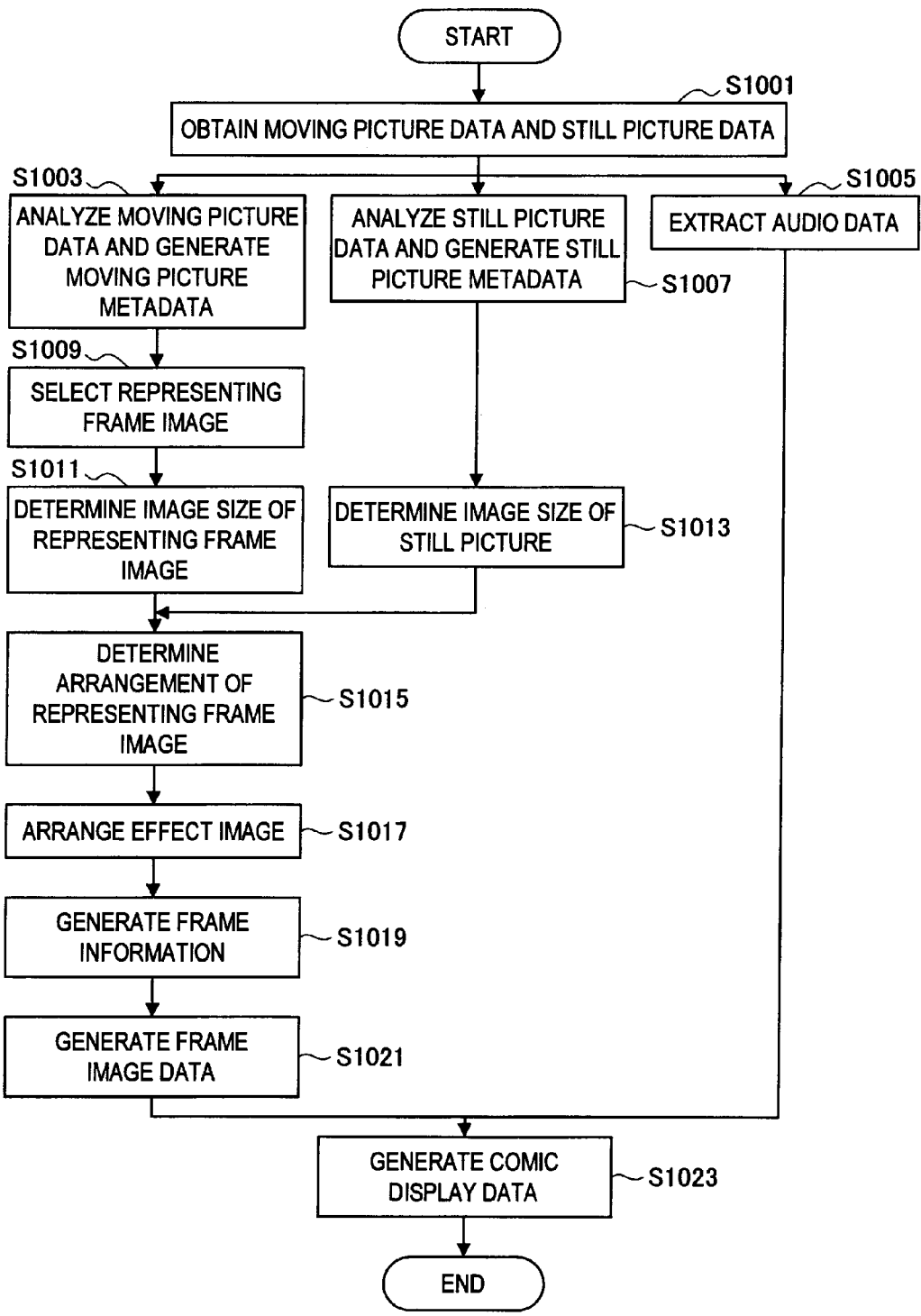
FIG. 36 is a flow diagram for illustrating overall flow of an information processing method according to the embodiment.
Figure 37:
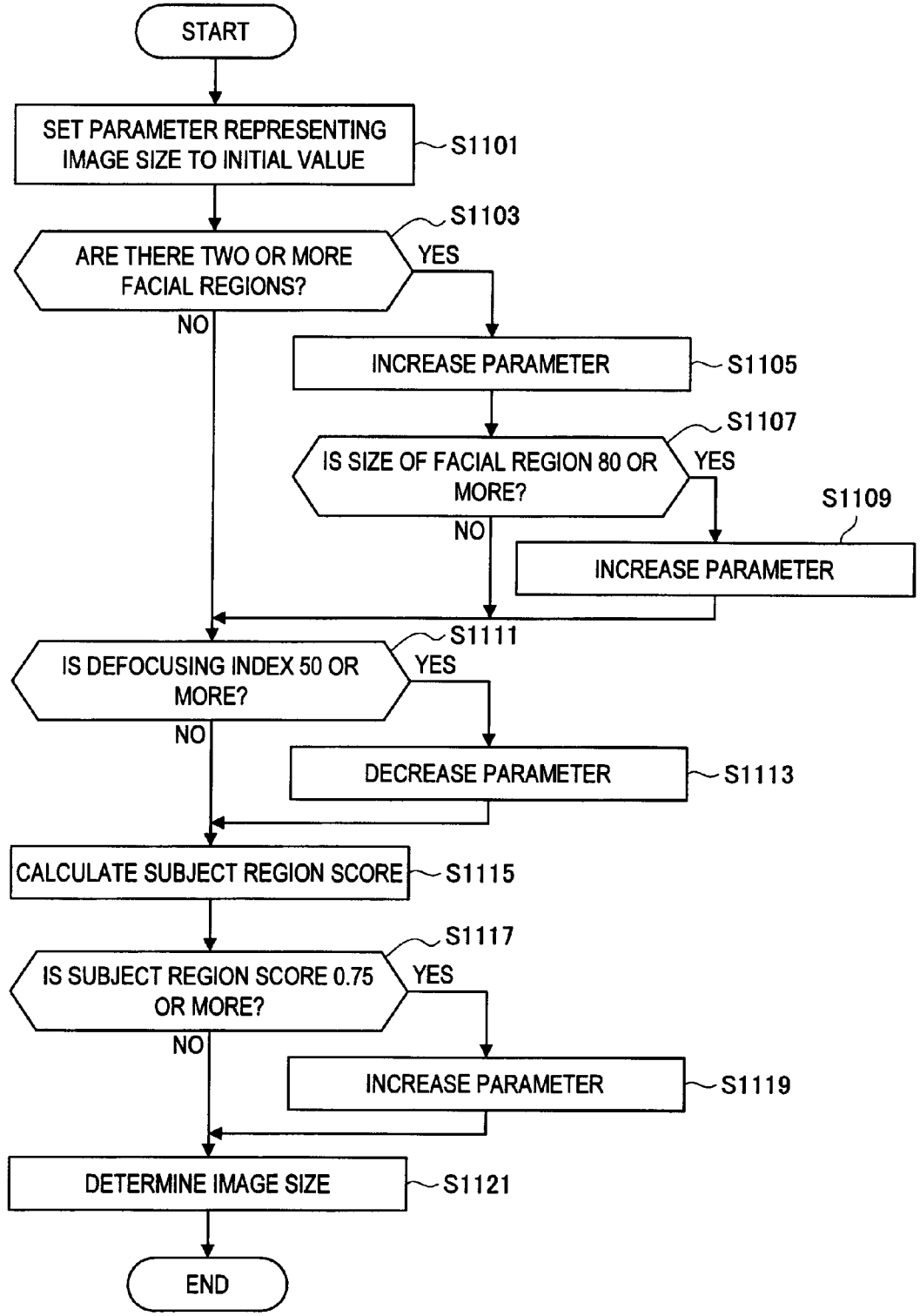
FIG. 37 is a flow diagram for illustrating a method for determining an image size of a still picture.

Subsequently, the information processing method according to the present embodiment will be described in detail with reference to FIG. 36 and FIG. 37. FIG. 36 is a flow diagram for illustrating overall flow of the information processing method according to the present embodiment. FIG. 37 is a flow diagram for illustrating the method for determining an image size of a still picture.

[Overall Flow of Information Processing Method]

First, overall flow of the information processing method according to the present embodiment will be described in detail with reference to FIG. 36.

First, the moving picture data acquisition unit 101 of the information processing apparatus 10 according to the present embodiment obtains moving picture data corresponding to a moving picture specified by a user in accordance with users's operation (step S1001). The moving picture data acquisition unit 101 may obtain the moving picture data from the storage unit 117 and the like in the information processing apparatus 10 or from various kinds of recording media attached to the information processing apparatus 10. Alternatively, the moving picture data acquisition unit 101 may obtain the moving picture data from other apparatuses connected wirelessly or connected via wire, and may obtain the moving picture data from other apparatuses connected via a communication network such as the Internet. The moving picture data acquisition unit 101 transfers the obtained moving picture data to the moving picture analysis unit 103 and the audio extraction unit 105.

Further, the still picture data acquisition unit 1001 of the information processing apparatus 10 according to the present embodiment obtains still picture data corresponding to a still picture specified by a user in accordance with user's operation (step S1001). The still picture data acquisition unit 1001 may obtain the still picture data from the storage unit 117 and the like in the information processing apparatus 10 or from various kinds of recording media attached to the information processing apparatus 10. Alternatively, the still picture data acquisition unit 1001 may obtain the still picture data from another apparatus connected wirelessly or connected via wire, and may obtain the still picture data from another apparatus connected via a communication network such as the Internet. The still picture data acquisition unit 1001 transfers the obtained still picture data to the still picture analysis unit 1003 and the frame image data generation unit 109.

The moving picture analysis unit 103 analyzes the moving picture data transferred from the moving picture data acquisition unit 101, and generates moving picture metadata, i.e., metadata relating to feature quantities characterizing a moving picture corresponding to the transferred moving picture data (step S1003). The moving picture analysis unit 103 transfers the generated moving picture metadata to the comic display conversion unit 1005.

The audio extraction unit 105 extracts audio data from the moving picture data transferred from the moving picture data acquisition unit 101 (step S1005), and transfers the obtained audio data to the comic display data generation unit 111.

On the other hand, the still picture analysis unit 1003 analyzes still picture data transferred from the still picture data acquisition unit 1001, and generates still picture metadata, i.e., metadata relating to feature quantities characterizing a still picture corresponding to the transferred still picture data (step S1007). The still picture analysis unit 1003 transfers the generated still picture metadata to the comic display conversion unit 1005.

Subsequently, the digest score calculation unit 151 of the comic display conversion unit 1005 calculates digest scores of all of the images (frame images) constituting the moving picture based on the transferred moving picture metadata. The digest score calculation unit 151 transfers the calculated digest scores to the thumbnail number determination unit 153.

Subsequently, the thumbnail number determination unit 153 selects representing frame images used as thumbnail images by using the transferred digest scores and the moving picture metadata (step S1009). When the thumbnail number determination unit 153 finishes selecting the representing frame images, the thumbnail number determination unit 153 selects the animation frame images used for the thumbnail animation. The thumbnail number determination unit 153 generates image number information including information for identifying the selected representing frame images, information about the number of the representing frame images, information about the animation frame images relating to the representing frame images, and the like. The thumbnail number determination unit 153 transfers the generated image number information to the image size determination unit 1031 and the frame information generation unit 163.

At the time of determining reproduction speed of the animation frame images and the thumbnail animation, it is possible to reflect the analysis results provided by the camerawork metadata usage unit 155.

Subsequent, the image size determination unit 1031 determines the image sizes of the selected representing frame images displayed as comic, based on the image number information, the moving picture metadata, the digest scores, and the like having been transferred (step S1011). The image size determination unit 1031 determines the image sizes of the still pictures based on the still picture metadata and the like transferred from the still picture analysis unit 1003 (step S1013). The image size determination unit 1031 generates frame image information including information about the image sizes of the representing frame images, and transfers the frame image information to the frame image arrangement unit 159 and the frame information generation unit 163.

The image size determination unit 1031 can also select still pictures used for displaying the comic from among the plurality of still pictures input to the information processing apparatus 10, based on the still picture metadata and the sizes of the still pictures. For example, the image size determination unit 1031 may preferentially select still pictures having metadata indicating a detection of a face, a person, a subject, and the like. The image size determination unit 1031 may preferentially select still pictures of large image sizes based on the image sizes of the still pictures, which were determined by a below-described method for determining an image size.

Subsequently, the frame image arrangement unit 159 automatically arranges the representing frame images into the display region by using the frame image information, the moving picture metadata, and the like, which have been transferred, and determines the arrangement of the representing frame images (step S1015). When the frame image arrangement unit 159 determines the arrangement of the representing frame images, the frame image arrangement unit 159 generates frame arrangement information including information about which representing frame images are arranged at which positions, and transfers the generated frame arrangement information to the effect image arrangement unit 161 and the frame information generation unit 163.

Subsequently, the effect image arrangement unit 161 arranges effect images such as speech balloons and the like based on the frame arrangement information, the moving picture metadata, the still picture metadata, and the like having been transferred (step S1017). At this moment, the effect image arrangement unit 161 arranges the effect images in accordance with the method for arranging the effect images as described in the first embodiment and the first variation of the first embodiment of the present invention. When the effect image arrangement unit 161 finishes arranging the effect images, the effect image arrangement unit 161 generates effect arrangement information including information about which effects are arranged and where the effects are arranged, and transfers the generated effect arrangement information to the frame information generation unit 163.

At the time of arranging the image size, and the frame images and the effect images, it is possible to use the feature quantities relating to camerawork included in the moving picture metadata.

Subsequently, the frame information generation unit 163 generates frame information based on the image number information, the frame image information, the frame arrangement information, the effect arrangement information, and the like transferred from each processing unit (step S1019). The frame information generation unit 163 transfers the generated frame information to the frame image data generation unit 109 and the comic display data generation unit 111.

Subsequently, the frame image data generation unit 109 performs processing for adjusting the sizes and the shapes of the frame images used for displaying the comic based on the image data and the frame information, and generates frame image data used for displaying the comic (step S1021). The frame image data generation unit 109 transfers the generated frame image data to the comic display data generation unit 111.

The comic display data generation unit 111 generates audio data used for displaying the comic, based on the audio data transferred from the audio extraction unit 105 and the frame information transferred from the comic display conversion unit 1005. Further, the comic display data generation unit 111 generates comic display data, i.e., a set of data used to display the comic, by using the frame information, the audio data, the frame image data, and the effect data (step S1023).

The information processing apparatus 10 can display the comic, serving as the summary of the contents of the moving picture, on the display screen by executing the generated comic display data.

When a frame image generated from a still picture is viewed after a comic is generated, animation can be made by moving one still picture. Further, for the frame image generated from still pictures, images used for animation may be selected from the plurality of still pictures through still picture clustering, and animation can be made using the selected pictures.

[Method for Determining Image Size of Still Picture]

Subsequently, the method for determining an image size of a still picture carried out by the image size determination unit 1031 will be described in detail with reference to FIG. 37.

When determining image size of a still picture, the image size determination unit 1031 firstly sets an initial value to a parameter representing the image size of the still picture (step S1101).

Subsequently, the image size determination unit 1031 references the still picture metadata transferred from the still picture analysis unit 1003, and determines whether two or more facial regions are detected in a still picture being processed (step S1103). When two or more facial regions are not detected, the image size determination unit 1031 executes step S1111, which is described later. When two or more facial regions are detected, the image size determination unit 1031 increases a parameter representing the image size (step S1105). Subsequently, the image size determination unit 1031 determines whether the size of the detected facial region is equal to or more than 80 pixels (step S1107). When the size of the facial region is equal to or more than 80 pixels, the image size determination unit 1031 increases the parameter representing the image size (step S1109). When the size of the facial region is not equal to or more than 80 pixels, the image size determination unit 1031 executes step S1111, which is described later.

Subsequently, the image size determination unit 1031 references the still picture metadata, and determines the out-of-focus index of the still picture being processed is equal to or more than 50 (step S1111). When the out-of-focus index is equal to or more than 50, there may be a possibility that the image is blurred. Therefore, the image size determination unit 1031 decreases the parameter representing the image size (step S1113), and thereafter, executes step S1115, which is described later. When the out-of-focus index is not equal to or more than 50, the image size determination unit 1031 executes step S1117, which is described later.

Subsequently, the image size determination unit 1031 calculates a subject region score defined as (area detected as a subject/distance from center of image) (step S1115), and determines whether the calculated subject region score is 0.75 or more (step S1117). When the subject region score is 0.75 or more, the image size determination unit 1031 increases the parameter representing the image size (step S1119), and executes step S1121, which is described later. When the subject region score is not 0.75 or more, the image size determination unit 1031 executes step S1121, which is described later.

Subsequently, the image size determination unit 1031 references the resulting parameter representing the image size, and determines the image size based on the parameter (step S1121).

The image size determination unit 1031 can determine the image size used for displaying the comic by performing the processings based on the still picture metadata in accordance with such procedure.

The respective threshold values shown in the above explanation are merely examples, and can be set to any value in accordance with various factors such as photographing conditions, sizes, and the like of the still pictures processed by the image size determination unit 1031.

Third Embodiment

Next, the information processing apparatus according to the third embodiment of the present invention will be described in detail with reference to FIG. 38. The information processing apparatus according to the present embodiment automatically extracts useful images for recognition of contents of a series of still pictures by using a result of analysis, and displays the extracted image in such a manner as to allow a user to easily understand the contents.

<Configuration of Information Processing Apparatus>

Figure 38:
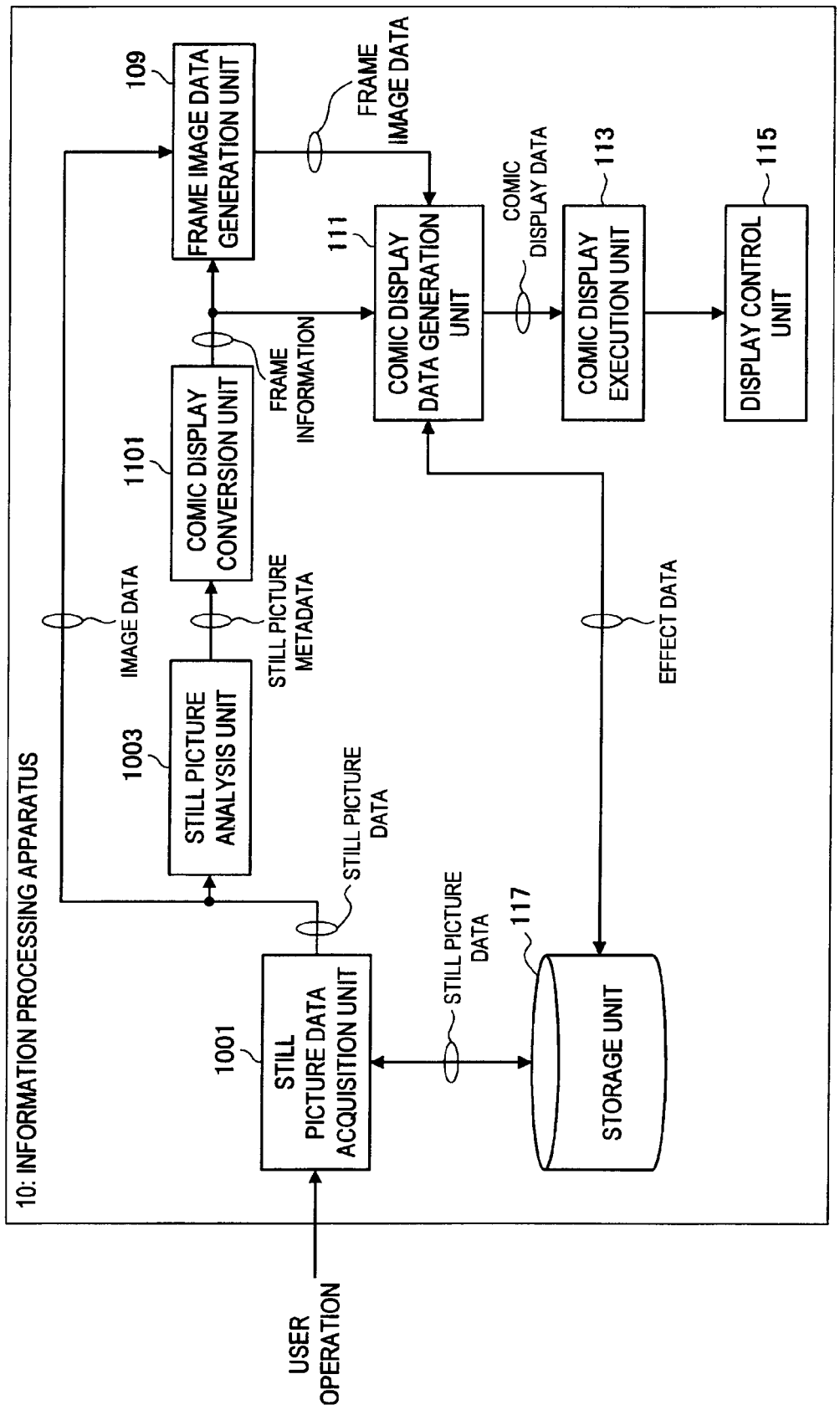
FIG. 38 is a block diagram for illustrating a configuration of an information processing method according to a third embodiment of the present invention.

FIG. 38 is a block diagram for illustrating the configuration of the information processing apparatus according to the present embodiment. For example, as shown in FIG. 38, the information processing apparatus 10 according to the present embodiment includes the frame image data generation unit 109, the comic display data generation unit 111, the comic display execution unit 113, the display control unit 115, and the storage unit 117. Further, the information processing apparatus 10 according to the present embodiment includes the still picture data acquisition unit 1001, the still picture analysis unit 1003, and a comic display conversion unit 1101.

The frame image data generation unit 109, the comic display data generation unit 111, the comic display execution unit 113, the display control unit 115, and the storage unit 117 have substantially the same configurations as the processing units according to the first embodiment, the first variation, and the second embodiment, and achieve substantially the same effects. Therefore, the detailed descriptions thereabout will be omitted in the below explanation.

Further, the still picture data acquisition unit 1001 and the still picture analysis unit 1003 have substantially the same configurations as the still picture data acquisition unit 1001 and the still picture analysis unit 1003 according to the second embodiment, and achieve substantially the same effects. Therefore, the detailed descriptions thereabout will be omitted in the below explanation.

The comic display conversion unit 1101 is constituted by, for example, a CPU, a ROM, a RAM, and the like. The comic display conversion unit 1101 divides a predetermined display region into frames based on still picture data transferred from the still picture analysis unit 1003, and converts the arrangement of the extracted plurality of still images into a comic-like arrangement. Further, the comic display conversion unit 1101 generates frame information including information about the image arranged in each of the frames. The comic display conversion unit 1101 transfers the generated frame information to the frame image data generation unit 109 and the comic display data generation unit 111.

The detailed configuration of the above comic display conversion unit 1101 is the same as the detailed configuration of the comic display conversion unit 1005 according to the second embodiment of the present invention. Therefore, the detailed descriptions thereabout will be omitted.

The still picture data acquisition unit 1001 of the information processing apparatus 10 according to the present embodiment obtains still picture data corresponding to a still picture specified by a user from the storage unit 117 in accordance with user operation performed on the information processing apparatus 10, and transfers the obtained still picture data to the still picture analysis unit 1003. The still picture analysis unit 1003 analyzes the moving picture data transferred from the moving picture data acquisition unit 1001, and generates still picture metadata, i.e., metadata relating to the feature quantities characterizing the still picture corresponding to the transferred still picture data. The still picture analysis unit 1003 transfers the generated still picture metadata to the comic display conversion unit 1101.

The image size determination unit 1031 of the comic display conversion unit 1101 determines the image size of the still picture based on the still picture metadata and the like transferred from the still picture analysis unit 1003. The image size determination unit 1031 generates frame image information including information relating to the image sizes of the representing frame images, and transfers the generated frame image information to the frame image arrangement unit 159 and the frame information generation unit 163 of the comic display conversion unit 1101.

The frame image arrangement unit 159 of the comic display conversion unit 1101 automatically arranges the representing frame images into the display region by using the frame image information, the still picture metadata, and the like, which have been transferred, and determines the arrangement of the representing frame images. When the frame image arrangement unit 159 determines the arrangement of the representing frame images, the frame image arrangement unit 159 generates frame arrangement information including information about which representing frame images are arranged at which positions, and transfers the generated frame arrangement information to the effect image arrangement unit 161 and the frame information generation unit 163 of the comic display conversion unit 1101.

Subsequently, the effect image arrangement unit 161 of the comic display conversion unit 1101 arranges an effect image such as a speech balloon based on the frame arrangement information, the still picture metadata, and the like, which have been transferred. At this moment, the effect image arrangement unit 161 arranges the effect images in accordance with the method for arranging the effect images as described in the first embodiment and the first variation of the first embodiment of the present invention. When the effect image arrangement unit 161 finishes arranging the effect images, the effect image arrangement unit 161 generates effect arrangement information including information about which effects are arranged and where the effects are arranged, and transfers the generated effect arrangement information to the frame information generation unit 163.

Subsequently, the frame information generation unit 163 of the comic display conversion unit 1101 generates frame information based on the frame image information, the frame arrangement information, the effect arrangement information, and the like transferred from each processing unit. The frame information generation unit 163 transfers the generated frame information to the frame image data generation unit 109 and the comic display data generation unit 111.

Subsequently, the frame image data generation unit 109 performs processing for adjusting the sizes and the shapes of the frame images used for displaying the comic based on the image data and the frame information, and generates frame image data used for displaying the comic. The frame image data generation unit 109 transfers the generated frame image data to the comic display data generation unit 111.

The comic display data generation unit 111 generates comic display data, i.e., a set of data used to display the comic by using the frame information, the frame image data, and the effect data.

The information processing apparatus 10 can display the comic, serving as the summary of the contents of the moving picture, on the display screen by executing the generated comic display data.

Exemplary functions of the information processing apparatus 10 according to the present embodiment have been described hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the technical level at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

<Hardware Configuration>

Figure 39:
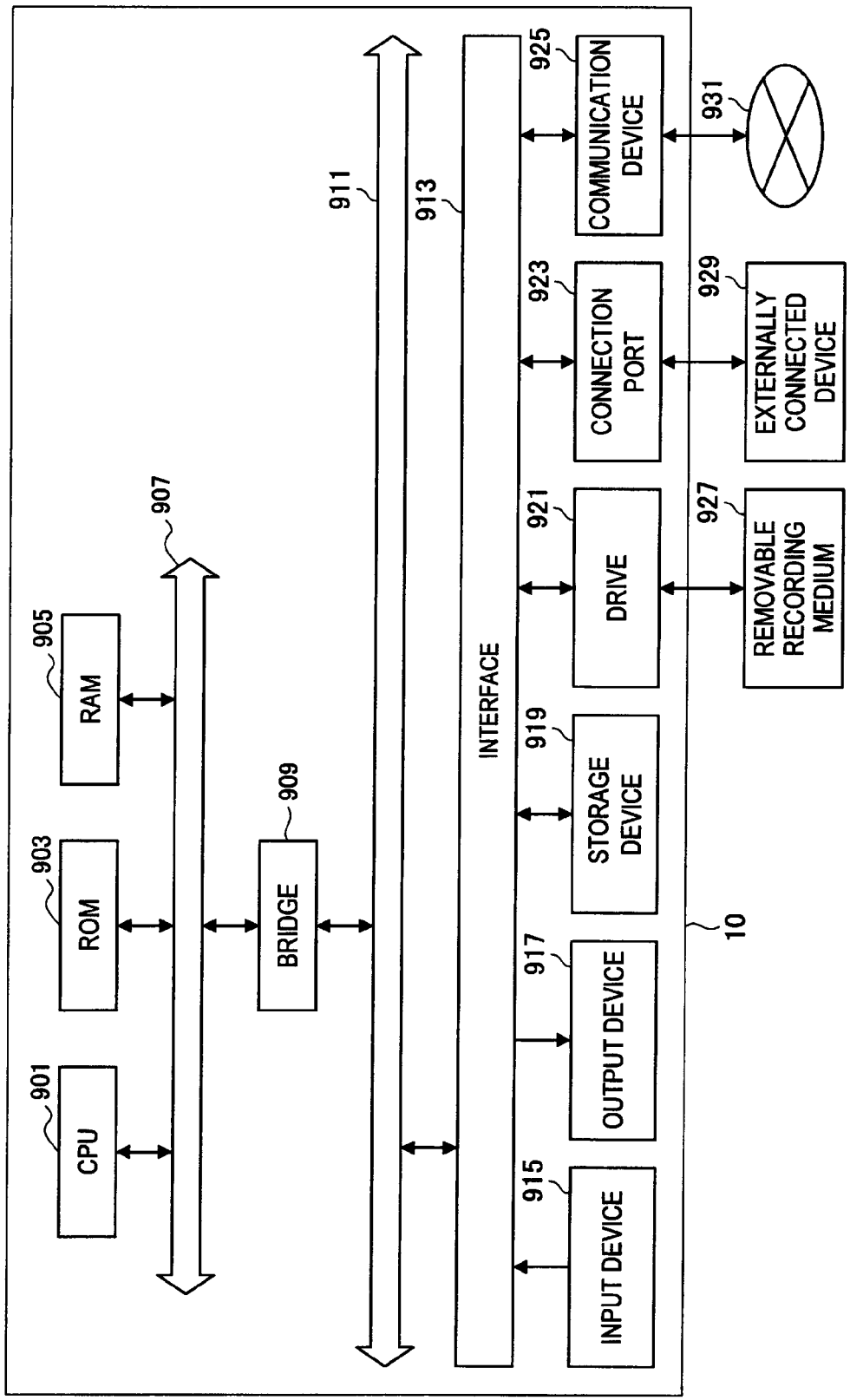
FIG. 39 is a block diagram for illustrating a hardware configuration of an information processing apparatus according to each embodiment of the present invention.

Subsequently, the hardware configuration of the information processing apparatus 10 according to each embodiment of the present invention will be described in detail with reference to FIG. 39. FIG. 39 is a block diagram for illustrating the hardware configuration of the information processing apparatus 10 according to each embodiment of the present invention.

The information processing apparatus 10 mainly includes a CPU 901, a ROM 903, and a RAM 905. The information processing apparatus 10 further includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and control apparatus and controls overall operation or some of operation in the information processing apparatus 10 in accordance with various programs stored in the ROM 903, the RAM 905, the storage device 919, or a removable recording medium 927. The ROM 903 stores programs, operation parameters, and the like used by the CPU 901. The RAM 905 primarily stores programs used during execution of the CPU 901 and parameters and the like varying during the execution as necessary. These are connected with each other via the host bus 907 constituted by an internal bus such as a CPU bus.

The host bus 907 is connected to the external bus 911 such as a PCI (Peripheral Component Interconnect/Interface) via the bridge 909.

The input device 915 is operation means operated by a user, such as a mouse, a keyboard, a touch panel, buttons, switches, levers, and the like. The input device 915 may be remote control means (a so-called remote controller) using, for example, infrared light and other radio waves, or may be an externally connected device 929 such as a portable telephone and a PDA capable of operating the information processing apparatus 10. The input device 915 is constituted by an input control circuit or the like for generating an input signal and for outputting the input signal to the CPU 901 based on, for example, information input by a user with the above operation means. By operating this input device 915, a user of the information processing apparatus 10 can input various data to the information processing apparatus 10, or can give instruction concerning handling operations toward the information processing apparatus 10.

The output device 917 is constituted by a device capable of audibly or visually notifying obtained information to a user. Examples of the output device 917 include display devices such as a CRT display device, a liquid crystal display device, a plasma display device, an EL display device, and lamps, audio output devices such as a speaker and a headphone, a printer, a portable telephone, a facsimile machine, and the like. The output device 917 outputs, for example, a result obtained with various processings performed by the information processing apparatus 10. More specifically, the display device displays a result, as texts or images, obtained with various processings performed by the information processing apparatus 10. On the other hand, the audio output device converts an audio signal such as reproduced audio data and sound data into an analog signal, and outputs the analog signal.

The storage device 919 is a device for storing data, which is an example of a storage unit of the information processing apparatus 10. The storage device 919 is constituted by, for example, a magnetic storage device such as a HDD (Hard Disk Drive), a semiconductor storage device, an optical storage device, a magneto-optical storage device or the like. This storage device 919 stores programs executed by the CPU 901 and various data, acoustic signal data and image signal data obtained from the outside.

The drive 921 is a reader/writer for recording medium, and is embedded in the information processing apparatus 10 or attached externally thereto. The drive 921 reads information stored in the attached removable recording medium 927 such as a magnetic disk, an optical disk, a magneto-optical disk, or a semiconductor memory, and outputs the read information to the RAM 905. The drive 921 can record the attached removable recording medium 927 such as a magnetic disk, an optical disk, a magneto-optical disk, or a semiconductor memory. The removable recording medium 927 is, for example, a DVD medium, an HD-DVD medium, a Blu-ray medium, or the like. The removable recording medium 927 may be a CompactFlash (registered trademark) (CompactFlash: CF), a memory stick, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing apparatuses to directly connect to the information processing apparatus 10. Examples of the connection port 923 include a USB (Universal Serial Bus) port, an IEEE 1394 port such as i.Link, a SCSI (Small Computer System Interface) port, and the like. Other examples of the connection port 923 include an RS-232C port, an optical audio terminal, an HDMI (High-Definition Multimedia Interface), and the like. When the externally connected apparatus 929 is connected to this connection port 923, the information processing apparatus 10 directly obtains acoustic signal data and image signal data from the externally connected apparatus 929, or feeds the acoustic signal data and the image signal data to the externally connected apparatus 929.

The communication device 925 is a communication interface constituted by, for example, a communication device or the like for connecting to a communication network 931. The communication device 925 is, for example, a wired or wireless LAN (Local Area Network), Bluetooth, a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP with, for example, the Internet and other communication apparatuses. The communication network 931, to which the communication device 925 connects, is constituted by a network and the like connected via wire or connected wirelessly. For example, the communication network 931 may be the Internet, a home LAN, an infrared communication, a radio wave communication, a satellite communication, or the like.

An example of hardware configuration capable of achieving the functions of the information processing apparatus 10 according to each embodiment of the present invention has been described hereinabove. Each of the above constituent elements may be made using a generally-used member, or may be made with hardware dedicated for the function of the constituent element. Therefore, the used hardware configuration can be changed as necessary in accordance with the technical level at the time of carrying out the present embodiment.

<Summary>

As hereinabove described, with this method, private videos of various events (for example, party, travel, and the like) can be displayed in a comic-like manner. A private video having duration of several minutes can be represented as several pages depending on the size of frames. Therefore, a user can review the private video in a short time. When the comic display data are generated as contents such as Flash, a user can turn pages on a Web browser and read the contents while listening to reproduced audio for a specified frame.

In this method, the moving picture analysis unit extracts the moving picture metadata by analyzing the moving picture data. Alternatively, when the moving picture includes TV contents, information such as subtitle data and EPG data is also available, which enables, for example, displaying words spoken by a person in a speech balloon.

As described above, according to this method, contents of a moving picture can be summarized in such a manner as to allow a user to understand the contents of the moving picture at a glance. Thereby, the moving picture can be reproduced in a shorter time, and a user can look over the entire contents without missing important scenes. Further, the degree of excitement of a scene is reflected by the size of a frame, so that the exciting scene can be effectively represented. In addition, a particular moving picture can be easily searched from among many moving pictures, since the moving pictures are represented in such a manner to be understood at a glance.

Further, according to this method, various comic expressions are enabled, such as frame division and speech balloons, so that a user feels like seeing the moving picture. Thereby, extracted exciting scenes are divided and made into dynamic frames, which make the comic more interesting. With the face extraction function, a frame including a face taken well can be employed to a comic in such a manner that the face is not covered by a speech balloon. With the classification function of audio data, speech balloons can be generated in accordance with spoken words in audio. Various speech balloons allow a user to understand scenes in a moving picture more easily. Further, it is possible to prevent a situation where a user would leave a taken moving picture because the user loses enthusiasm for seeing it, and it is possible to make the user be interested in the moving picture. The moving picture represented as comic images can alleviate a feeling of redundancy in a private video.

The comic display data according to this method can be described in various Scripts and languages such as Flash, JavaScript, and Java/BREW. For example, when the comic display data are implemented as Flash and the like, interactive contents can be made so as to allow a user to turn pages and reproduce audio. Further, the comic display data can be seen on a generally-available web browser, which eliminates troublesomeness such as installation of a dedicated application. Further, it is possible to improve representation and usability in a moving picture sharing website because the contents of a moving picture can be displayed as a listing. Thereby, it is possible to invite more and more people to upload comic display data to the network so as to share moving pictures with other people. In this method, the contents are represented in such a manner to be understood at a glance, and the way the contents are representation is interesting. Therefore, this method can improve compatibility with, e.g., pasting to homepages and blogs.

By using not only a detection result of a facial region but also various recognition and detection techniques such as a person detection, a subject detection, and an object detection, various images useful for understanding the contents can be extracted, and the contents can be understood more easily.

The position at which an effect image is arranged is changed in accordance with, e.g., a position of a detected region and an accuracy in detecting the detected region. Therefore, an important object in an image can be displayed in an emphasized manner, and it is possible to prevent the important object from being covered by an effect image.

Further, contents of various media of a user, such as moving picture contents and still picture contents, can be collectively converted into comic-like representations. Therefore, a user can enjoy seeing digests of the plurality of media with ease.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-009920 filed in the Japan Patent Office on 20 Jan. 2009 and Japanese Priority Patent Application JP 2009-177877 filed in the Japan Patent Office on 30 Jul. 2009, the entire content of which is hereby incorporated by reference.

What is claimed is:

1. An information processing apparatus comprising:
  a moving picture analysis unit for analyzing moving picture data which is data of a moving picture including a plurality of images and audios associated with time information and for generating moving picture metadata which is metadata relating to a plurality of feature quantities characterizing the moving picture;
  a comic display conversion unit for extracting the plurality of images from the moving picture data based on the moving picture metadata, for dividing a predetermined display region into frames, for converting an arrangement of the plurality of extracted images into a comic-like arrangement, and for generating frame information including information about images arranged in each of the frames; and a comic display data generation unit for generating comic display data including at least the frame information, data of the extracted images, and audio data of the moving picture.

2. The information processing apparatus according to claim 1, wherein the comic display conversion unit further includes:

a digest score calculation unit for calculating a digest score based on the moving picture metadata, the digest score being a value obtained by weighting and adding the plurality of feature quantities toward each of the plurality of images constituting the moving picture, a thumbnail number determination unit for extracting, based on the digest score, thumbnail images to be arranged in the frames from the plurality of images constituting the moving picture data, and for determining a number of the thumbnail images;

an image size determination unit for determining a size of the thumbnail images arranged in the predetermined display region based on the digest score;

a frame image arrangement unit for arranging the thumbnail images, whose image size is determined, to the frames in a predetermined order; and a frame information generation unit for generating the frame information relating to the frames in which the thumbnail images are arranged.

3. The information processing apparatus according to claim 2, wherein the thumbnail number determination unit further extracts, as animation images, images connected to the extracted thumbnail images for a predetermined time.

4. The information processing apparatus according to claim 3, wherein the moving picture includes moving picture metadata relating to camerawork when taking the moving picture, and the comic display conversion unit further includes a camerawork metadata usage unit for determining, based on the moving picture metadata relating to the camerawork, a number of images which is extracted as the animation images by the thumbnail number determination unit.

5. The information processing apparatus according to claim 4, wherein the camerawork metadata usage unit selects the animation images from a plurality of images existing between the extracted thumbnail images and an image located at the moment an integration value of camerawork reaches a predetermined threshold value.

6. The information processing apparatus according to claim 5, wherein the camerawork metadata usage unit sets a reproduction speed of an animation including the thumbnail images and the animation images in accordance with a magnitude of an integration value of the camerawork.

7. The information processing apparatus according to claim 2, further comprising a still picture analysis unit for analyzing still picture data which is data corresponding to a still picture and for generating still picture metadata which is metadata relating to a plurality of feature quantities characterizing the still picture, wherein the image size determination unit determines, based on the still picture metadata, a size of the still picture arranged in the predetermined display region.

8. The information processing apparatus according to claim 7, wherein the frame image arrangement unit determines an order in which still pictures are arranged, based on time information, associated with the still picture data, about when the still picture data is generated.

9. The information processing apparatus according to claim 4, wherein the comic display conversion unit further includes an effect image arrangement unit for arranging, based on the moving picture metadata, at least anyone of a speech balloon and a screen effect on a frame in which a thumbnail image is arranged.

10. The information processing apparatus according to claim 9, wherein the effect image arrangement unit arranges anyone of the speech balloon and the screen effect by using the moving picture metadata relating to the audio data included in the moving picture data.

11. The information processing apparatus according to claim 10, wherein the effect image arrangement unit arranges the screen effect on the thumbnail images by using the moving picture metadata relating to the camerawork.

12. The information processing apparatus according to claim 2, wherein for the moving picture of which the moving picture metadata indicates that an image includes a face, the image size determination unit makes a thumbnail image by enlarging a facial region in which the face is shown.

13. The information processing apparatus according to claim 2, wherein the moving picture metadata further includes at least anyone of moving picture metadata indicating that an image includes a person, moving picture metadata relating to a subject in the image, and moving picture metadata relating to a previously registered object which is present in the image, and an effect image arrangement unit arranges a screen effect based on the moving picture metadata indicating that the image includes a person, the moving picture metadata relating to a subject in the image, or the moving picture metadata relating to the previously registered object which is present in the image.

14. The information processing apparatus according to claim 7, wherein the still picture metadata includes at least anyone of still picture metadata indicating that the image includes a face, still picture metadata indicating that an image includes a person, still picture metadata relating to a subject in the image, and still picture metadata relating to a previously registered object which is present in the image, and an effect image arrangement unit arranges a screen effect based on the still picture metadata indicating that the image includes the face, the still picture metadata indicating that the image includes the person, the still picture metadata relating to a subject in the image, or the still picture metadata relating to the previously registered object which is present in the image.

15. The information processing apparatus according to claim 2, wherein an effect image arrangement unit arranges based on a relative positional relationship between a barycenter of the predetermined display region of the thumbnail images and a barycenter of the thumbnail images in which a predetermined object is detected, a screen effect in a region other than the region in which the predetermined object is detected.

16. The information processing apparatus according to claim 12, wherein when the image includes a plurality of facial regions, the image size determination unit makes a thumbnail image by performing an enlargement processing so as to include all of the facial regions.

17. An information processing method, comprising the steps of;

analyzing moving picture data which is data of a moving picture including a plurality of images and audios associated with time information and generating moving picture metadata which is metadata relating to feature quantities characterizing the moving picture;

extracting the plurality of images from the moving picture data based on the moving picture metadata, dividing a predetermined display region into frames, converting an arrangement of the plurality of extracted images into a comic-like arrangement, and generating frame information including information about images arranged in each of the frames; and generating comic display data including at least the frame information, data of the extracted images, and the audio data of the moving picture.

* * * * *